United States Patent
Kawasaki

(10) Patent No.: US 8,331,474 B2
(45) Date of Patent: Dec. 11, 2012

(54) WIRELESS COMMUNICATION SYSTEM, WIRELESS COMMUNICATION METHOD, TRANSMISSION APPARATUS, AND RECEPTION APPARATUS

(75) Inventor: Toshio Kawasaki, Kawasaki (JP)

(73) Assignee: Fujitsu Limited, Kawasaki (JP)

(*) Notice: Subject to any disclaimer, the term of this patent is extended or adjusted under 35 U.S.C. 154(b) by 665 days.

(21) Appl. No.: 12/335,988

(22) Filed: Dec. 16, 2008

(65) Prior Publication Data

US 2009/0232244 A1 Sep. 17, 2009

(30) Foreign Application Priority Data

Mar. 17, 2008 (JP) ................................. 2008-067847

(51) Int. Cl.
*H04B 7/02* (2006.01)

(52) U.S. Cl. ........ 375/267; 375/260; 375/262; 375/340; 375/343

(58) Field of Classification Search .................. 375/260, 375/267
See application file for complete search history.

(56) References Cited

U.S. PATENT DOCUMENTS

| 7,333,835 B2* | 2/2008 | Nagaraj ...................... 455/562.1 |
| 7,436,896 B2* | 10/2008 | Hottinen et al. .............. 375/267 |
| 7,634,030 B2* | 12/2009 | Kim et al. ..................... 375/341 |
| 2003/0086479 A1 | 5/2003 | Naguib |
| 2005/0085269 A1 | 4/2005 | Buljore et al. |
| 2005/0255805 A1 | 11/2005 | Hottinen |
| 2005/0287978 A1* | 12/2005 | Maltsev et al. ............... 455/403 |
| 2006/0245472 A1* | 11/2006 | Pan et al. ...................... 375/144 |
| 2006/0258303 A1* | 11/2006 | Taira et al. .................... 455/101 |
| 2007/0105508 A1* | 5/2007 | Tong et al. .................... 455/101 |
| 2008/0080594 A1 | 4/2008 | Naguib |
| 2009/0201849 A1* | 8/2009 | Sawahashi et al. ........... 370/328 |
| 2010/0142591 A1 | 6/2010 | Naguib |

FOREIGN PATENT DOCUMENTS

| JP | 2005-503065 | 1/2005 |
| WO | 2004095730 | 11/2004 |
| WO | 2005524332 | 8/2005 |
| WO | 2005528038 | 9/2005 |
| WO | WO 2006/106619 | * 10/2006 |

OTHER PUBLICATIONS

Japanese Office Action: Notification of Reason for Refusal issued for corresponding Japanese Patent Application No. 2008-067847 mailed Jun. 12, 2012 with English translation.

* cited by examiner

*Primary Examiner* — Dhaval Patel
(74) *Attorney, Agent, or Firm* — Myers Wolin, LLC

(57) ABSTRACT

The transmission apparatus performs orthogonalization processing to each of the signal sequence obtained by dividing each of the more than one transmission streams into more than one signal sequence based on the orthogonality of wireless resources. The signal sequence is then sent from multiple antennas. The reception apparatus performs the orthogonal separation processing based on the above orthogonality to the received signals to separate multiple reception signal sequence having the orthogonal characteristic, and applies a predetermined signal separation scheme based on the propagation path estimation matrix between the reception apparatus and the transmission apparatus to any one of the pairs of the separated reception signal sequence, thereby separating a signal sequence before subjected to the above orthogonalization processing.

17 Claims, 30 Drawing Sheets

WIRELESS COMMUNICATION SYSTEM, WIRELESS COMMUNICATION METHOD, TRANSMISSION APPARATUS, AND RECEPTION APPARATUS

CROSS-REFERENCE TO RELATED APPLICATION(S)

This application is based upon and claims the benefit of priority of the prior Japanese Patent Application No. 2008-67847, filed on Mar. 17, 2008, the entire contents of which are incorporated herein by reference.

FIELD

The embodiment(s) discussed herein is directed to a wireless communication system, a wireless communication method, a transmission apparatus, and a reception apparatus. The embodiment(s) may be employed in the MIMO (Multi-Input Multi-Output) scheme as an example of a wireless communication scheme.

BACKGROUND

Mobile communication systems, as examples of wireless communication system, can be effected by fading. The diversity scheme is a well-known means for reducing the deterioration of channel quality caused by this fading. The diversity scheme includes two types of techniques: the transmission diversity using more than one transmitter antennas; and the reception diversity using more than one receiver antennas.

In mobile communication systems, since there is a demand for down-sizing of mobile stations, the number of antennas provided for mobile stations is limited. Thus, the transmission diversity scheme can be employed in communications from base stations to mobile stations (down-link).

Further, recently, in mobile communication systems, since there are demands for a high-speed data rate and increase in the cell capacity, multiple antenna technology, such as the MIMO technology and the array antenna technology, can be employed.

[Patent document 1] Published Japanese Translation of a PCT Application No. 2005-528038

[Patent document 2] International Publication Pamphlet No. WO 2004/095730

[Patent document 3] Published Japanese Translation of a PCT Application No. 2005-524332

To separate signals (symbols) in a reception station with the MIMO scheme, it is difficult to perform the separation without assuring reception signals of a desired reception signal intensity such as the Signal to Noise Ratio (SNR). As technology for improving such an SNR, it is possible to employ the beam forming technology in which the wireless wave directivity is arithmetically controlled by means of performing weighting control to more than one series of transmission signal in accordance with propagation path (channel) information.

To perform the beam forming in a transmission station, it is necessary for the transmission station to recognize channel information between the transmission station and a reception station. In the case of Frequency Division Duplex (FDD), it is necessary for the reception station to measure channel information and then notify the transmission station of the measurement result through a feedback channel. In the case of Time Division Duplex (TDD), it is necessary for the transmission station to measure channel information in the direction from the reception station to the transmission station based on the signals received from the reception station.

SUMMARY

For example, exemplary embodiment(s) uses the following.

(1) According to an exemplary embodiment, there is provided a wireless communication system, including: a transmission apparatus including: an orthogonalization processing unit operable to perform orthogonalization processing based on the orthogonality of wireless resources to each of the signal sequence, the signal sequence being obtained by dividing each of the plurality of transmission streams; and a transmitter to transmit each of the signal sequence being subjected to the orthogonalization processing through multiple antennas; and a reception apparatus including: an orthogonal separating unit operable to perform orthogonal separation processing based on the orthogonality to a signal received from the transmission apparatus to separate the received signal into a plurality of reception signal sequence including an orthogonal characteristic therebetween; and a signal regenerating unit operable to apply a predetermined signal separation method based on a propagation path estimation matrix between the reception apparatus and the transmission apparatus to any of the pairs of the plurality of reception signal sequence to regenerate the signal sequence before being subjected to the orthogonalization processing.

(2) According to an exemplary embodiment, there is provided a wireless communication method for use in a wireless communication system provided with a transmission apparatus and a reception apparatus, the wireless communication method including: on the transmission apparatus, performing orthogonalization processing based on the orthogonality of wireless resources to each of the signal sequence, the signal sequence being obtained by dividing each of the plurality of transmission streams; and transmitting each of the signal sequence being subjected to the orthogonalization processing through multiple antennas; and on the reception apparatus, performing orthogonal separation processing based on the orthogonality to a signal received from the transmission apparatus to separate the received signal into a plurality of reception signal sequence including an orthogonal characteristic therebetween; and applying a predetermined signal separation method based on a propagation path estimation matrix between the reception apparatus and the transmission apparatus to any of the pairs of the plurality of reception signal sequence to regenerate the signal sequence before being subjected to the orthogonalization processing.

(3) According to an exemplary embodiment, there is provided a transmission apparatus, including: an orthogonalization processing unit operable to perform orthogonalization processing based on the orthogonality of wireless resources to each of the signal sequence, the signal sequence being obtained by dividing each of the plurality of transmission streams; and a transmitter operable to transmit each of the signal sequence being subjected to the orthogonalization processing through multiple antennas.

(4) According to an exemplary embodiment, there is provided a reception apparatus, including: an orthogonal separating unit operable to perform orthogonal separation processing based on the orthogonality to a signal received from the transmission apparatus to separate the received signal into a plurality of reception signal sequence including an orthogonal characteristic therebetween, the transmission apparatus performing orthogonalization processing based on the orthogonality characteristic of wireless resources to each of the signal sequence obtained by dividing each of the plurality of transmission streams; and a signal regenerating unit operable to apply a predetermined signal separation method based on a propagation path estimation matrix between the reception apparatus and the transmission apparatus to any of the pairs of the plurality of reception signal sequence to regenerate the signal sequence before being subjected to the orthogonalization processing.

Additional objects and advantages of the invention (embodiment) will be set forth in part in the description which follows, and in part will be obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention, as claimed.

DESCRIPTION OF EMBODIMENT(S)

Hereinafter, exemplary embodiments will be described with reference to accompanying drawings. The following exemplary embodiments are merely examples and do not intend to exclude various modifications and variations to the proposed method and/or apparatus that are not specifically described herein. Rather, various modifications or variations may be made to the embodiments (for example, by combining the exemplary embodiments) without departing from the scope and spirit of the proposed method and/or apparatus

[A] First Embodiment

Figure 1:
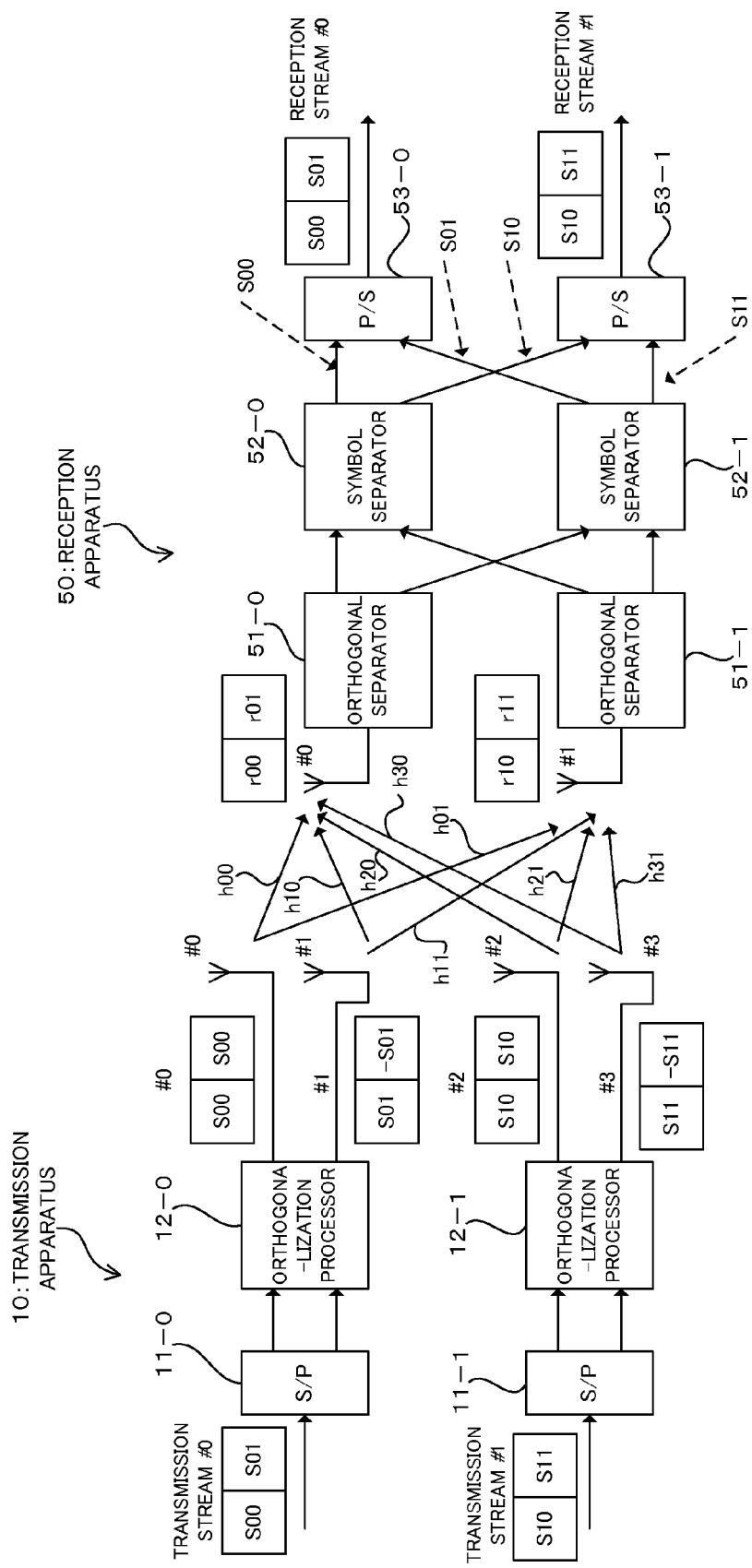
FIG. 1 is a block diagram illustrating an example of a construction of a MIMO communications system as an example of a wireless communication system according to a first embodiment.

FIG. 1 is a block diagram illustrating an example of a construction of a MIMO communications system as an example of a wireless communication system according to a first embodiment. The MIMO communications system depicted in FIG. 1 illustratively includes: a transmission apparatus (MIMO transmitter) 10 provided with four transmitter antennas #0, #1, #2, and #3; and a reception apparatus (MIMO receiver) 50 provided with two receiver antennas #0 and #1.

These transmission apparatus 10 and reception apparatus 50 can also be used as a transmission system and a reception system of a single wireless communications apparatus. For example, the transmission apparatus 10 can be employed in the transmission system of a wireless base station; the reception apparatus 50 can be employed in a wireless terminal (mobile station) that communicates with the wireless communications base station through a wireless link (the same goes for in the following practical examples). In this instance, the number of transmitter antennas and the number of receiver antennas should by no means be limited to the above.

The transmission apparatus 10 is capable of sending more than one transmission stream series (hereinafter, will also be simply called the "transmission stream"), for example, two streams (transmission stream #0 and transmission stream #1) toward the reception apparatus 50 through the transmitter antennas #0 through #3.

For example, given that a transmission signal (symbol) of the stream number x (x=0 or 1, in the present example) at the time (timing) of y (=0, 1, 2, . . . ) is expressed as Sxy, the symbol series (S0$y$) of the first transmission stream #0 is S/P converted into two signals (for example, symbols) series by the first serial/parallel (S/P) converter 11-0, and the two signals are then subjected to orthogonalization processing performed by the first orthogonalization processor 12-0, thereby being converted into two signal (for example, symbol) series being mutually orthogonal, which are then sent from the transmitter antennas #0 and #1.

Likewise, the symbol series (S1$y$) of the second transmission stream #1 is S/P converted into two symbol series by the second S/P converter 11-1, and the two symbol series are then subjected to orthogonalization processing performed by the second orthogonalization processor 12-1, thereby being converted into two symbol series being mutually orthogonal, which are then sent from the transmitter antennas #2 and #3.

In this instance, in the transmission apparatus 10 exemplified in FIG. 1, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

In the orthogonalization processing, it is possible to utilize the orthogonality of wireless resources, such as codes, frequencies, and time (timing). Taking a case of using the orthogonality (orthogonal codes) of codes as an example, it is possible to orthogonalize the symbol series (S0$y$) of the transmission stream #0 as two symbol series of (S0$y$, S0$y$) and (S0(y+1), −S0(y+1)). Likewise, it is possible to orthogonalize the symbol series (S1$y$) of the transmission stream #1 as two symbol series of (S1$y$, S1$y$) and (S1(y+1), −S1(y+1)).

Here, the redundant expression of the same symbol such as (Sxy, Sxy), describes, for the sake of convenience, the fact that the symbol Sxy belonging to the transmission streams #0 and #1 becomes a symbol (the symbol rate is 1/N) having a length of N=twice (N=2 symbol time periods) on the time axis by means of N-parallel S/P conversion (here, N=2, as an example).

Therefore, it is possible to perform orthogonal processing such as multiplying the symbol Sxy, after being subjected to the S/P conversion, by orthogonal codes at the symbol cycles before the S/P conversion. For example, (Sxy, −Sxy) expresses that the symbol Sxy is multiplied by a code of "+1" at the initial 1 symbol time period, out of the two symbol time periods occupied by 1 symbol Sxy after the S/P conversion, and is then multiplied by a code of "−1" at the next 1 symbol time period.

Then, the sum of the two symbol series of (S0$y$, S0$y$) and (S0(y+1), −S0(y+1)) obtained from the transmission stream #0 results in the symbol S0$y$ component remained, while the difference of the above two symbol series results in the symbol S0(y+1) component. Likewise, the sum of the two symbol series of (S1$y$, S1$y$) and (S1(y+1), −S1(y+1)) obtained from the transmission stream #1 results in the symbol S1y component remained, while the difference between the above two symbol series results in the symbol S1(y+1) component remained. In this manner, it is possible to realize the orthogonality between the symbol series. That is, it is possible to realize a relationship such that "a predetermined arithmetic operation performed to the combined signals enables separation of the individual signal components thereof" between the symbol series.

In this instance, the orthogonal codes can be multiplied at symbol cycles (symbol rate) before the S/P conversion as described above, and also can be multiplied at shorter cycles, for example, chip cycles such as that in the Code Division Multiple Access (CDMA) scheme. Further, as will be described later, it is also possible to perform the multiplication at Code Division Multiplexing (CDM) symbol cycles, and at OFDM symbol cycles in the Orthogonal Frequency Division Multiplexing (OFDM) scheme and the Orthogonal Frequency Division Multiple Access (OFDMA) scheme.

The symbol series sent from the transmitter antennas #0 through #3 are combined (multiplexed) in space and received through the two receiver antennas #0 and #1 of the reception apparatus 50. Here, the signal sent from the transmitter antennas #0 and #2 and the signal sent from the transmitter antennas #1 and #3 are mutually orthogonal due to the orthogonalization processing.

Hence, in the reception apparatus 50, the orthogonal separators 51-0 and 51-1 each perform the orthogonal separation processing corresponding to the orthogonalization processing to the reception signals, thereby separating the reception signals into the signal components sent from the transmitter antennas #0 and #2 (a multiplex signal of S0$y$ and S1$y$ in a case of using the orthogonal codes; hereinafter, will be also described as S0$y$+S1$y$) and the signal components sent from the transmitter antennas #1 and #3 [a multiplex signal of S0(y+1) and S1(y+1) in a case of using the orthogonal codes; hereinafter, will be also described as S0(y+1)+S1(y+1)].

In this instance, in the reception apparatus 50 exemplified in FIG. 1, some (reception unit) of the blocks relating to reception processing, including: low-noise amplifiers, which perform low-noise amplification of the wireless signals received through the receiver antennas #0 and #1; frequency converters, which perform frequency conversion (down-conversion) of the wireless signals so as to have baseband frequencies; and AD converters, which convert the baseband signals into digital signals, are omitted from the illustration thereof for the sake of convenience.

To make the description easy to understand, a symbol expression will be made with an attention paid to a case where y=0, 1. When the orthogonal codes are used, for example, the signal components sent from the transmitter antennas #0 and #2 are multiplex signals (S00+S10) of symbol S00 and symbol S10; the signal components sent from the transmitter antennas #1 and #3 are multiplex signals (S01+S11) of symbol S01 and symbol S11.

The signal components (S00+S10) received from the transmitter antenna #0 and the transmitter antenna #2, each separated by the orthogonal separators 51-0 and 51-1, respectively, are input to the first symbol separator (MIMO separator) 52-0; the signal components (S01+S11) received from the transmitter antenna #1 and the transmitter antenna #3, each separated by the orthogonal separators 51-0 and 51-1, respectively, are input to the second symbol separator (MIMO separator) 52-1.

Then, the first symbol separator (signal separating unit) 52-0 separates the signal components (S00+S10) received from the transmitter antennas #0 and #2 into a signal component (S00) sent from the transmitter antenna #0 and a signal component (S10) sent from the transmitter antenna #2 with use of the MIMO separation scheme.

Likewise, the second symbol separator (signal separating unit) 52-1 separates the signal components (S01+S11) received from the transmitter antennas #1 and #3 into a signal component (S01) sent from the transmitter antenna #1 and a signal component (S11) sent from the transmitter antenna #3 with use of the MIMO separation scheme.

In this instance, a detailed example of the above separation processing will be described later.

The signal component (S00) separated by the symbol separator 52-0 and the signal component (S01) separated by the symbol separator 52-1 are subjected to P/S conversion performed by the first parallel/serial (P/S) converter 53-0, and the result is output as the reception stream #0 corresponding to the transmission stream #0.

Likewise, the signal component (S10) separated by the symbol separator 52-0 and the signal component (S11) separated by the symbol separator 52-1 are subjected to P/S conversion performed by the second P/S converter 53-1, and the result is output as the reception stream #1 corresponding to the transmission stream #1.

(A1) PRACTICAL EXAMPLE 1

Figure 2:
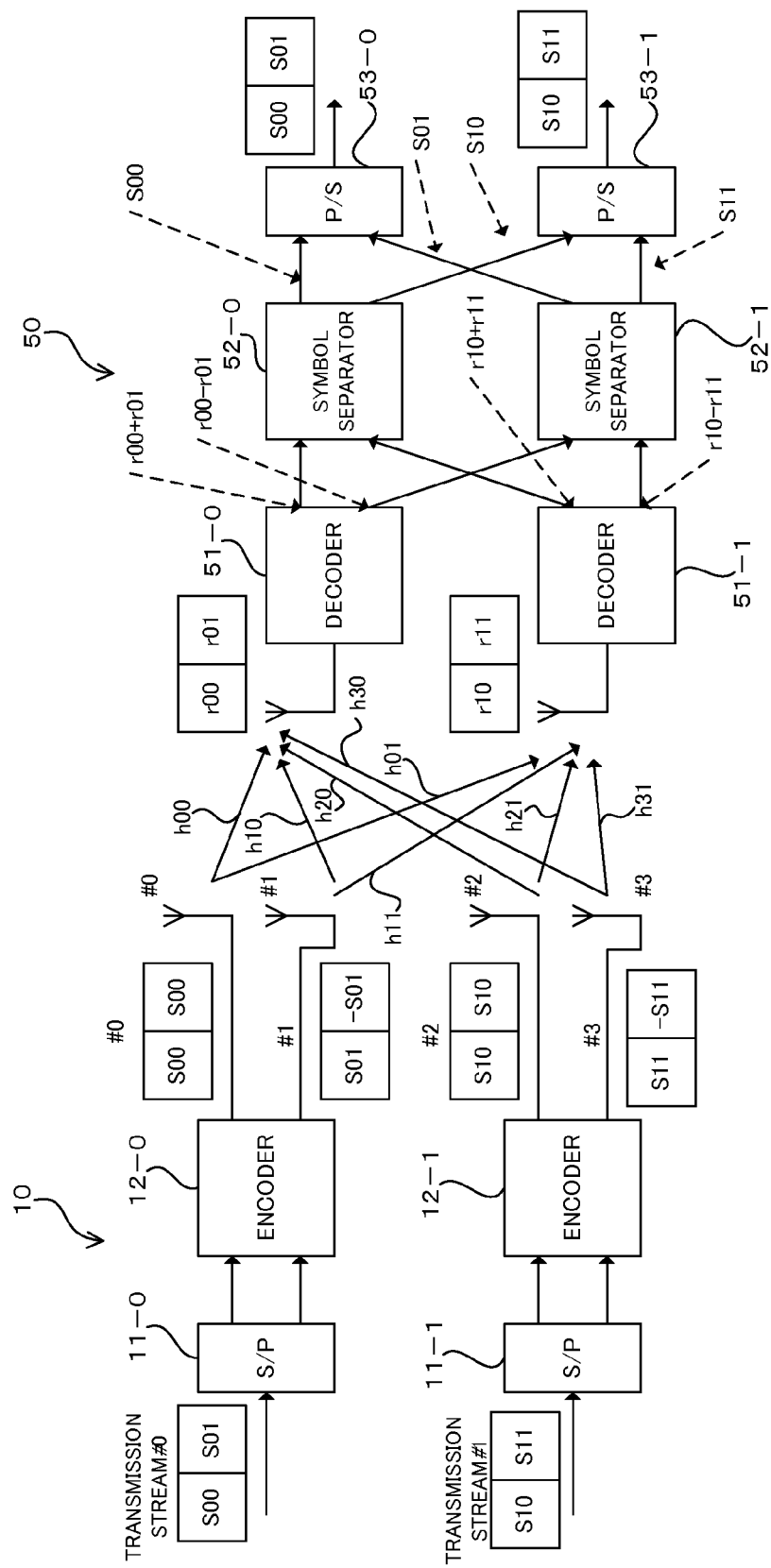
FIG. 2 is a block diagram illustrating an example of a construction of a MIMO communications system as an example of a wireless communication system according to a first practical example.
Figure 3:
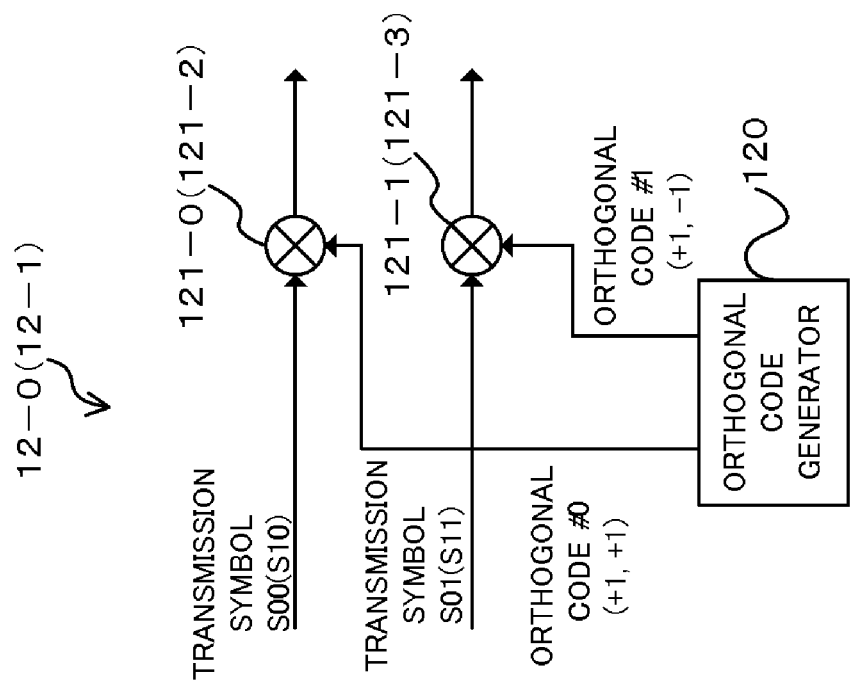
FIG. 3 is a block diagram illustrating an example of a construction of an encoder depicted in FIG. 2.

In a case of utilizing the orthogonality of codes as an example of the above mentioned orthogonalization processing and orthogonal separation processing, the encoding unit provided with the orthogonal code generator 120 and the multipliers 121-0 and 121-1 (121-2 and 121-3), as depicted in FIG. 2 and FIG. 3, can be used as an example of the orthogonalization processor 12-0 (12-1) of the transmission apparatus 10. In this instance, the orthogonal code generator 120 may be separately provided for the orthogonalization processor 12-0 and the orthogonalization processor 12-1, and may also be provided for either of those as a shared one.

On the other hand, as an example of the orthogonal separator 51-0 (51-1) of the reception apparatus 50, a decoding unit provided with the orthogonal code generator 510, the multipliers 511-0 and 511-1 (511-2 and 511-3), the adders 512-0 and 512-1 (512-2 and 512-3), and the delay circuits 513-0 and 513-1 (513-2 and 513-3), can be used.

In this instance, the orthogonal code generator 510 can be shared by the orthogonal separators 51-0 and 51-1. In that case, the orthogonal code generator 510 may be provided for any one of the orthogonal separators 51-0 and 51-1, or maybe separately provided for the orthogonal separators 51-0 and 51-1.

Further, in the transmission apparatus 10 exemplified in FIG. 2, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

Further, in the reception apparatus 50 exemplified in FIG. 2, also, some (reception unit) of the blocks relating to reception processing, including: low-noise amplifiers, which perform low-noise amplification of the wireless signals received through the receiver antennas #0 and #1; frequency converters, which perform frequency conversion (down-conversion) of the wireless signals so as to have baseband frequencies; and AD converters, which convert the baseband signals into digital signals, are omitted from the illustration thereof for the sake of convenience.

In the orthogonalization processor (encoding unit) 12-0 (12-1), the multipliers 121-0 and 121-1 (121-2 and 121-3) multiply the two symbol series #0 and #1 (#2 and #3) input from the S/P converter 11-0 (11-1) by the orthogonal codes, such as Walsh code, each generated by the orthogonal code generator 120, thereby encoding (orthogonalizing) the symbol series. In this instance, in FIG. 4, as an example of such orthogonal codes, there provided are codes having code patterns of (+1, +1) and (+1, −1) at symbol cycles before the S/P conversion performed.

In this case, the symbol series #0 through #3 after encoding performed with an attention paid to the case where y=0, 1 are given as follows:

Symbol series #0→(S00, S00)
Symbol series #1→(S01, −S01)
Symbol series #2→(S10, S10)
Symbol series #3→(S11, −S11)

That is, as already described, the orthogonality is present between the symbol series #0 and the symbol series #1, such that the sum of the symbol series #0 and the symbol series #1 results in a component of symbol S00 remained, and such that the difference between the above two results in a component of symbol S01 remained. In a like manner, the orthogonality is present between the symbol series #2 and the symbol series #3, such that the sum of the symbol series #2 and the symbol series #3 results in a component of symbol S10 remained, and such that the difference between the above two results in a component of symbol S11 remained.

The signals of the symbol series #0 through #3 are sent from the transmitter antennas #0 through #3, respectively, and combined (multiplexed) in space. The signals propagated in space are received through the receiver antennas #0 and #1.

Here, as illustrated in FIG. 1 and FIG. 2, in a case where the value (vector) of the propagation path (channel) from the transmitter antenna #i (i=0 through 3) to the receiver antenna #j (j=0 or 1) is pressed as "hij" and a signal received at the time of t=k (k=0, 1, 2, . . . ) is expressed as "rjk", the signals (r00 and r01) received through the receiver antenna #0 at the time t=0 and 1, respectively, can be expressed by the following formulae (1) and (2); the signals (r10 and r11) received through the receiver antenna #1 at the time of t=0 and 1, respectively, can be expressed by the following formulae (3) and (4).

$$r00 = h00 \cdot S00 + h10 \cdot S01 + h20 \cdot S10 + h30 \cdot S11 \quad (1)$$

$$r01 = h00 \cdot S00 - h10 \cdot S01 + h20 \cdot S10 - h30 \cdot S11 \quad (2)$$

$$r10 = h01 \cdot S00 + h11 \cdot S01 + h21 \cdot S10 + h31 \cdot S11 \quad (3)$$

$$r11 = h01 \cdot S00 - h11 \cdot S01 + h21 \cdot S10 - h31 \cdot S11 \quad (4)$$

In the orthogonal separators (decoders) 51-0 and 51-1, the received signals are separated into a signal component sent from the transmitter antennas #0 and #2 and a signal component sent from the transmitter antennas #1 and #3 by use of the replicas of the above mentioned orthogonal codes #0 and #1.

Figure 4:
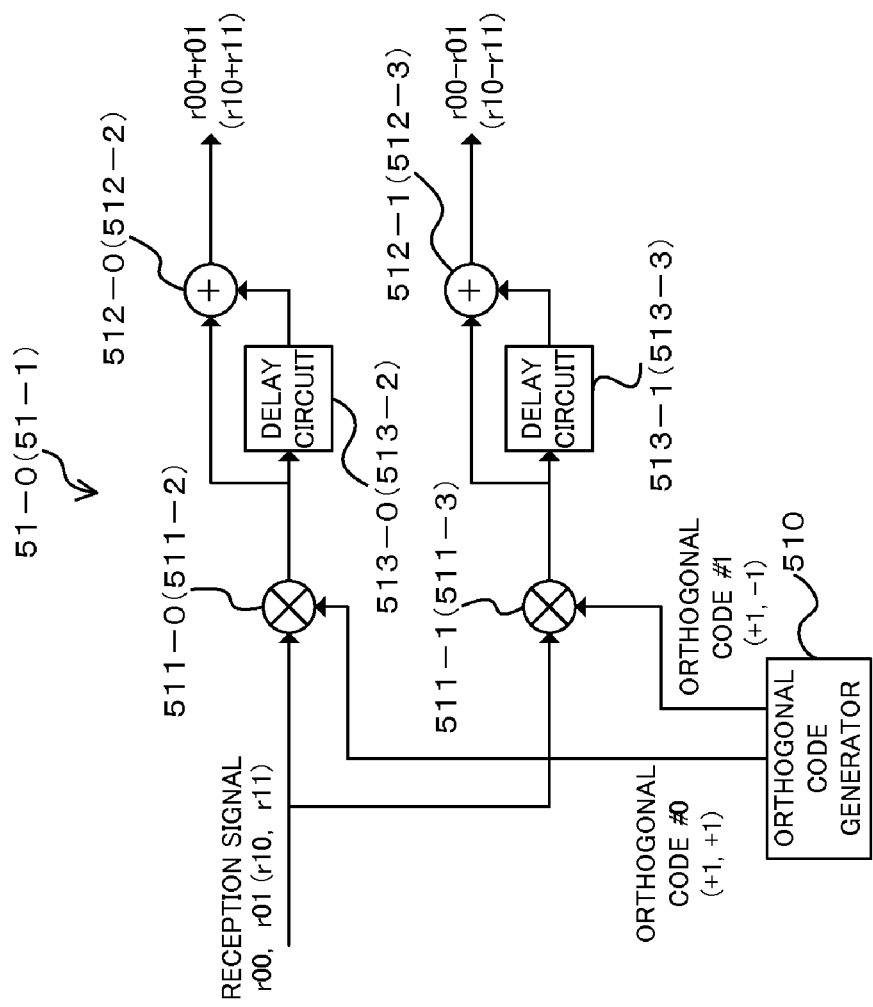
FIG. 4 is a block diagram illustrating an example of a construction of a decoder depicted in FIG. 2.

As illustrated in FIG. 4, for example, the multipliers 511-0 and 511-1 (511-2 and 511-3) multiply the signal sequence r00, r01 (r10, r11) received through the receiver antenna #0 (#1) by the replicas (+1, +1) and (+1, −1) of the orthogonal codes #0 and #1, generated by the orthogonal code generator 510, and the delay circuits 513-0 and 513-1 (513-2 and 513-3) and the adders 512-0 and 512-1 (512-2 and 512-3) add (integrate) the reception signal r00 (r10) and the reception signal r01 (r11) obtained at different time.

Here, one of the reception signal (symbol) series is multiplied by a pattern of (+1, −1) as the orthogonal code #1 per two-symbol time unit, and thus, one of the adders 512-0 (512-2) resultantly obtains the sum of the signal r00 (r10) received at the time of t=0 and the signal r01 (r11) received at the time of t=1, and the other (second) adder 512-1 (512-3) resultantly obtains a difference therebetween.

Therefore, the result of separation by use of the orthogonal codes #0 and #1 (replicas) can be expressed by the following formulae (5) through (8).

$$r00 + r01 = 2 \cdot h00 \cdot S00 + 2 \cdot h20 \cdot S10 \quad (5)$$

$$r00 - r01 = 2 \cdot h10 \cdot S01 + 2 \cdot h30 \cdot S11 \quad (6)$$

$$r10 + r11 = 2 \cdot h01 \cdot S00 + 2 \cdot h21 \cdot S10 \quad (7)$$

$$r10 - r11 = 2 \cdot h11 \cdot S01 + 2 \cdot h31 \cdot S11 \quad (8)$$

The pair of the above formulae (5) and (7) are equivalent to the product of the cannel matrix having the elements of the cannel values h00, h01, h20, and h21 as its elements and the transmission signal vector (S00, S10). Likewise, the pair of the above formulae (6) and (8) are equivalent to the product of the cannel matrix having the elements of the cannel values h10, h11, h30, and h31 as its elements and the transmission vector (S01, S11).

That is, the pair of the formulae (5) and (7) indicates that separation between the reception symbol S00 and the reception symbol S10 is available by use of the MIMO signal separation scheme; the pair of the formulae (6) and (8) indicates that separation between the reception symbol S01 and the reception symbol S11 is available by use of the same scheme based on the pair of the formulae (5) and (7).

Hence, the symbol separator 52-0 is capable of performing separation between the symbol S00 sent from the transmitter antenna #0 and the symbol S10 sent from the transmitter antenna #2 by use of the MIMO signal separation scheme.

Likewise, the symbol separator 52-1 is capable of performing separation between the symbol S01 sent from the transmitter antenna #1 and the symbol S11 sent from the transmitter antenna #3 by use of the MIMO signal separation scheme.

As examples of such MIMO signal separation schemes (algorithms), it is possible to apply the signal separation methods that are based on the channel (propagation path) estimation matrix, such as the Minimum Mean Square Error (MMSE) scheme, the Maximum Likelihood Detection (MLD) scheme, and the Successive Interference Canceller (SIC) scheme. A channel estimation matrix (channel estimation value) is capable of being obtained based on an already known reception signal such a pilot signal. These matters go for in the following descriptions.

Further, each of the terms of the right-hand side of the formulae (5) through (8) that expresses the result of orthogonal separation is multiplied by a constant number larger than "1" (=2), so that improvement of the reception characteristic feature (for example, SNR) due to a transmission diversity by about 3 dB can be logically expected.

With such an arrangement, in the transmission apparatus 10, more than one transmission stream is subjected to orthogonalization processing and is then sent from more than one transmitter antenna, while in the reception apparatus 50, the reception signals are subjected to the orthogonal separation processing corresponding to the orthogonalization processing, a reception signal from which a MIMO signal can be separated being thereby obtained. This makes it possible to improve the reception characteristic feature (SNR) due to the transmission diversity before MIMO signal separation without relying on beam forming.

Further, because of not being relying on such beam forming, the necessities of a calibration function, a channel measurement function, a feedback channel, or the like can be eliminated, so that the transmission apparatus 10 and the reception apparatus 50 is capable being down-sized. Yet further, even in a case where the reception apparatus 50, which is realized as a wireless communications terminal or the like, moves, it is unnecessary for the transmission apparatus 10 to perform beam forming control to follow the movement of the terminal.

Still further, since there is no wireless wave directivity due to beam forming, the technique is applicable with ease to channel performing transmission toward more than one reception apparatus 50, such as a shared channel and a broadcast channel. Thus, as will be described later in the third embodiment, as to the shared channel and the broadcast channel, it is possible to select a communications scheme suitable for channel characteristics or the like: for example, transmission by beam forming performed for individual channels; transmission by use of the above described orthogonalization processing performed for a shared channel and a broadcast channel. As a result, improvement of the channel quality and increase in channel capacity are available.

Hereinafter, a description will be made of a more detailed example. In this instance, in the practical example described below, also, the number of transmitter antennas is four (#0 through #3); the number of receiver antenna is two (#0 and #1); the number of streams is two (#0 and #1). However, as a matter of course, the numbers should by no means be limited to those.

(A2) PRACTICAL EXAMPLE 2

Figure 5:
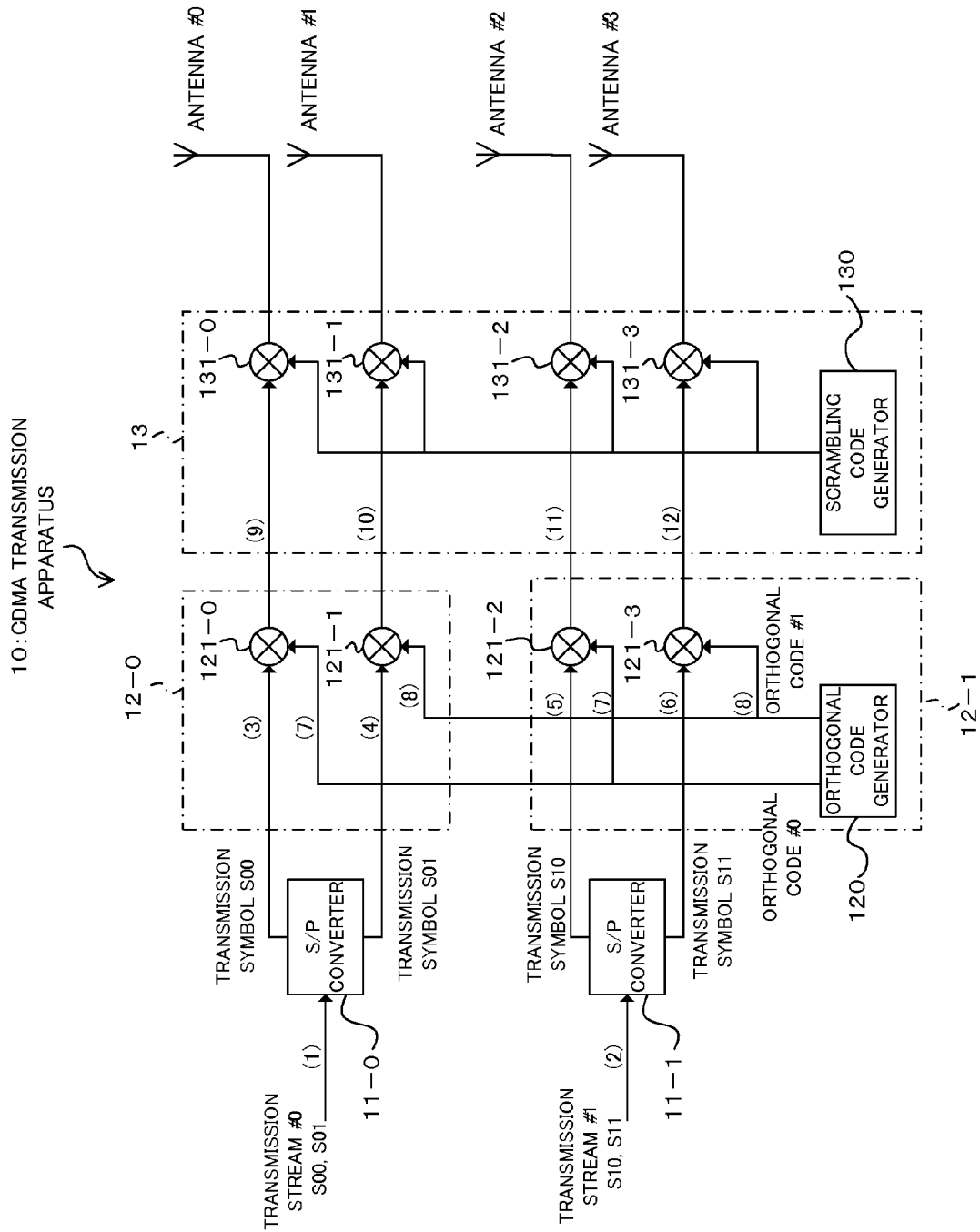
FIG. 5 is a block diagram illustrating an example of a construction of a CDM transmission apparatus utilizing the orthogonality (orthogonal codes) of the codes relating to the practical example 2.
Figure 7:
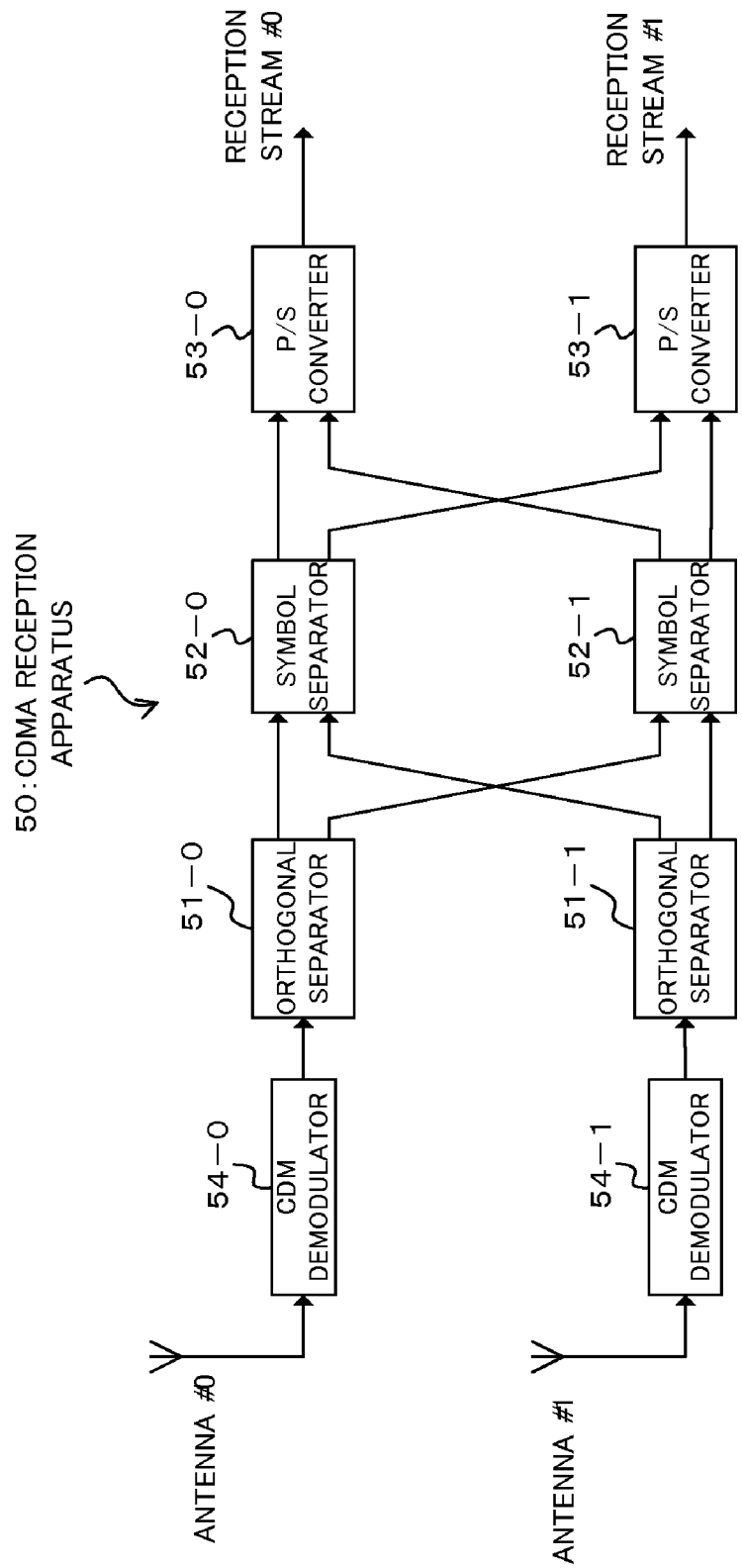
FIG. 7 is a diagram illustrating an example of a construction of a CDM reception apparatus that receives a signal sent from the CDM transmission apparatus depicted in FIG. 5.

FIG. 5 is a block diagram illustrating an example of a construction of a Code Division Multiplexing (CDM) transmission apparatus utilizing the orthogonality (orthogonal codes) of the codes as an example of the above described orthogonalization processing. Further, FIG. 7 is a diagram illustrating an example of a construction of a CDM reception apparatus 50 that receives a signal sent from the CDM transmission apparatus 10 depicted in FIG. 5.

(CDM Transmission Apparatus 10)

The CDM transmission apparatus 10 depicted in FIG. 5 includes, for example: the S/P converters 11-0 and 11-1 corresponding to the two transmission streams #0 and #1; an orthogonal code generator 120 used as an example of the orthogonalization processors 12-0 and 12-1; and the multipliers (orthogonal code multipliers) 121-0, 121-1, 121-2, and 121-3 corresponding to the four symbol series having been subjected to the S/P conversion. Further, the CDM transmission apparatus 10 also includes a dispersion processor 13 that multiplies each of the signal sequence having been subjected to the orthogonalization processing by a scrambling code. Thus, this dispersion processor 13 includes, for example: a scrambling code generator 130; the multipliers 131-0, 131-1, 131-2, and 131-3 corresponding to the above mentioned four symbol series.

In this instance, in the present example, also, the orthogonal code generator 120 can be separately provided for each of the orthogonalization processors 12-0 and 12-1, or for either of those as a shared one. In FIG. 5, as an example, the orthogonal code generator 120 is provided for the orthogonalization processor 12-1. In the CDM transmission apparatus 10 exemplified in FIG. 5, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

In the CDM transmission apparatus 10 with the above described arrangement, the transmission stream #0 (S00, S01) is converted by the S/P converter 11-0 into parallel signals and becomes the symbol series #0 and #1; the transmission stream #1 (S10, S11) is converted by the S/P converter 11-1 into parallel signals and becomes the symbol series #2 and #3.

Each symbol series #i (i=0 through 3) is multiplied by such an orthogonal code as a Walsh code generated by the orthogonal code generator 120 by means of the orthogonal code multiplier 121-i in the orthogonalization processor 12. Here, the orthogonal codes can operate also as dispersion codes (channelization codes), and in that case, each of the symbol series #i is subjected to orthogonalization and dispersion (channelization) by means of being multiplied by orthogonal codes.

Subsequently, each symbol series #i having been subjected to the orthogonalization processing is multiplied by the scrambling code (dispersion code) generated by the scrambling code generator 130 by means of the multiplier 131-i in the dispersion processor 13, and the obtained results are sent from the corresponding transmitter antennas #i. In this instance, the scrambling code is a code used for identifying the wireless zone (cell or sector) of the CDM transmission apparatus (for example, wireless base station) 10. That is, combination of the scrambling code with the above mentioned channelization code enables specification of a cell (sector) and a channel.

Figure 6:
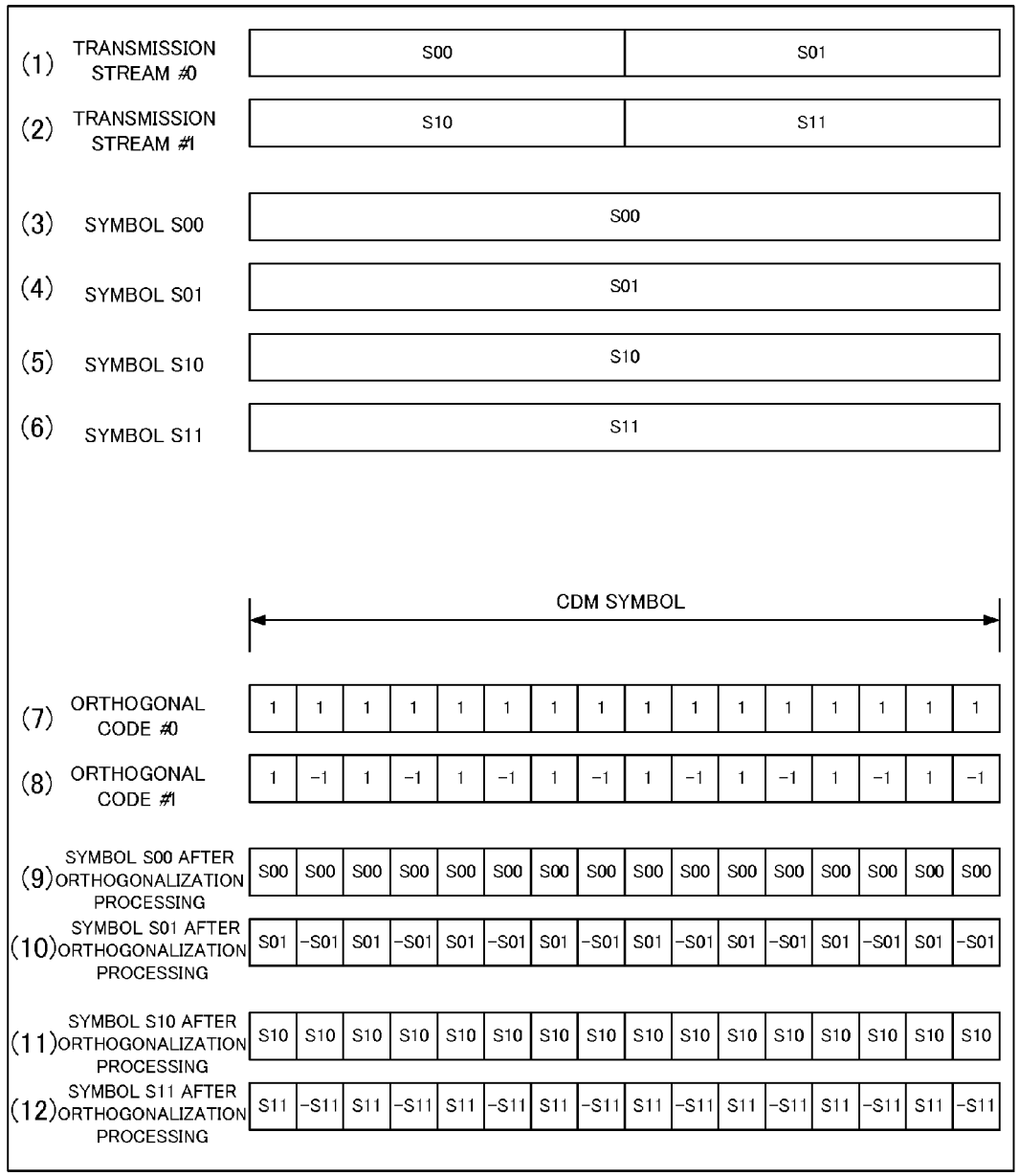
FIG. 6 is a diagram illustrating an example of a timing chart of transmission processing performed on the CDM transmission apparatus depicted in FIG. 5.

FIG. 6 is a diagram illustrating an example of a timing chart in a case where the transmission stream is spread with orthogonal coded as described above. As indicated in the items (7) and (8), this FIG. 6 exemplifies a case in which the orthogonal code #0 per CDM symbol has a chip pattern (chip rate) of (+1, +1, +1, +1, . . . ) and the orthogonal code #1 per CDM symbol has a chip pattern (chip rate) of (+1, −1, +1, −1, . . . ). In this instance, the items (1) through (12) in FIG. 6 correspond to the signals (1) through (12) in FIG. 5.

That is, the transmission stream #0 exemplified in the item (1) of FIG. 5 and FIG. 6 is subjected to S/P conversion performed by the S/P converter 11-0, thereby being made to be the signal exemplified in the items (3) and (4) of FIG. 5 and FIG. 6, and the resultant signals are input to the multipliers 121-0 and 121-1. In a like manner, the transmission stream #1 exemplified in the item (2) of FIG. 5 and FIG. 6 is subjected to S/P conversion performed by the S/P converter 11-1, thereby being made to be the signal exemplified in the items (5) and (6) of FIG. 5 and FIG. 6, and the resultant signals are input to the multipliers 121-2 and 121-3.

Then, the signals (S00, S01) exemplified in the items (3) and (4) of FIG. 5 and FIG. 6 are multiplied by the orthogonal codes #0 and #1 having the chip pattern exemplified in the items (7) and (8) of FIG. 6 by means of the multipliers 121-0 and 121-1, respectively, thereby being orthogonalized, and becomes the signals exemplified in the items (9) and (10) of FIG. 6.

Likewise, the signals (S10, S11) exemplified in the items (5) and (6) of FIG. 5 and FIG. 6 are multiplied by the orthogonal codes #0 and #1 having the chip pattern exemplified in the items (7) and (8) of FIG. 6 by means of the multipliers 121-2 and 121-3, respectively, thereby being orthogonalized, and becomes the signals exemplified in the items (11) and (12) of FIG. 6.

Then, the signals exemplified in the items (9) through (12) of FIG. 5 and FIG. 6 are multiplied by a scrambling code generated by the scrambling code generator 130 by means of the multiplier 131-$i$, and the resultant signal is sent from the transmitter antenna #i.

(CDM Reception Apparatus 50)

On the other hand, the CDM reception apparatus 50 depicted in FIG. 7 includes, for example: two receiver antennas #0 and #1; the CDM demodulators 54-0 and 54-1 corresponding to the above receiver antennas #0 and #1, respectively; orthogonal separators 51-0 and 51-1; symbol separators 52-0 and 52-1; and P/S converters 53-0 and 53-1.

In the CDM reception apparatus 50 exemplified in FIG. 7, also, some (reception unit) of the blocks relating to reception processing, including: low-noise amplifiers, which perform low-noise amplification of the wireless signals received through the receiver antennas #0 and #1; frequency converters, which perform frequency conversion (down-conversion) of the wireless signals so as to have baseband frequencies; and AD converters, which convert the baseband signals into the digital signals, are omitted from the illustration thereof for the sake of convenience. Further, the constructions of the orthogonal separators (decoders) 51-0 and 51-1 can be the same as or similar to those exemplified in FIG. 4.

Figure 8:
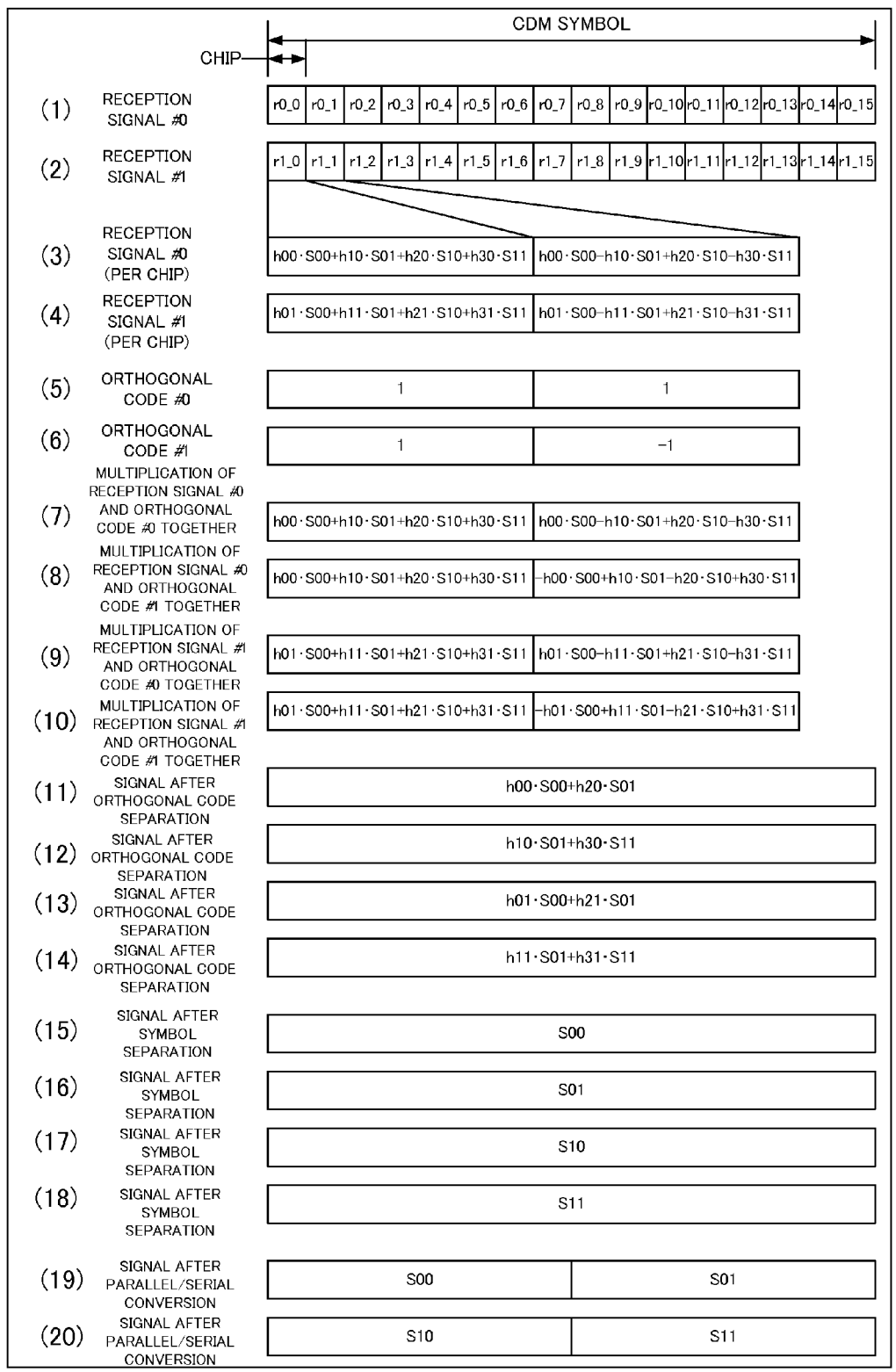
FIG. 8 is a diagram illustrating an example of a timing chart indicating reception processing performed on the CDM reception apparatus depicted in FIG. 7.

In the CDM reception apparatus 50 according to the present example, the signal received through the receiver antenna #0 is inversely spread (demodulated) in the CDM demodulator 54-0 by use of the replica (chip pattern) of the above mentioned scrambling code, and the resultant signal is input to the orthogonal separator 51-0 as a reception signal #0 of the chip series exemplified in the item (1) of FIG. 8.

Likewise, the signal received through the reception antenna #1 is inversely spread (demodulated) in the CDM demodulator 54-1 by use of the replica (chip pattern) of the above mentioned scrambling code, and the resultant signal is input to the orthogonal separator 51-1 as the reception signal #1 of the chip series exemplified in the item (2) of FIG. 8.

In this instance, in the items (1) and (2) of FIG. 8, $r_{jk}$ (j=0 or 1, k=0, 1, 2, . . . ) indicates a signal of a chip series and means a signal received by the reception antenna #j at the time t=k.

Here, as illustrated in the items (3) and (4) of FIG. 8, the signal of each chip includes the signal sent from each transmission antenna #i of the CDM transmission apparatus 10. That is, for example, as indicated in the item (3) of FIG. 8, the chip signal r00 is expressed by the above described formula (1), and the chip signal r01 is expressed by the above describe formula (2). Likewise, as indicated in the item (4) of FIG. 8, the chip signal r10 is expressed by the above described formula (3), and the chip signal r11 is expressed by the above described formula (4).

As exemplified in FIG. 4, each of these chip signals is multiplied by the replicas of the orthogonal codes #0 and #1 in the orthogonal separators 51-0 and 51-1, and is separated into the signal sent from the transmitter antennas #0 and #2 and the signal sent from the transmitter antennas #1 and #3.

For example, the chip signals r00 and r01 of the reception signal #0 are multiplied by the replica of the orthogonal code #0 at the chip cycle (+1, +1, +1, +1, . . . ) exemplified in the item (5) of FIG. 8 and the replica of the orthogonal code #1 at the chip cycle (+1, −1, +1, −1, . . . ) exemplified in the item (6) of FIG. 8, respectively, in the multipliers 511-0 and 511-1.

Likewise, the chip signals r10 and r11 of the reception signal #1 are multiplied by the replica of the orthogonal code #0 at the chip cycle (+1, +1, +1, +1, . . . ) exemplified in the item (5) of FIG. 8 and the replica of the orthogonal code #1 at the chip cycle (+1, −1, +1, −1, . . . ) exemplified in the item (6) of FIG. 8, respectively, in the multipliers 511-2 and 511-3.

As a result, the signals obtained after the multiplication become the signals indicated in the items (7), (8), (9), and (10) of FIG. 8. Then, these signals are multiplied by the signals deviated by one-chip timing for one symbol by the delay circuit 513-i, thereby being made to be the signals exemplified in the items (11), (12), (13), and (14) of FIG. 8, that is, the signals expressed by the above described formulae (5), (6), (7), and (8). This processing is similar to code multiplexing with the CDMA (Code Division Multiple Access) scheme.

Subsequently, the pairs (r00+r01 and r10+r11) of signals expressed by the above described formulae (5) and (7) are input to the first symbol separator 52-0; the pairs (r00−r01 and r10−r11) of signals expressed by the above described formulae (6) and (8) are input to the second symbol separator 52-1.

Then, the symbol separator 52-0 performs MIMO signal separation by symbol unit based on the channel matrix having h00, h01, h20, and h21 as the elements thereof and the transmission signal vector (S00, S10). Likewise, the symbol separator 52-1 performs MIMO signal separation by symbol unit based on the channel matrix having h10, h11, h30, and h31 as the elements thereof and the transmission signal vector (S01, S11).

That is, as exemplified in the items (15) and (16) of FIG. 8, the reception symbol S00 and the reception symbol S01 are separated from the pair of the formulae (5) and (7); as exemplified in the items (17) and (18) of FIG. 8, and the reception symbol S10 and the reception symbol S11 are separated from the pair of the formulae (6) and (8).

After that, the reception symbol S00 and the reception symbol S01 having been separated are input to the first P/S converter 53-0 to be subjected to P/S conversion into the reception stream #0 corresponding to the transmission stream #0 in such a manner as is exemplified in the item (19) of FIG. 8. Likewise, the reception symbol S10 and the reception symbol S11 remained after the separation are input to the second P/S converter 53-1, and subjected to P/S conversion into the reception stream #1 corresponding to the transmission stream #1 as exemplified in the item (20) of FIG. 8.

(A3) PRACTICAL EXAMPLE 3

Next, as examples of the above mentioned orthogonalization processing and the orthogonal separation processing, a description will be made hereinbelow of a case in which the orthogonality of the frequencies (sub-carriers) in the wireless communication system when the OFDM (or OFDMA) scheme is utilized.

Figure 9:
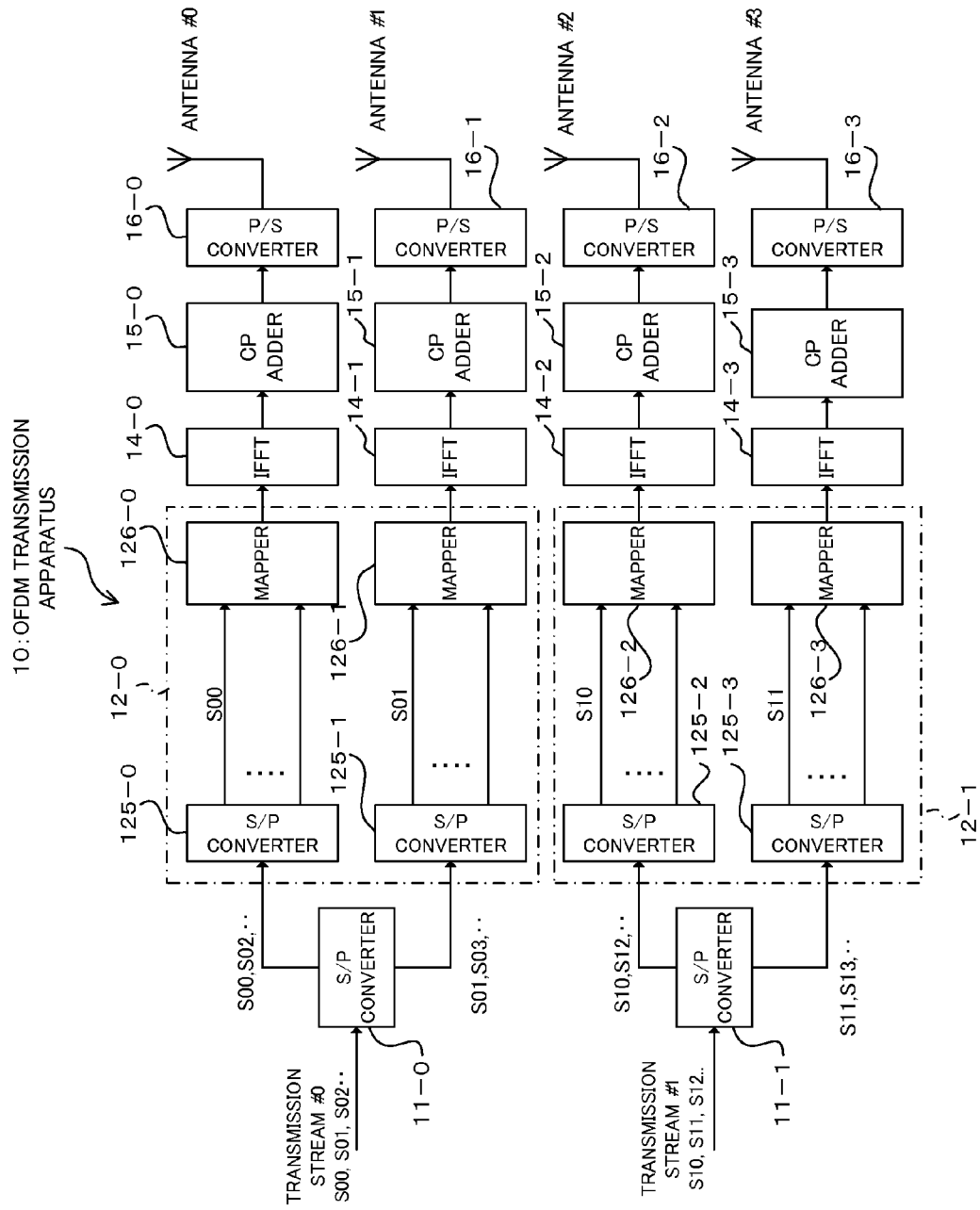
FIG. 9 is a block diagram illustrating an example of a construction of an OFDM transmission apparatus utilizing the orthogonality of frequencies relating to a third practical example of FIG. 9.
Figure 11:
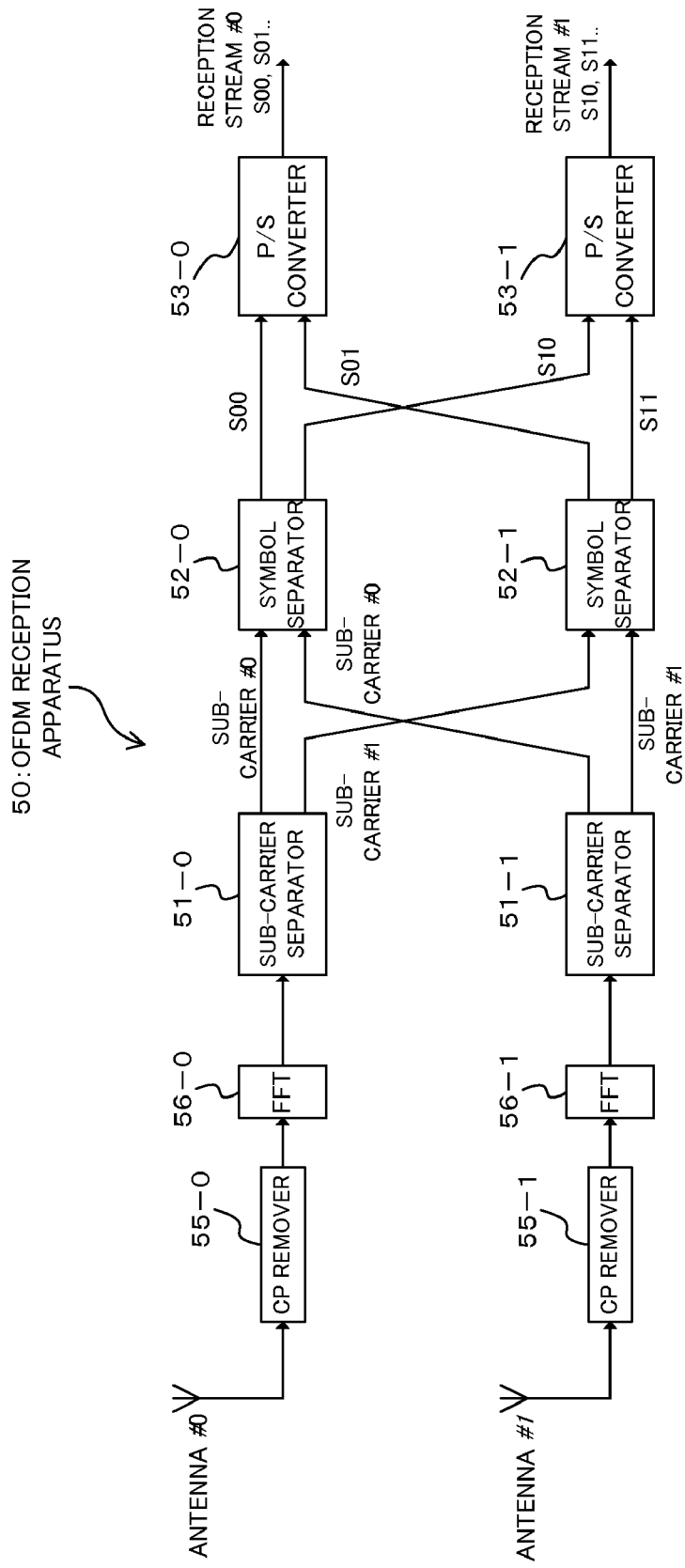
FIG. 11 is a block diagram illustrating an example of a construction of an OFDM reception apparatus that receives signals sent from the OFDM transmission apparatus depicted in FIG. 9.

FIG. 9 is a block diagram illustrating an example of a construction of an OFDM transmission apparatus utilizing the orthogonality of frequencies; FIG. 11 is a block diagram illustrating an example of a construction of an OFDM reception apparatus 50 that receives signals sent from the OFDM transmission apparatus 10 depicted in FIG. 9.

(OFDM Transmission Apparatus 10)

The OFDM transmission apparatus 10 depicted in FIG. 9 includes, for example: four transmitter antennas #0, #1, #2, and #3; the S/P converters 11-0 and 11-1 for the transmission streams #0 and #1, respectively. The OFDM transmission apparatus 10 further has mapping processors each used as examples of the above mentioned orthogonalization processors 12-0 and 12-1, respectively. Yet further, the mapping processor 12-0 has the S/P converters 125-0 and 125-1and the mappers 126-0 and 126-1, and the mapping processor 12-1 includes: the S/P converters 125-2 and 125-3; and the mappers 126-2 and 126-3. Still further, the transmission apparatus 10 includes: the Inverse Fast Fourier Transformers (IFFTs) 14-0, 14-1, 14-2, and 14-3; the cyclic prefix (CP) adders 15-0, 15-1, 15-2, and 15-3; and the P/S converters 16-0, 16-1, 16-2, and 16-3.

In this instance, in the OFDM transmission apparatus 10 exemplified in FIG. 9, some (transmission unit) of the blocks relating to transmission processing, including: DA converters, which convert the transmission signals (symbol series) into the analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

In the OFDM transmission apparatus 10 of the present example, the transmission streams #0 and #1 each are converted into two symbol series in the corresponding S/P converters 11-0 and 11-1, respectively.

Here, for example, it is assumed that the signal (symbol) series of the transmission stream #0 is S00, S01, S02, . . . , and that the signal (symbol) series of the transmission stream #1 is S10, S11, S12, . . . . In this case, when being subjected to S/P conversion in the S/P converter 11-0, the transmission stream #0 is converted (divided) into the first symbol series S00, S02, . . . and the second symbol series S01, S03, . . . . The first symbol series is input to the S/P converter 125-0 of the orthogonalization processor 12-0; the second symbol series is input to the S/P converter 125-1 of the mapping processor 12-0.

Similarly, when being subjected to S/P conversion performed in the S/P converter 11-1, the other transmission stream #1 is converted (divided) into the first symbol series S10, S12, . . . and the second symbol series S11, S13, . . . . The first symbol series is input to the S/P converter 125-2 of the mapping processor 12-1; the second symbol series is input to the S/P converter 125-3 of the mapping processor 12-1.

The S/P converter 125-i (i=0 through 3) further S/P converts the symbol series input thereto into the parallel number corresponding to the number of sub-carriers, and inputs the result into the mapper 126-i for each symbol. The mapper 126-i performs symbol mapping to frequencies (sub-carriers) in such a manner that the first symbol series and the second symbol series mutually have an orthogonal characteristic therebetween.

Figure 10:
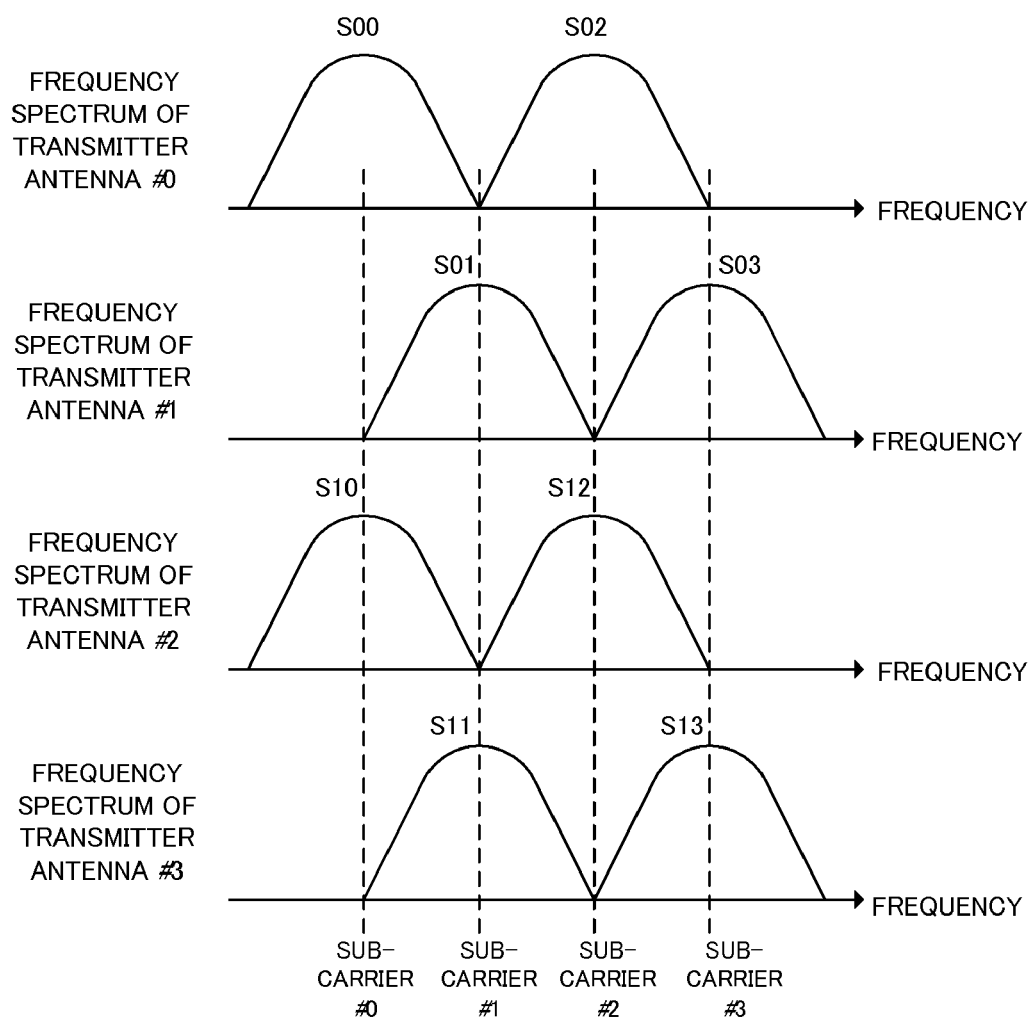
FIG. 10 is a diagram illustrating an example of sub-carrier mapping performed on the OFDM transmission apparatus depicted in FIG. 9.

FIG. 10 depicts an example of the above. In this FIG. 10, for example, the transmission symbol S00 (S02) of the transmission stream #0 is mapped to the sub-carrier #0 (#2) of the transmitter antenna #0; the transmission symbol S01 (S03) is mapped to the sub-carrier #1 (#3), which has an orthogonal characteristic in frequency with the sub-carrier #0 (#2).

Likewise, the transmission symbol S10 (S12) of the transmission stream #1 is mapped to the sub-carrier #0 (#2) of the transmitter antenna #2; the transmission symbol S11 (S13) is mapped to the sub-carrier #0 (#2), which has an orthogonal characteristic in frequency with the sub-carrier #1 (#3).

Each transmission symbol having been mapped to a sub-carrier by the mapper 126-$i$ in this manner, is converted into a time domain signal by the IFFT (frequency/time domain converter) 14-$i$. After addition of a cyclic prefix (also called a "guard interval") for the purpose of reducing the effects of multi-path interference, the time domain signal is converted into an OFDM symbol, which is then converted into a serial signal by the P/S converter 16-$i$ before being sent from the corresponding transmission antenna #$i$.

(OFDM Reception Apparatus 50)

On the other hand, the OFDM reception apparatus 50 depicted in FIG. 11 includes, for example: two receiver antennas #0 and #1; CP removers 55-0 and 55-1, and Fast Fourier Transformers (FFTs) 56-0 and 56-1 for those receiver antennas #0 and #1, respectively. This OFDM reception apparatus 50 further includes: the sub-carrier (frequency) separators serving as examples of the orthogonal separators 51-0 and 51-1; the symbol separators 52-0 and 52-1 the same as or similar to those already described; and the P/S converters 53-0 and 53-1.

In this instance, in the OFDM reception apparatus 50 exemplified in FIG. 11, also, some (reception unit) of the blocks relating to reception processing, including: low-noise amplifiers, which perform low-noise amplification of the wireless signals received through the receiver antennas #0 and #1; frequency converters, which perform frequency conversion (down-conversion) of the wireless signals so as to have baseband frequencies; and AD converters, which convert the baseband signals into digital signals, are omitted from the illustration thereof for the sake of convenience.

In such OFDM reception apparatus 50, the CP is removed in the time domain from the signals (OFDM symbols) received through the reception antennas #0 and #1 and the effective symbol series is detected by means of the corresponding CP remover 55-$j$ ($j$ expresses the number of receiver antennas; $j=0$ or 1 in the present example).

Subsequently, the effective symbol series is subjected to Fast Fourier Transformation (FFT) processing performed in the FFT 56-$j$, thereby being converted into a frequency domain signal. After that, the orthogonal separator 51-$j$ detects the symbols of the frequency component of each sub-carrier, and separates the symbols into ones mapped to the sub-carriers mutually having an orthogonal characteristic therebetween.

For example, in a case where the OFDM transmission apparatus 10 performs the symbol mapping to sub-carriers as exemplified in FIG. 10, the sub-carrier separator 51-$j$ separates the symbol series into the symbol series mapped to the sub-carrier #0 (#2) of the transmitter antennas #0 and #2 and the symbol series mapped to the sub-carrier #1 (#3) of the transmitter antennas #1 and #3.

The pair of the symbol series of the sub-carrier #0 (#2) each separated by the orthogonal separator 51-$j$ are input to the first symbol separator 52-0; the pair of the symbol series of the sub-carrier #1 (#3) is input to the second symbol separator 52-1.

The symbol separator 52-$j$ uses the MIMO signal separation scheme to perform symbol separation to the pair of the input symbol series. The symbol series having been subjected to the symbol separation are converted into a serial signal in the P/S converters 53-0 and 53-1 and is then output as the reception streams #0 and #1 corresponding to the transmission streams #0 and #1.

(A4) PRACTICAL EXAMPLE 4

Next, as examples of the above described orthogonalization processing and the orthogonal separation processing, a description will be made hereinbelow of a case in which the orthogonality of time is utilized.

Figure 12:
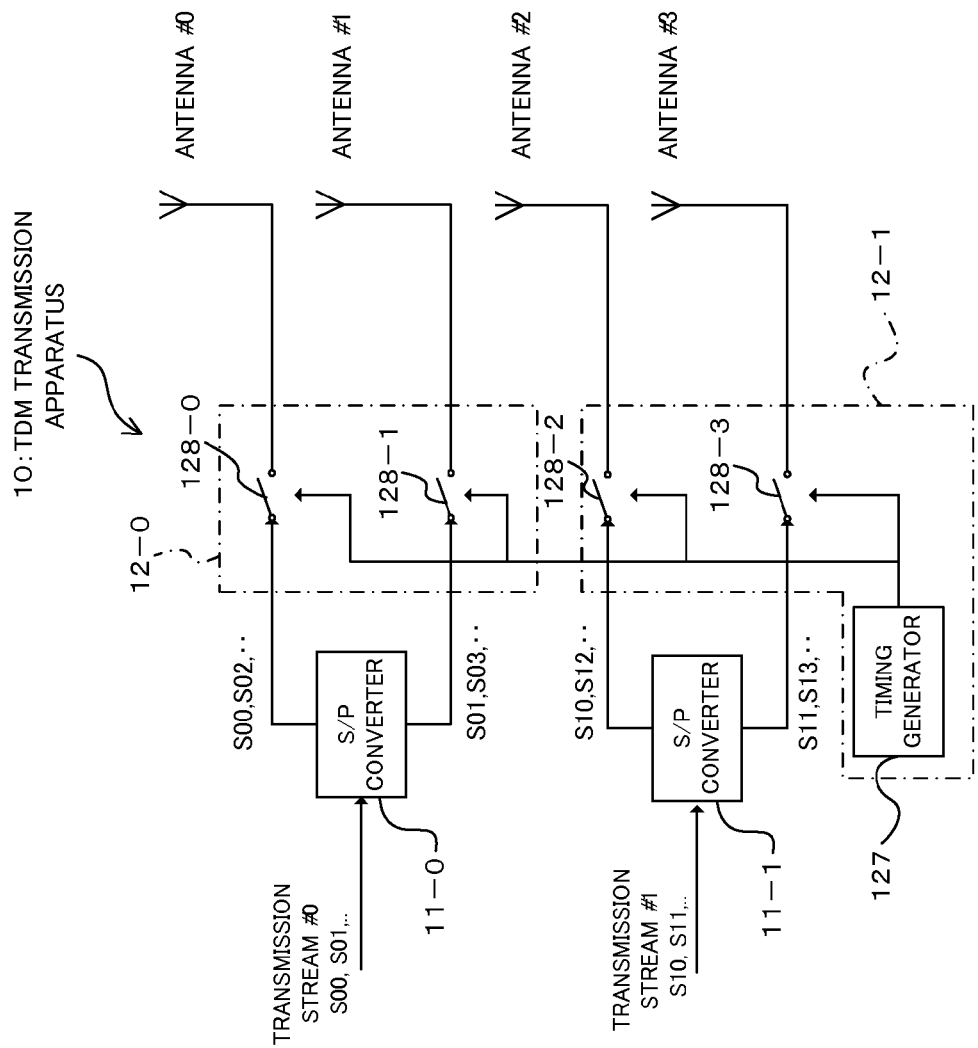
FIG. 12 is a block diagram illustrating an example of a construction of a TDM transmission apparatus utilizing the orthogonality of time relating to a fourth practical example 4.
Figure 14:
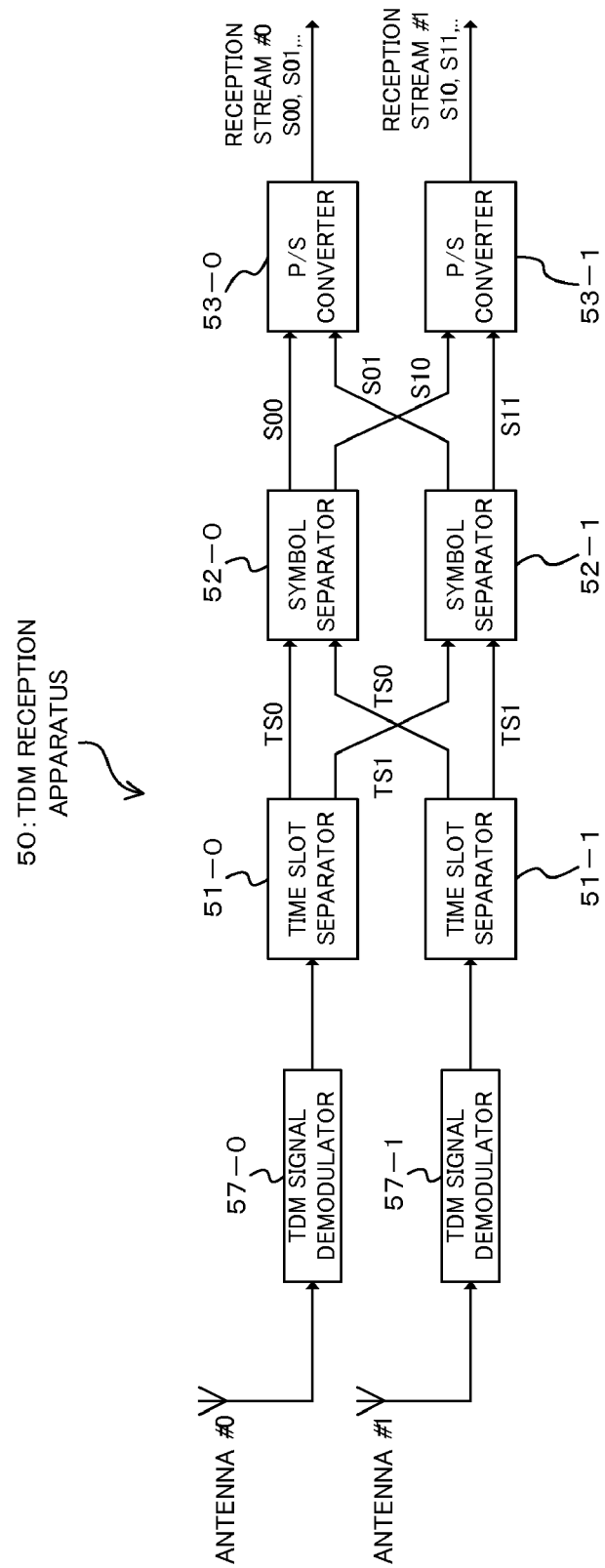
FIG. 14 is a block diagram illustrating an example of a construction of a TDM reception apparatus that receives signals sent from the TDM transmission apparatus depicted in FIG. 12.

FIG. 12 is a block diagram illustrating a construction example of a Time Division Multiplexing (TDM) transmission apparatus utilizing the orthogonality of time as an example of orthogonalization processing; FIG. 14 is a block diagram illustrating an example of a construction of the TDM reception apparatus 50 that receives the signals sent from the TDM transmission apparatus 10 depicted in FIG. 12.

(TDM Transmission Apparatus 10)

The TDM transmission apparatus 10 depicted in FIG. 12 includes, for example: four antennas #0, #1, #2, and #3; and S/P converters 11-0 and 11-1 for two transmission streams #0 and #1, respectively. Further, this TDM transmission apparatus 10 has TDM processors each used as an example of the above mentioned mapping processors 12-0 and 12-1. The TDM processor 12-0 has the TDM switches 128-0 and 128-1 corresponding to the two symbol series obtained by means of S/P conversion of the transmission stream #0 performed by the S/P converter 11-0. The TDM processor 12-1 has a timing generator 127 and the TDM switches 128-2 and 128-3 corresponding to the two symbol series obtained by S/P conversion of the transmission stream #1 performed by the S/P converter 11-1.

In this instance, the timing generator 127 can be provided for either of the TDM processors 12-0 and 12-1 as the one shared by the TDM processors 12-0 and 12-1. According to the present embodiment, the timing generator 127 is provided, for example, for the TDM processor 12-1. Further, the timing generator 127 can be separately provided for each of the TDM processors 12-0 and 12-1.

Further, in the transmission apparatus 10 exemplified in FIG. 12, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

In the TDM transmission apparatus 10 according to the present example, each of the transmission streams #0 and #1 is converted into two symbol series in the corresponding S/P converters 11-0 and 11-1.

For example, it is assumed that the signal (symbol) series of the transmission stream #0 is S00, S01, S02, . . . , and that the signal (symbol) series of the transmission stream #1 is S10, S11, S12, . . . . In this case, when being subjected to S/P conversion in the S/P converter 11-0, the transmission stream #0 is converted into the first symbol series S00, S02, . . . and the second symbol series S01, S03, . . . . The first symbol series is input to the TDM switch 128-0 of the orthogonalization processor 12-0; the second symbol series is input to the TDM switch 128-1 of the orthogonalization processor 12-0.

Likewise, when being subjected to S/P conversion performed in the S/P converter 11-1, the other transmission stream #1 is converted into the first symbol series S10, S12, . . . and the second symbol series S11, S13, . . . . The first symbol series is input to the TDM switch 128-2 of the orthogonalization processor 12-1; the second symbol series is input to the TDM switch 128-3 of the orthogonalization processor 12-1.

Figure 13:
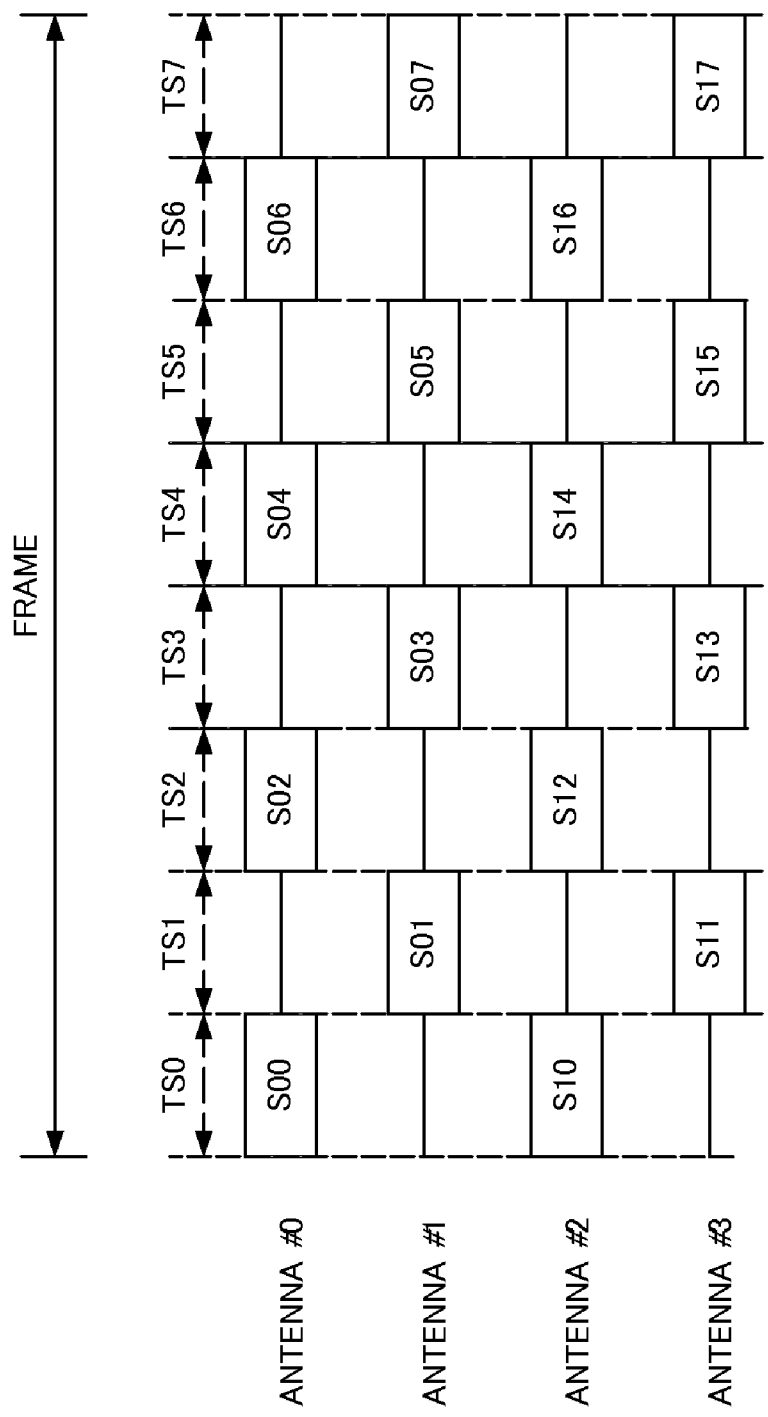
FIG. 13 is a diagram illustrating an example of transmission processing (transmission frame) performed on the TDM transmission apparatus depicted in FIG. 12.

Each of the TDM switches 128-*i* is controlled with respect to its switching operation (ON/OFF) in accordance with a control signal given from the timing generator 127. At that time, the switching operation is controlled in such a manner that the first symbol series and the second symbol series, which have a mutual orthogonal characteristic in time therebetween, are output with time slots having an orthogonal characteristic in time therebetween. FIG. 13 indicates an example of the above.

In the example of this FIG. 13, a switching operation by the TDM switches 128-0 and 128-1 is performed in such a manner that the first transmission symbol series (S00, S02, S04, S06, . . . ) of the transmission stream #0 is sent with the even-number time slots (TS0, TS2, TS4, TS6, . . . ) of the transmission stream #0; the second transmission symbol series (S01, S03, S05, S07, . . . ) of the second transmission stream #0 is sent with the uneven-number TSs (TS1, TS3, TS5, TS7, . . . ) having an orthogonal characteristic in time with the above even-number of TSs of the transmission antenna #0.

Likewise, a switching operation by the TDM switches 128-2 and 128-3 is performed in such a manner that the first transmission symbol series (S10, S12, S14, and S16, . . . ) of the transmission stream #1 is sent with the even-number TSs (TS0, TS2, TS4, TS6, . . . ) of the transmitter antenna #2; the second transmission symbol series (S11, S13, S15, and S17, . . . ) of the second transmission stream #1 is sent with the uneven-number TSs (TS1, TS3, TS5, TS7, . . . ) of the transmitter antenna #3 having an orthogonal characteristic in time with the above even-number of TSs of the transmission antennas #2.

In this instance, the rules (TS allocation rules) in the above described switching control can be appropriately changed to another allocation rules as far as the orthogonal characteristic in time between the first and the second symbol series belonging to the same transmission steam #0 or #1 is maintained.

(TDM Reception Apparatus 50)

On the other hand, the TDM reception apparatus 50 includes, for example: two receiver antennas #0 and #1; TDM signal demodulators 57-0 and 57-1 for these receiver antennas #0 and #1, respectively. This TDM reception apparatus 50 further includes: time slot (TS) separators 51-0 and 51-1 each used as, for example, the above described orthogonal separators 51-0 and 51-1; and symbol separators 52-0 and 52-1 and P/S converters 53-0 and 53-1 the same as or similar to those already described.

In this instance, in the TDM reception apparatus 50 exemplified in FIG. 14, also, some (reception unit) of the blocks relating to reception processing, including: low-noise amplifiers, which perform low-noise amplification of the wireless signals received through the receiver antennas #0 and #1; frequency converters, which perform frequency conversion (down-conversion) of the wireless signals so as to have baseband frequencies; and AD converters, which convert the baseband signals into digital signals, are omitted from the illustration thereof for the sake of convenience.

According to the reception apparatus 50, the signals received through the receiver antennas #0 and #1 are demodulated by the corresponding TDM signal demodulators 57-0 and 57-1, and then separated by the orthogonal separators 51-0 and 51-1 into the signal received from the transmitter antennas #0 and #2 and the signal received from the transmitter antennas #1 and #3 by means of utilizing the orthogonality in time (TSs with an orthogonal characteristic therebetween).

For example, in a case where the transmission streams #0 and #1 are sent from each of the transmitter antennas #0 through #4 in obedience to the TS allocation rules exemplified in FIG. 13, the time slot separator 51-*j* detects the first symbol series (the symbol series sent from the transmitter antennas #0 and #2: S00/S10, S02/S12, S04/S14, S06/S16, . . . ) sent with the even-number TSs (TS0, TS2, TS4, TS6, . . . ) and the second symbol series (the symbol series sent from the transmitter antennas #1 and #3: S01/S11, S03/S13, S05/S15, S07/S17, . . . ) sent with the uneven-number TSs (TS1, TS3, TS5, TS7, . . . ), and then separates these.

Then, the pair of the above first symbol series, which are TS detected and separated by each time slot separator 51-*j*, is input to the first symbol separator 52-0; the pair of the above second symbol series, which are TS detected and separated by each time slot separator 51-*j*, is input to the second symbol separator 52-1.

The symbol separator 52-*j* uses the MIMO signal separation scheme to perform symbol separation processing to the input symbol series pair. Then, the symbol series having been subjected to the symbol separation are converted into serial signals by the P/S converters 53-0 and 53-1, and then output as the reception streams #0 and #1 corresponding to the transmission streams #0 and #1.

(A5) PRACTICAL EXAMPLE 5

Next, a description will be made hereinbelow, as an example of the above mentioned orthogonalization processing and orthogonal separation processing, of a case in which the code orthogonality and the frequency orthogonality are used in combination.

Figure 15:
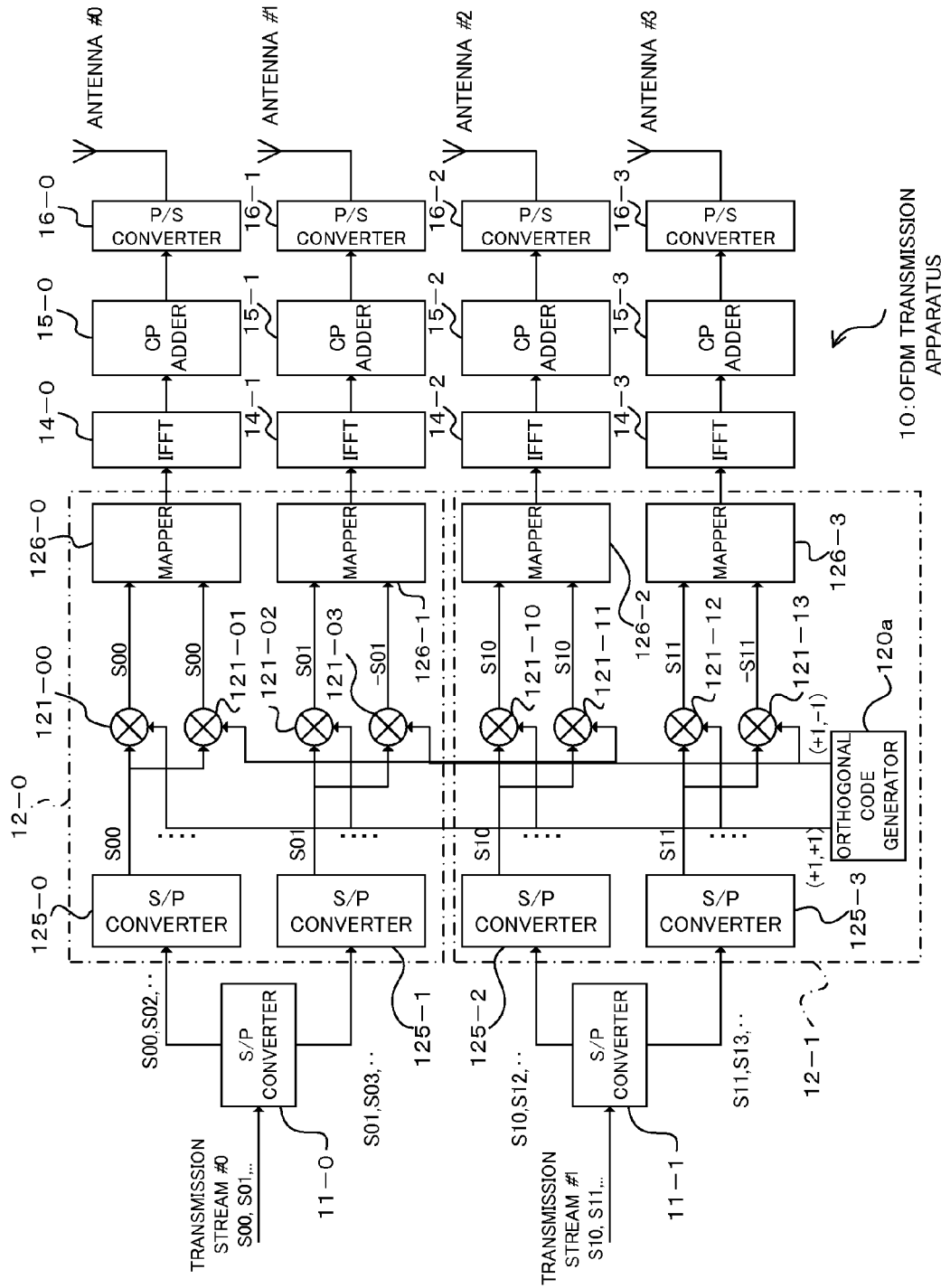
FIG. 15 is a block diagram illustrating an example of a construction of an OFDM transmission apparatus utilizing the orthogonality of codes and frequencies relating to a practical example 5.
Figure 17:
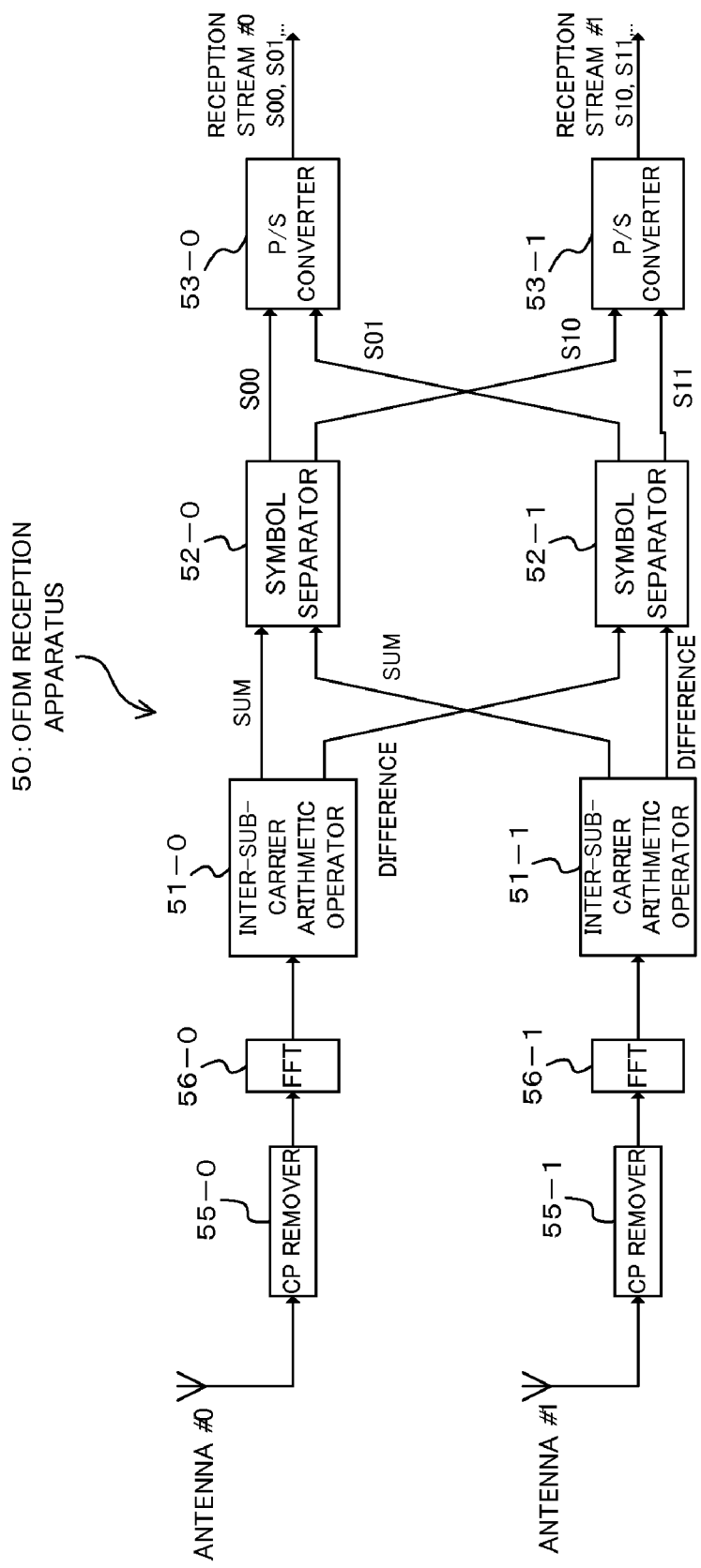
FIG. 17 is a block diagram illustrating an example of a construction of an OFDM reception apparatus that receives signals sent from the OFDM transmission apparatus exemplified in FIG. 15.

FIG. 15 is a block diagram illustrating an example of a construction of an OFDM transmission apparatus 10 utilizing the orthogonality of codes and frequencies as an example of the orthogonalization processing; FIG. 17 is a block diagram illustrating an example of a construction of an OFDM reception apparatus 50 that receives signals sent from the OFDM transmission apparatus 10 exemplified in FIG. 5.

(OFDM Transmission Apparatus 10)

The OFDM transmission apparatus 10 depicted in FIG. 15 includes, for example: four transmitter antennas #0, #1, #2, and #3; the S/P converters 11-0 and 11-1 for the two transmission streams #0 and #1, respectively. The OFDM transmission apparatus 10 further includes the mapping processors each used as examples of the orthogonalization processors 12-0 and 12-1. In addition, the mapping processor 12-0 includes, for example: S/P converters 125-0 and 125-1; multipliers (orthogonal code multipliers) 121-00, 121-01, 121-02, and 121-03; and mappers 126-0 and 126-1. The mapping processor 12-1 further includes, for example: an orthogonal code generator 120*a*; S/P converters 125-2 and 125-3; multipliers (orthogonal code multipliers) 121-10, 121-11, 121-12, and 121-13; and the mappers 126-2 and 126-3. The OFDM transmission apparatus 10 further includes the IFFTs 14-0, 14-1, 14-2, and 14-3, the CP adders 15-0, 15-1, 15-2, and 15-3, and the P/S converters 16-0, 16-1, 16-2, and 16-3, the same as or similar to those exemplified in FIG. 9.

In this instance, the orthogonal code generator 120*a* can be shared by the mapping processors 12-0 and 12-1. In that case, the orthogonal code generator 120*a* can be provided for either of the mapping processors 12-0 and 12-1. FIG. 15 exemplifies a case in which the orthogonal code generator 120a is provided for the orthogonalization processor 12-1. Here, the orthogonal code generator 120a can be separately provided for each of the orthogonalization processors 12-0 and 12-1.

Further, in the OFDM transmission apparatus 10 exemplified in FIG. 15, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to predetermined transmission power, are omitted from the illustration thereof for the sake of convenience.

In the OFDM transmission apparatus 10, the transmission streams #0 and #1 each are converted into two symbol series in the corresponding S/P converters 11-0 and 11-1.

For example, it is assumed that the signal (symbol) series of the transmission stream #0 is S00, S01, S02, . . . , and that the signal (symbol) series of the transmission stream #1 is S10, S11, S12, . . . . In this case, when being subjected to S/P conversion in the S/P converter 11-0, the transmission stream #0 is converted (divided) into the first symbol series S00, S02, . . . and the second symbol series S01, S03, . . . . The first symbol series is input to the S/P converter 125-0 of the mapping processor 12-0; the second symbol series is input to the S/P converter 125-1 of the mapping processor 12-0.

Likewise, when being subjected to S/P conversion in the S/P converter 11-1, the other transmission stream #1 is converted (divided) into the first symbol series S10, S12, . . . and the second symbol series S11 and S13. The first symbol series is input to the S/P converter 125-2 of the mapping processor 12-1; the second symbol series is input to the S/P converter 125-3 of the orthogonalization processor 12-1.

The S/P converter 125-0 performs S/P conversion of the first symbol series belonging to the input transmission stream #0 further to have the number of parallels corresponding to the number of sub-carriers, and then inputs the result to the multipliers 121-00 and 121-01 for each symbol. Likewise, the S/P converter 125-1 performs S/P conversion of the second symbol series belonging to the input transmission stream #0 further to have the number of parallels corresponding to the number of sub-carriers, and then inputs the result to the multipliers 121-02 and 121-03 for each symbol.

In addition, the S/P converter 125-2 performs S/P conversion of the first symbol series belonging to the input transmission stream #1 further to have the number of parallels corresponding to the number of sub-carriers, and then inputs the result to the multipliers 121-10 and 121-11 for each symbol. Likewise, the S/P converter 125-3 performs S/P conversion of the second symbol series belonging to the input transmission stream #1 further to have the number of parallels corresponding to the number of sub-carriers, and then inputs the result to the multipliers 121-12 and 121-13 for each symbol.

Subsequently, the multipliers 121-00, 121-02, 121-10, and 121-12 multiply the symbols input at the symbol cycles after S/P conversion by one (+1, +1) of the orthogonal codes at the symbol cycles generated by the orthogonal code generator 120a; the remaining multipliers 121-01, 121-03 and 121-11, 121-13 each multiply the above mentioned symbols by the other orthogonal code (+1, −1) of the symbol cycles generated by the orthogonal code generator 120a.

The symbols each multiplied by the orthogonal codes at the symbol cycles in the above described manner are input to the corresponding mapper 126-i (i=0 through 3), on which symbol mapping to adjacent (or neighborhood) sub-carriers (frequencies) is performed.

Figure 16:
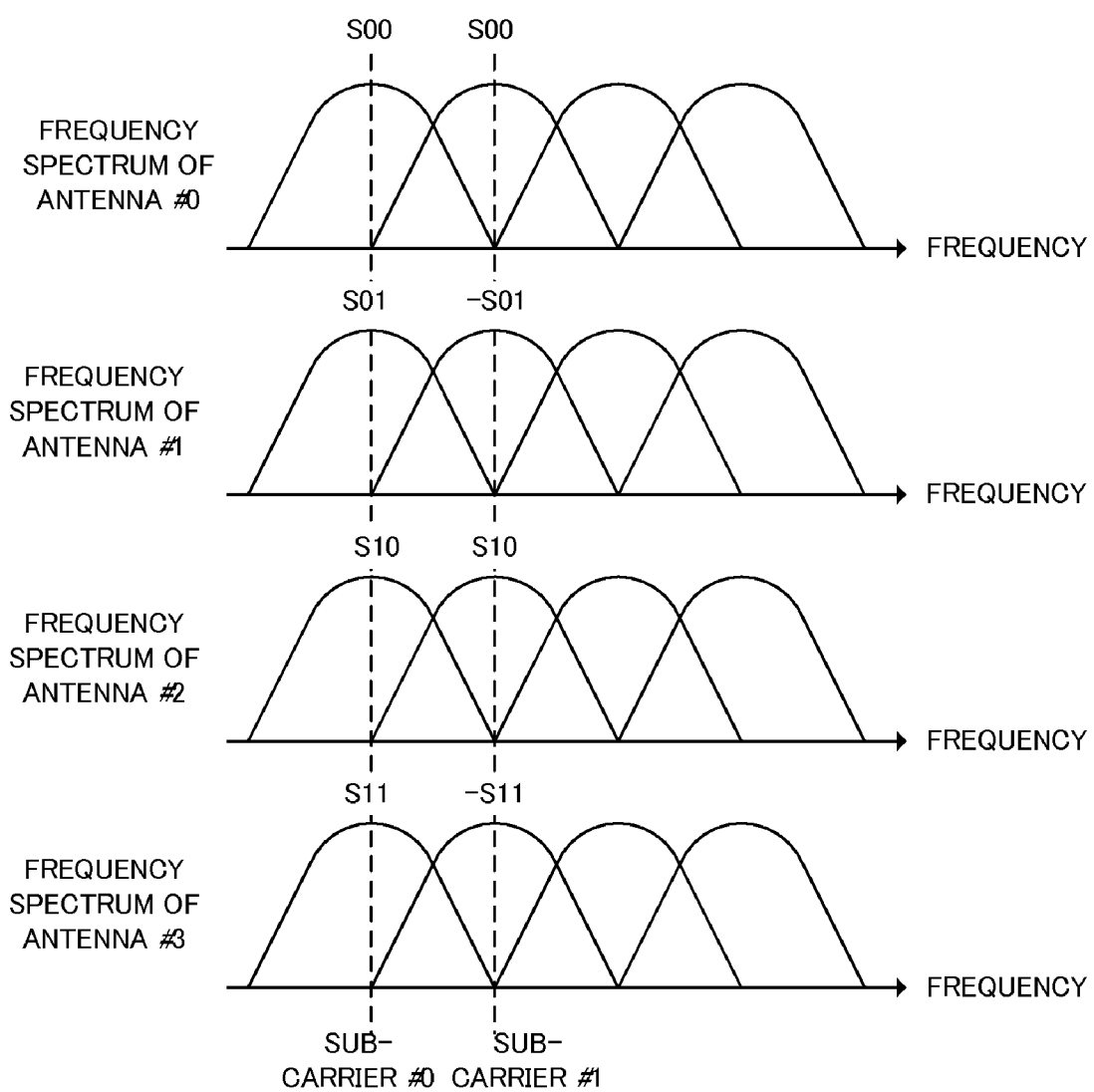
FIG. 16 is a diagram illustrating an example of sub-carrier mapping performed on an the OFDM transmission apparatus depicted in FIG. 15.

FIG. 16 indicates an example of the above. In this FIG. 16, for example, the mapper 126-0 maps the transmission symbol S00 to each of the sub-carriers #0 and #1 of the transmitter antenna #0, and the mapper 126-1 maps the transmission symbol S01 to each of the sub-carrier #0 of the transmitter antenna #1, and to the sub-carrier #1 of the transmitter antenna #1 as −S01.

Likewise, the mapper 126-2 maps the transmission symbol S10 to each of the sub-carriers #0 and #1 of the transmitter antenna #2, and the mapper 126-3 maps the transmission symbol S01 to each of the sub-carrier #0 of the transmitter antenna #3, and to the sub-carrier #1 as −S01.

In this manner, to multiply the symbol series after S/P conversion by the above mentioned orthogonal codes at the symbol cycles after the S/P conversion, makes it still possible to separate these two symbol series even if these two symbol series are mapped to the sub-carriers whose frequency spectra mutually overlap in the frequency domain, in comparison with a mapping example exemplified in FIG. 10. Therefore, it is possible to further improve the frequency usage efficiency.

In this instance, although the above described mapping example is an example of mapping to adjacent sub-carriers, it is also possible to perform the mapping to the sub-carriers that mutually separate from each other by one or two sub-carriers.

As described above, each transmission symbol mapped to a sub-carrier by the mapper 126-i, is converted into a time domain signal by the IFFT 14-i, and a CP is added thereto for the purpose of reducing the effects of multi-path interference. The above mentioned each transmission symbol is converted into a serial signal in the P/S converter 16-i. The resultantly obtained serial signal is sent from the corresponding transmitter antenna #i.

(OFDM Reception Apparatus 50)

On the other hand, the OFDM reception apparatus 50 depicted in FIG. 17 includes, for example: two receiver antennas #0 and #1; and CP removers 55-0 and 55-1; and FFTs 56-0 and 56-1 for the receiver antennas #0 and #1, respectively. This OFDM reception apparatus 50 further includes: inter-sub-carrier (frequency) arithmetic operators used as examples of the above described orthogonal separators 51-0 and 51-1, respectively; and symbol separators 52-0 and 52-1 and P/S converters 53-0 and 53-1 the same as or similar to those already described.

In this instance, the OFDM reception apparatus 50 exemplified in FIG. 17, also, some (reception unit) of the blocks relating to reception processing, including: low-noise amplifiers, which perform low-noise amplification of the wireless signals received through the receiver antennas #0 and #1; frequency converters, which perform frequency conversion (down-conversion) of the wireless signals so as to have baseband frequencies; and AD converters, which convert the baseband signals into digital signals, are omitted from the illustration thereof for the sake of convenience.

In the OFDM reception apparatus 50 of the present example, the CP remover 55-j (j indicates the number of receiver antennas; j=0 or 1 in the present example) corresponding to each of the signals (OFDM symbols) received through the receiver antennas #0 and #1, respectively, removes the CP in the time domain, and detects the effective symbol series.

Subsequently, the FFT 56-j performs FFT processing to the effective symbol series, thereby converting the symbol series into frequency domain signals. After that, the inter-sub-carrier arithmetic operator 51-j separates the frequency domain signals into the signals sent from the transmitter antennas #0 and #2 and the signals sent from the transmitter antennas #1 and #3.

For example, when symbol mapping to the sub-carriers #0 and #1 is performed in the transmission apparatus 10 as exemplified in FIG. 16, the inter-sub-carrier arithmetic operator 51-$j$ obtains the sum of the symbol mapped to the sub-carrier #0 and the symbol mapped to the sub-carrier #1 at symbol cycles, thereby detecting and separating the symbol series (S00 and S10) each mapped to the sub-carriers #0 and #1 of the transmitter antennas #0 and #2, respectively.

Further, the inter-sub-carrier arithmetic operator 51-$j$ obtains a difference between the symbol mapped to the sub-carrier #0 and the symbol mapped to the sub-carrier #1, thereby detecting and separating the symbol series (S01 and S11) each mapped to the sub-carriers #0 and #1 of the transmitter antennas #1 and #3, respectively.

Then, the pair of the symbol series (S00 and S10) from the transmitter antennas #0 and #2 separated by means of obtaining the sum therebetween in the inter-sub-carrier arithmetic operator 51-$j$ as described above are input to the first symbol separator 52-0; the pair of the symbol series (S01 and S11) from the transmitter antennas #1 and #3 separated by means of obtaining a difference therebetween are input to the second symbol separator 52-1.

The symbol separator 52-$j$ uses the MIMO signal separation scheme to perform symbol separation of the input symbol series pairs. Each of the symbol series having been subjected to the symbol separation is converted into serial signals by the P/S converters 53-0 and 53-1 and the serial signals are then output as the reception streams #0 and #1 corresponding to the transmission streams #0 and #1.

(A6) PRACTICAL EXAMPLE 6

Next, as examples of the above described orthogonalization processing and the orthogonal separation processing, a description will be made hereinbelow of a case in which the orthogonality of codes and the orthogonality of time are used in combination.

Figure 18:
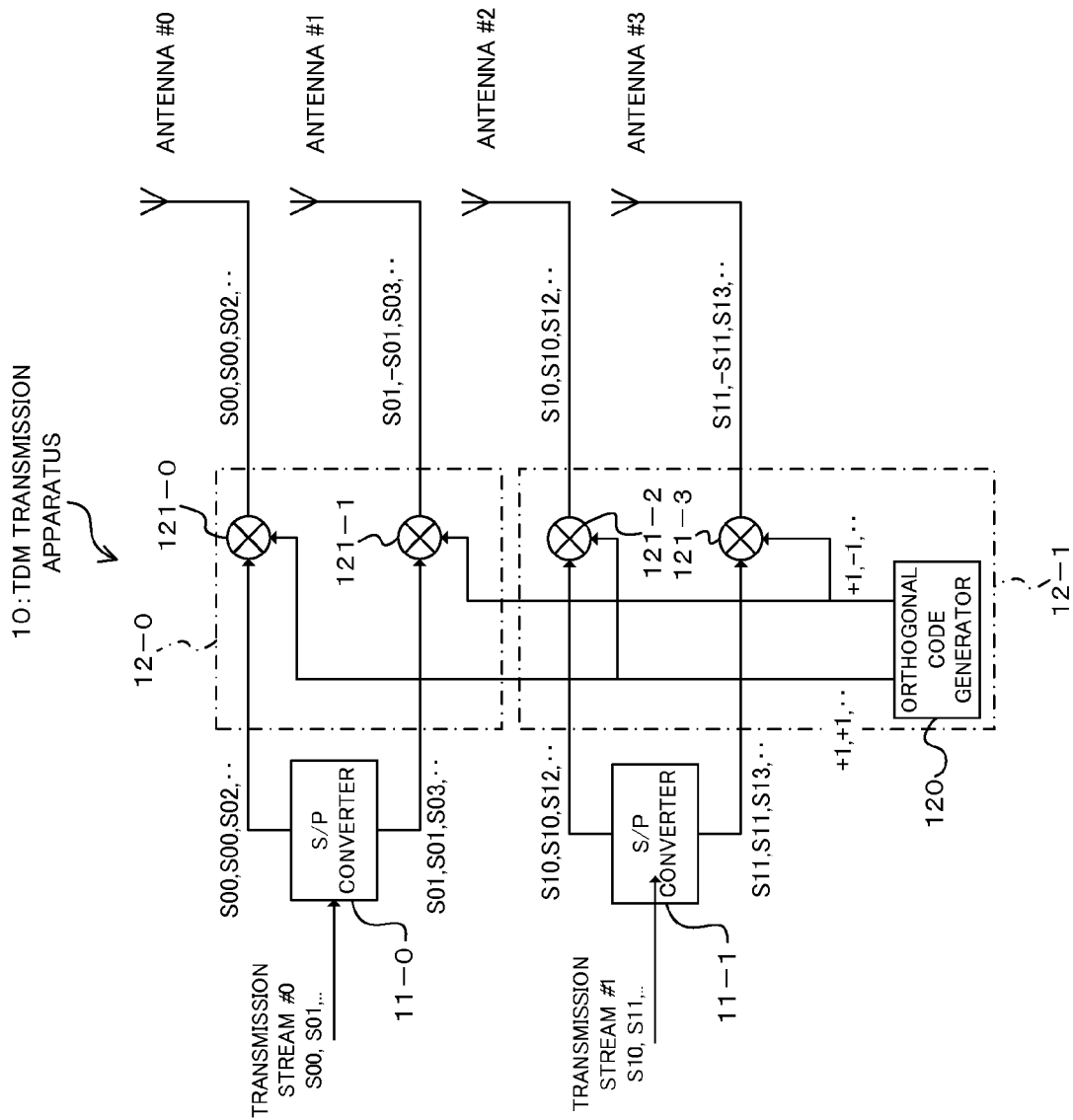
FIG. 18 is a block diagram illustrating an example of a construction of a TDM transmission apparatus utilizing the orthogonality of codes and time relating to a sixth practical example.
Figure 20:
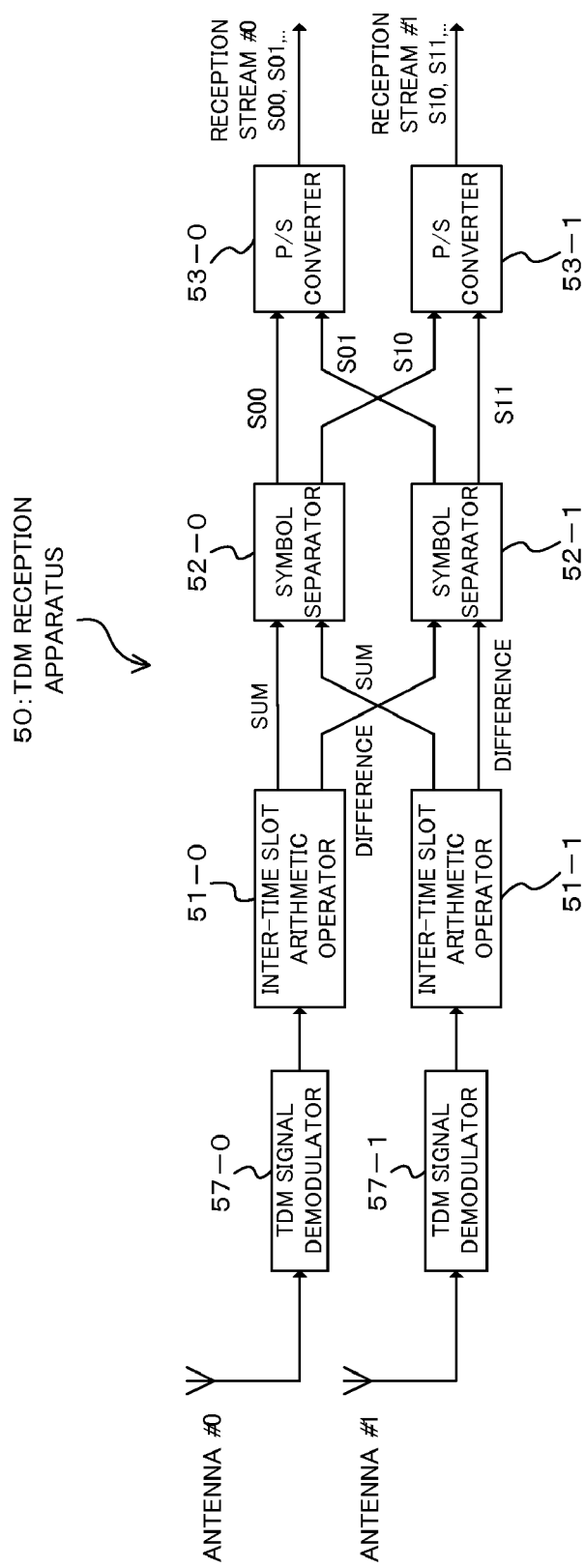
FIG. 20 is a block diagram illustrating an example of a construction of a TDM reception apparatus that receives signals sent from the TDM transmission apparatus depicted in FIG. 18.

FIG. 18 is a block diagram illustrating an example of a construction of a TDM transmission apparatus 10 utilizing the orthogonality of codes and time. FIG. 20 is a block diagram illustrating an example of a construction of a TDM reception apparatus 50 that receives signals sent from the TDM transmission apparatus 10 depicted in FIG. 18.

(TDM Transmission Apparatus 10)

The TDM transmission apparatus 10 depicted in FIG. 18 includes, for example: four transmitter antennas #0 through #3; S/P converters 11-0 and 11-1 for the two transmission streams #0 and #2, respectively. The TDM transmission apparatus 10 further includes encoders used as examples of the above described orthogonalization processors 12-0 and 12-1. The encoder 12-0 includes, for example, the multipliers 121-0 and 121-1; the encoder 12-1 includes, for example, the orthogonal code generator 120 and the multipliers 121-2 and 121-3.

In this instance, the orthogonal code generator 120 can be provided either of the encoders 12-0 and 12-1 as a shared one between the encoders 12-0 and 12-1. In the present example, for example, the orthogonal code generator 120 is provided for the orthogonalization processor 12-1. Here, such an orthogonal code generator 120 can also be provided separately for each of the encoders 12-0 and 12-1.

Further, in the TDM transmission apparatus 10 exemplified in FIG. 18, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

In the TDM transmission apparatus 10 according to the present example, each of the transmission streams #0 and #1 is converted into two symbol series by the corresponding S/P converters 11-0 and 11-1.

For example, it is assumed that the signal (symbol) series of the transmission stream #0 are S00, S01, S02, . . . , and that the signal (symbol) series of the transmission stream #1 are S10, S11, S12, . . . . In that case, after being subjected to S/P conversion performed by the S/P converter 11-0, the transmission stream #0 is converted into the first symbol series of S00, S02, . . . and the second symbol series of S01, S03, . . . . The first symbol series and the second symbol series are then input to the multiplier 121-0 of the encoder 12-0 and the multiplier 121-1 of the encoder 12-0, respectively.

Likewise, after being subjected to S/P conversion by the S/P converter 11-1, the other transmission stream #1 is converted into the first symbol series of S10, S12, . . . and the second symbol series of S11, S13, . . . . The first symbol series and the second symbol series are then input to the multiplier 121-2 of the encoder 12-1 and the multiplier 121-3 of the encoder 12-1, respectively.

Each multiplier 121-$i$ multiplies the input symbol series by the orthogonal codes given by the orthogonal code generator 120, thereby realizing the orthogonality between the first symbol series and the second symbol series. Here, the multiplier 120-$i$ multiplies the orthogonal codes at symbol cycles before the S/P conversion performed.

For example, as exampled of orthogonal coded, the orthogonal code generator 120 generates orthogonal coded having cyclic symbol patterns of (+1, +1, +1, +1, . . . ) and (+1, −1, +1, −1, . . . ). The orthogonal code generator 120 gives one (for example, the former pattern) of those to the first multipliers 120-0 and 121-2 of the encoders 12-0 and 12-1, and gives the other (for example, the latter pattern) of those to the second multipliers 121-1 and 121-3 of the encoders 12-0 and 12-1.

Therefore, as exemplified in FIG. 18, the output symbol series of the multiplier 121-0 is capable of being expressed as S00, S00, S02, S02, . . . ; the output symbol series of the multiplier 121-1 is capable of being expressed as S01, −S01, S03, −S03, . . . . Likewise, the output symbol series of the multiplier 121-2 is capable of being expressed as S10, S10, S12, S12, . . . ; the output symbol series of the multiplier 121-3 is capable of being expressed as S11, −S11, S13, −S13, . . . .

When the orthogonality is given between the symbols by means of the orthogonal codes in such a manner that the reception apparatus 50 is capable of performing appropriate separation even if symbols are allocated to adjacent (consecutive) time slots of each transmitter antenna #i, that is, even if symbols are allocated to non-transmitted (unallocated) time slots, out of the time slots exemplified, for example, in FIG. 13. As a result, it becomes possible to improve the efficiency of the usage of the time slots as an example of a wireless resource. FIG. 9 indicates an example of that.

Figure 19:
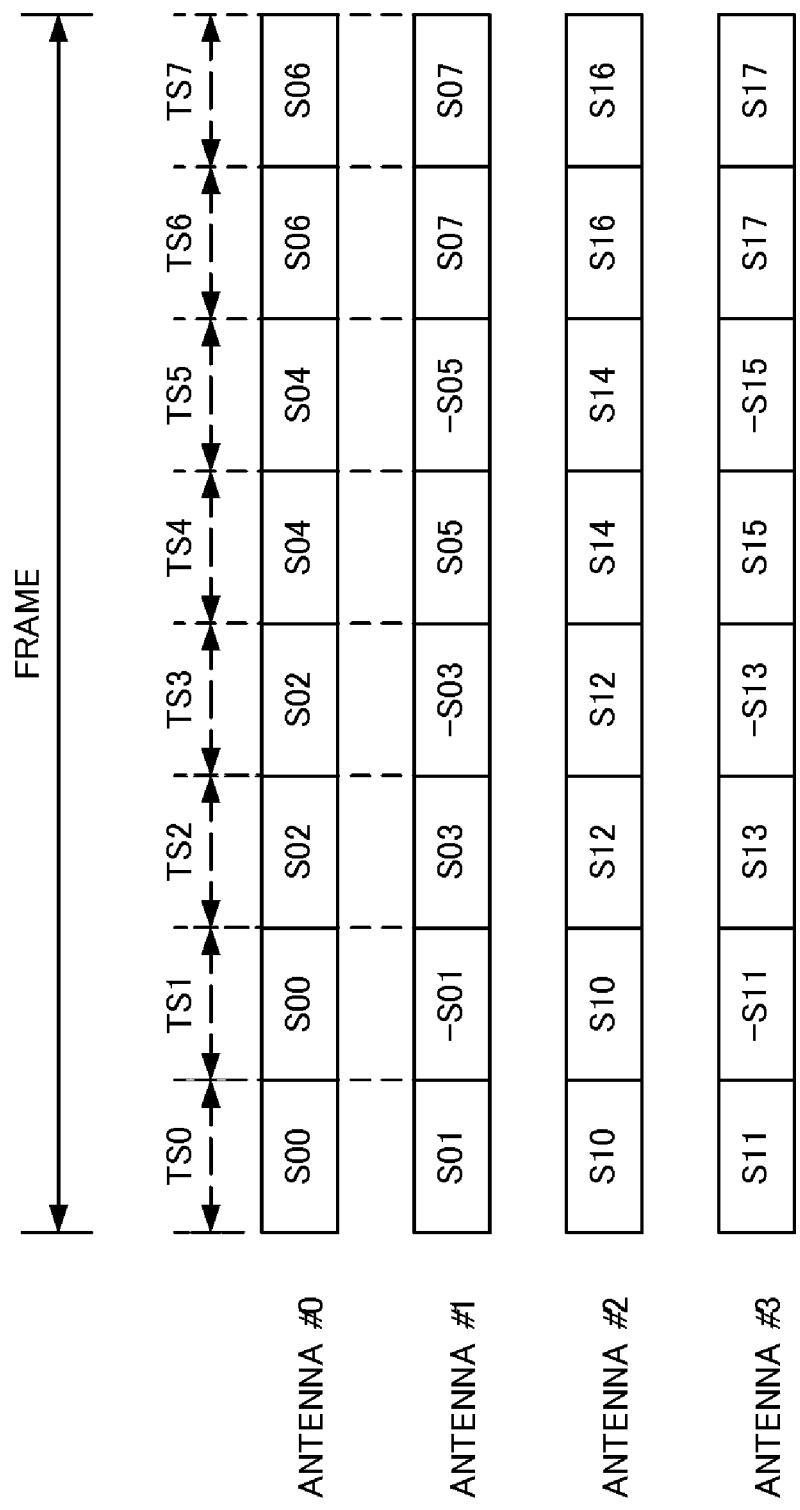
FIG. 19 is a diagram illustrating an example of a timing chart indicating transmission processing (transmission frame) performed on the TDM transmission apparatus depicted in FIG. 18.

In the example of this FIG. 19, symbol S00 belonging to the first transmission series (S00, S02, S04, S06, . . . ) of the transmission stream #0 is sent with adjacent (consecutive) two time slots (TS0 and TS1) of the transmission antenna #0; symbol S01 belonging to the second transmission series (S01, S03, S05, S07, . . . ) of the transmission stream #0 is sent with time slot (TS0), and symbol −S01 is sent with time slot (TS1), of the transmitter antenna #1.

Likewise, symbol S10 belonging to the first transmission symbol series (S10, S12, S14, S16, . . . ) of the transmission stream #1 is sent with adjacent (consecutive) two time slots (TS0 and TS1) of the transmitter antenna #2; symbol S11 belonging to the second transmission symbol series (S11, S13, S15, S17, . . . ) of the transmission stream #1 is sent with time slot (TS0), and symbol −S11 is sent with time slot (TS1), of the transmitter antenna #3.

As to the other symbols S02, S04, S06, . . . and S03, S05, S07, . . . of the transmission stream #0, transmission of those is capable of being performed by use of adjacent (consecutive) two time slots of the transmission antennas #0 and #1. As to the other symbols S12, S14, S16, . . . and S13, S15, S17, . . . of the transmission stream #1, transmission of those is capable of being performed by use of adjacent (consecutive) two time slots of the transmission antennas #2 and #3.

In this instance, the above described example indicates a case in which symbols are allocated to adjacent (consecutive) time slots. However, it is not always necessary to allocate the symbols having been subjected to such above mentioned orthogonalization processing to such adjacent (consecutive) time slots. The symbols may be allocated to time slots apart from each other by one or more than one.

(TDM Reception Apparatus 50)

On the other hand, the TDM reception apparatus 50 depicted in FIG. 20 includes, for example: two receiver antennas #0 and #1; the TDM signal demodulators 57-0 and 57-1 for these receiver antennas #0 and #2. This TDM reception apparatus 50 further includes; the inter-time slot arithmetic operators used as examples of the inter-sub-carrier arithmetic operators 51-0 and 51-1; the symbol separators 52-0 and 52-1 and the P/S converters 53-0 and 53-1 the same as or similar to those already described.

In this instance, in the reception apparatus 50 exemplified in FIG. 20, also, some (reception unit) of the blocks relating to reception processing, including: low-noise amplifiers, which perform low-noise amplification of the wireless signals received through the receiver antennas #0 and #1; frequency converters, which perform frequency conversion (down-conversion) of the wireless signals so as to have baseband frequencies; and AD converters, which convert the baseband signals into digital signals, are omitted from the illustration thereof for the sake of convenience.

In the TDM reception apparatus 50 of the present example, the signals received through the receiver antennas #0 and #1 are demodulated by the corresponding TDM signal demodulators 57-0 and 57-1. After that, the inter-sub-carrier arithmetic operators 51-0 and 51-1 obtain the sum and a difference between the reception symbols for two time slots, the demodulated signals being thereby separated into the signals received from the transmitter antennas #0 and #2 and the signals received from the transmitter #1 and #3.

For example, in a case where the TDM transmission apparatus 10 sends the transmission streams #0 and #1 from the transmitter antenna #0 through #4 in obedience to the TS allocation exemplified in FIG. 19, the inter-time slot arithmetic operator 51-j obtains the sum of the reception symbols of two slots (for example, TS0 and TS1) at symbol cycles, thereby making it possible to detect and separate symbol S00 sent from the transmitter antenna #0 and symbol S10 sent from the transmitter antenna #2.

Further, the inter-time slot arithmetic operator 51-j obtains a difference between the same two time slots (TS0 and TS1), thereby making it possible to detect and separate symbol S01 sent from the transmitter antenna #1 and the symbol S11 sent from the transmitter antenna #3.

As to the signals received with time slots thereafter, it is possible to detect and separate the signals sent from the transmitter antenna #0 and #2 and the signals sent from the transmitter antenna #1 and #3 by means of obtaining the sum and the difference between the units of two-time slot at symbol cycles in the similar manner.

Then, the pair of the first symbol series separated by means of obtaining the sum by the inter-time slot arithmetic operator 51-j are input to the first symbol separator 52-0; the pair of the second symbol series separated by means of obtaining the difference by the inter-time slot arithmetic operator 51-j are input to the first symbol separator 52-1.

The symbol separator 52-j uses the MIMO signal separation scheme to perform symbol separation processing to the input pair of the symbol series. Then, the P/S converters 53-0 and 53-1 convert each symbol series having been subjected to the symbol separation into a serial signal, which is then output as the reception streams #0 and #1 corresponding to the transmission streams #0 and #1.

(A7) PRACTICAL EXAMPLE 7

Next, a description will be made hereinbelow of another form, as an example of the above described orthogonalization processing and orthogonal separation processing, of using the orthogonality of codes.

Figure 21:
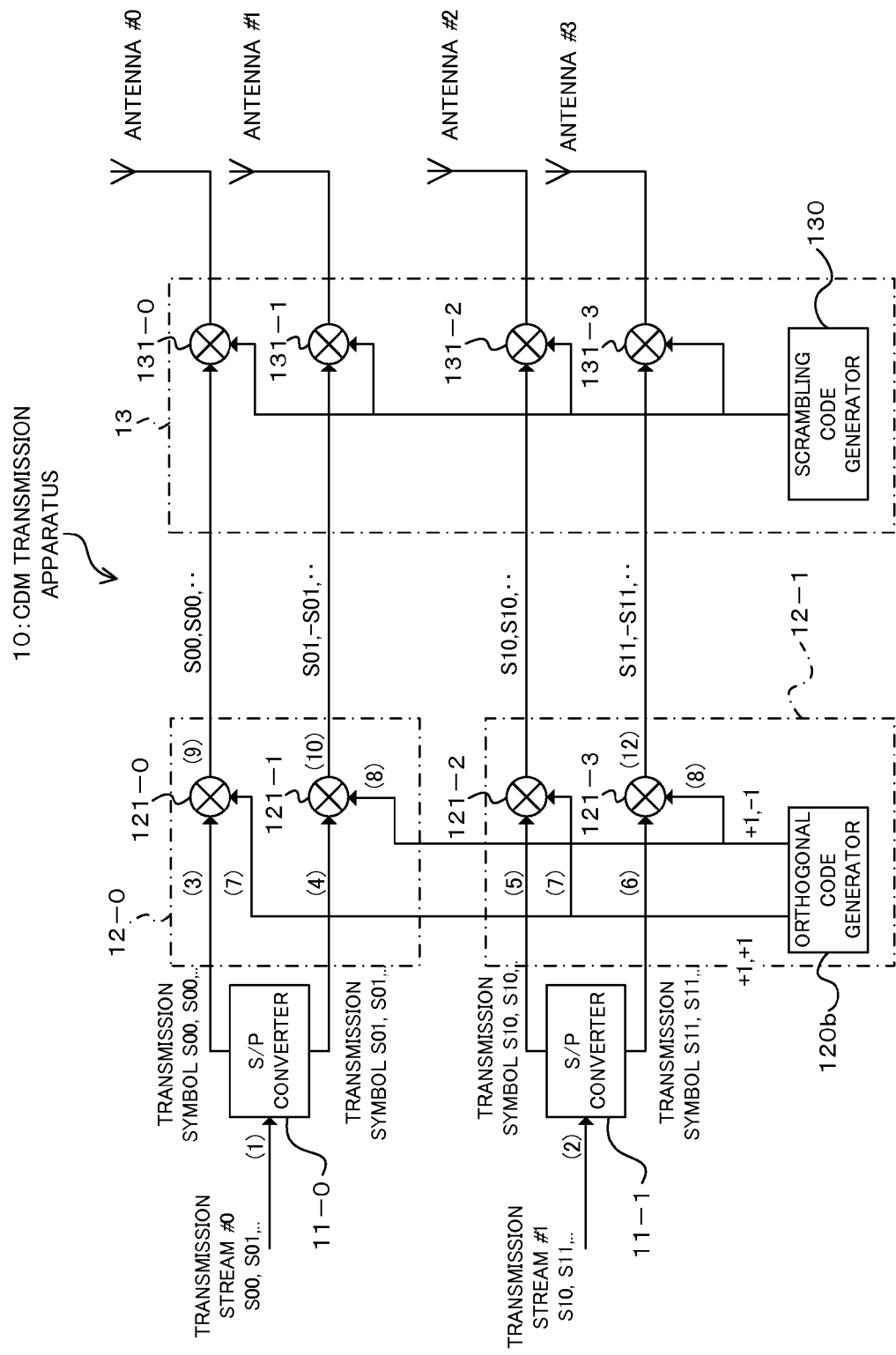
FIG. 21 is a block diagram illustrating an example of a construction of a CDM transmission apparatus utilizing the orthogonality of codes relating to a seventh practical example.

FIG. 21 is a block diagram illustrating an example of a construction of a CDM transmission apparatus 10 utilizing the orthogonality of codes as an example of the orthogonalization processing. The transmission apparatus 10 of the present example is equivalent to a modified example of the CDM transmission apparatus 10 exemplified in FIG. 5 according to the practical example 2. The code patterns [see the items (7) and (8) of FIG. 6] at chip cycles are used as examples of the orthogonal codes according to the practical example 2, whereas the code patterns at CDM symbol cycles [see the items (7) and (8) of FIG. 22] are used in the present example, which is a main difference between the practical example 2 and the present example.

Therefore, the CDM transmission apparatus 10 of the present example has, for example, the orthogonal code generator 120b that generates a code pattern of CDM symbol cycles as an alternative. This orthogonal code generator 120b can be separately provided for the encoders 12-0 and 12-1, or it can also be provided for either of those as a shared one. FIG. 21 exemplifies a case in which the orthogonal code generator 120b is provided for the orthogonalization processor 12-1 as a shared one.

In this instance, in the CDM transmission apparatus 10 exemplified in FIG. 21, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

Figure 22:
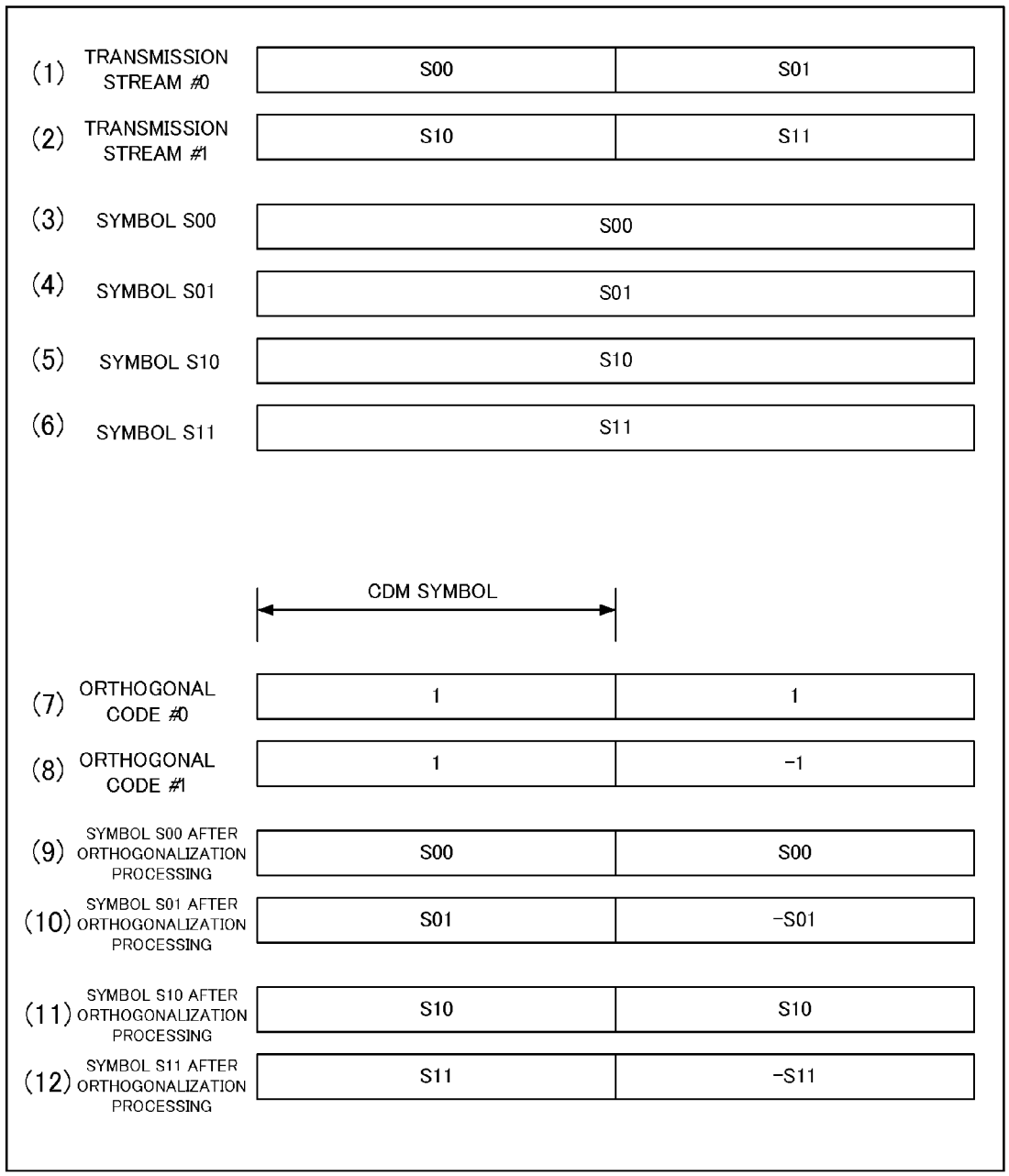
FIG. 22 is a diagram illustrating an example of a timing chart indicating transmission processing performed on the CDM transmission apparatus depicted in FIG. 21.

FIG. 22 indicates an example of a timing chart in a case where the transmission streams #0 and #1 are spread using the orthogonal codes at CDM symbol cycles (patterns) As indicated in the items (7) and (8), this FIG. 22 exemplifies a case in which the orthogonal codes #0 and #1 having the cyclic symbol patterns of (+1, +1) and (+1, −1) are generated by the orthogonal code generator 120b at the CDM symbol cycles.

In this instance, the items (1) through (12) of FIG. 22 correspond to the signals (1) through (12) depicted in FIG. 21.

That is, the transmission stream #0 exemplified in the item (1) of FIG. 21 and FIG. 22 is subjected to S/P conversion performed by the S/P converter 11-0. As a result, the transmission stream #0 becomes the signals exemplified in the items (3) and (4) of FIG. 21 and FIG. 22, and the signals are then input to the orthogonal code multipliers 120-0 and 121-1. Likewise, the transmission stream #1 exemplified in the item (2) of FIG. 21 and FIG. 22 is subjected to S/P conversion performed by the S/P converter 11-1. As a result, the transmission stream #1 is S/P converted by the S/P converter 11-1, and resultantly becomes the signals exemplified in the items (5) and (6) of FIG. 21 and FIG. 22, and the signals are then input to the orthogonal code multipliers 121-2 and 121-3.

Then, the orthogonal code multipliers 121-0 and 121-1 multiply the signals (S00 and S01) exemplified in the items (3) and (4) of FIG. 21 and FIG. 22 by the orthogonal codes #0 and #1 at the CDM symbol cycles exemplified in the items (7) and (8) of FIG. 22, thereby orthogonalizing the signals. As a result, the signals become those exemplified in the items (9) and (10) of FIG. 22.

Likewise, the orthogonal code multipliers 121-2 and 121-3 multiply the signals (S10 and S11) exemplified in the items (5) and (6) of FIG. 21 and FIG. 22 by the orthogonal codes #0 and #1 at the CDM symbol cycles exemplified in the items (7) and (8) of FIG. 22, thereby orthogonalizing the signals. As a result, the signals become those exemplified in the items (11) and (12) of FIG. 22.

Then, the multiplier 131-$i$ multiplies the signals exemplified in the items (9) through (12) of FIG. 21 and FIG. 22 by a scrambling code generated by the scrambling code generator 130, and the result is then sent from the transmitter antenna #i.

In this instance, the TDM reception apparatus 50 that receives the signals sent from the CDM transmission apparatus 10 exemplified in FIG. 21 is equivalent to the TDM reception apparatus 50 exemplified in FIG. 7 to which is applied the code pattern at the CDM symbol cycles, as an example of the orthogonal codes (replicas) used by the orthogonal separator 51-0 and 51-1.

Therefore, the reception operation thereof (S/P conversion, orthogonal separation, symbol separation, and P/S conversion) is equivalent to the pattern (chip pattern and chip timing) of the orthogonal codes (replicas) to be applied to the timing chart exemplified in FIG. 8 of the practical example 2, which pattern is regarded as the CDM symbol cycles (timing).

(A8) PRACTICAL EXAMPLE 8

Next, as examples of the orthogonalization processing and the orthogonal separation processing, another form in which the orthogonality of the codes and the orthogonality of the frequencies are used in combination.

Figure 23:
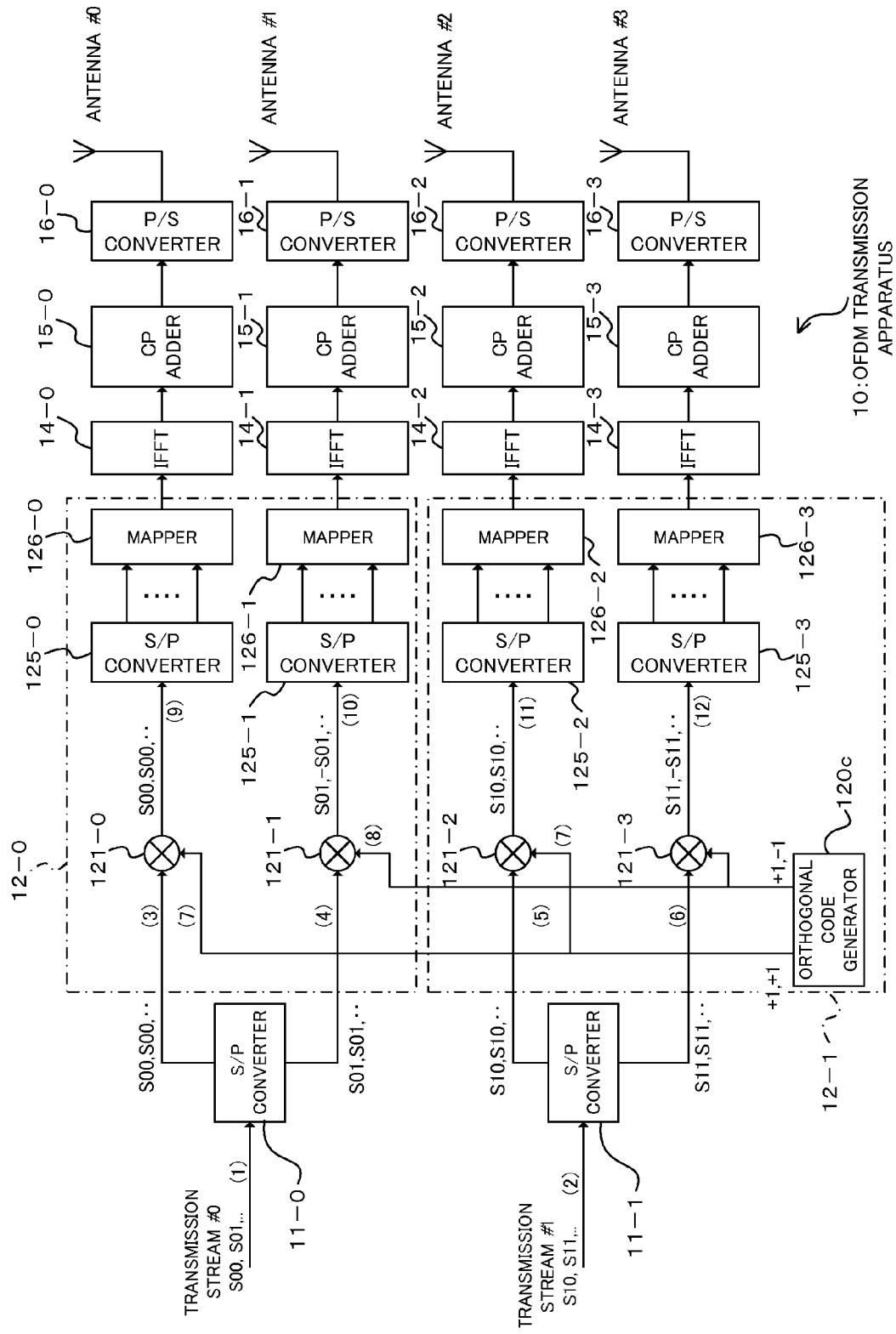
FIG. 23 is a block diagram illustrating an example of a construction of an OFDM transmission apparatus utilizing the orthogonality of codes and frequencies relating to an eighth practical example.

FIG. 23 is a block diagram illustrating an example of a construction of an OFDM transmission apparatus 10 utilizing the orthogonality of codes and frequencies, as an example of the orthogonalization processing. The OFDM transmission apparatus 10 of the present example is equivalent to a modified example of the ODFM transmission apparatus 10 depicted in FIG. 15 of the practical example 5. According to the present example, the code pattern [see the items (7) and (8) of FIG. 25] is used as an example of orthogonal codes to realize an orthogonality between OFDM symbols.

Therefore, the OFDM transmission apparatus 10 of the present example has, for example, the orthogonal code generator 120$c$ that generates a code pattern of an OFDM symbol cycle as an alternative. This orthogonal code generator 120$c$ can separately be provided for the orthogonalization processors (mapping processors) 12-0 and 12-1, or can be provided for either of those as a shared one. FIG. 23 exemplifies a case where the orthogonal code generator 120$c$ is provided for the mapping processor 12-1 as a shared one.

In this instance, in FIG. 23, the elements added thereto with the codes the same as or similar to those having been already described indicate the elements the same as or similar to those having already being described unless otherwise described. Further, in the OFDM transmission apparatus 10 exemplified in FIG. 23, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and the amplifiers, which amplify the wireless signals so as to have predetermined transmission power, are omitted from the illustration thereof for the sake of convenience.

Figure 25:
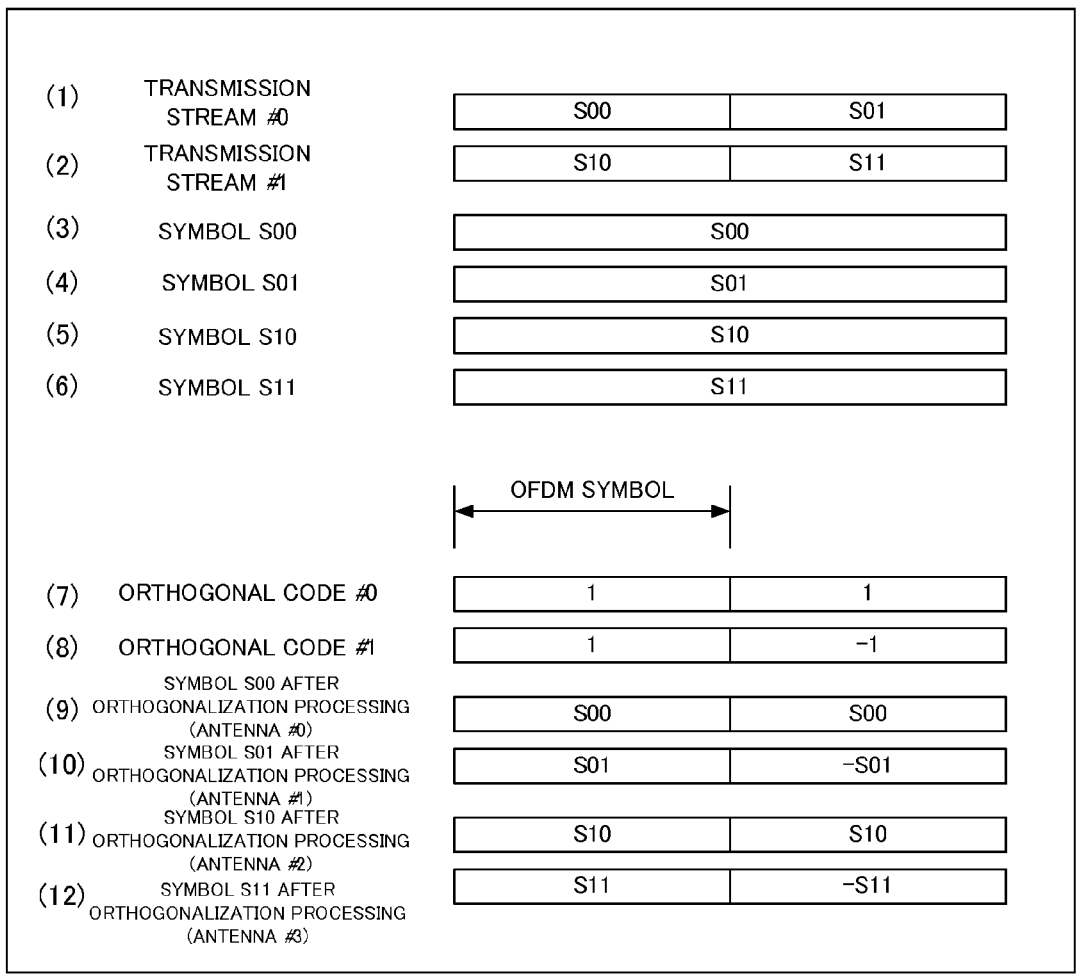
FIG. 25 is a diagram illustrating an example of a timing chart indicating transmission processing performed on the OFDM transmission apparatus depicted in FIG. 23.

FIG. 25 is a diagram illustrating an example of a timing chart in a case where the transmission streams #0 and #1 are spread by use of the orthogonal codes at OFDM symbol cycles and mapped to the orthogonal frequencies. In this FIG. 25, as indicated by the items (7) and (8), for example, it is assumed that 2 OFDM symbols are used in transmission of a single transmission symbol, and the orthogonal code generator 120$c$ generates the orthogonal codes #0 and #1 each of which has its cyclic symbol pattern of (+1, +1) or (+1, −1) as an OFDM symbol cycle. In this instance, the items (1) through (12) of FIG. 25 correspond to the signals (1) through (12) indicated in FIG. 23.

That is, the transmission stream #0 exemplified in the item (1) of FIG. 23 and FIG. 25 is subjected to S/P conversion performed by the S/P converter 11-0, thereby being made to be the signals exemplified in the items (3) and (4) of FIG. 23 and FIG. 25, and then the resultant signals are input to the orthogonal code multipliers 121-0 and 121-1. Likewise, the transmission stream #1 exemplified in the item (2) of FIG. 23 and FIG. 25 is subjected to S/P conversion by the S/P converter 11-1, thereby being made to be the signals exemplified in the items (5) and (6) of FIG. 23 and FIG. 25, and then the resultant signals are input to the orthogonal code multipliers 121-2 and 121-3.

Then, the orthogonal code multipliers 121-0 and 121-1 multiply the signals (S00 and S01) exemplified in the items (3) and (4) of FIG. 23 and FIG. 25 by the orthogonal codes #0 and #1 at the OFDM symbol cycles indicated in the items (7) and (8) of FIG. 25, thereby orthogonalizing the signals. As a result, the signals exemplified in the items (9) and (10) in FIG. 25 are obtained.

Likewise, the orthogonal code multipliers 121-2 and 121-3 multiply the signals (S10 and S11) exemplified in the items (5) and (6) of FIG. 23 and FIG. 25 by the orthogonal codes #0 and #1 at the OFDM symbol cycles indicated in the items (7) and (8) of FIG. 25, thereby orthogonalizing the signals. As a result, the signals exemplified in the items (11) and (12) in FIG. 25 are obtained.

Then, the signals exemplified in the items (9) through (12) in FIG. 23 and FIG. 25 are subjected to S/P conversion performed by the corresponding S/P converter 125-$i$, and then mapped by the mapper 126-$i$ to any of the sub-carries (frequencies) for each OFDM symbol.

Figure 24:
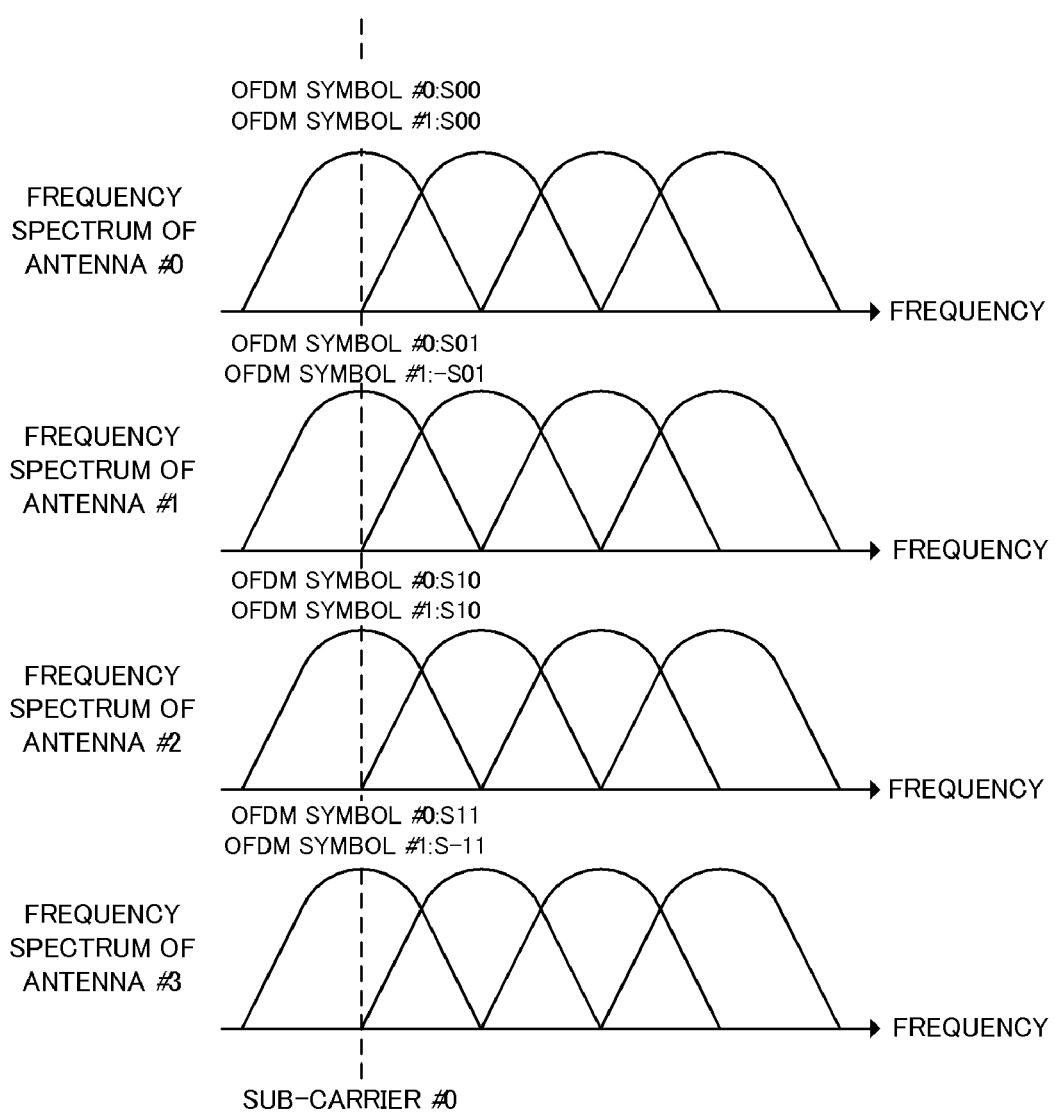
FIG. 24 is a diagram illustrating an example of sub-carrier mapping performed on the OFDM transmission apparatus depicted in FIG. 23.

FIG. 24 illustrates an example of the above. The present example is equivalent to transmitting one transmission symbol at two OFDM symbol time periods #0 and #1, thereby giving the orthogonality between the OFDM symbols sent from the transmission antennas #0 and #1. Thus, as exemplified in FIG. 24, even if OFDM symbols having different timing are mapped to the same sub-carrier (frequency), it is still possible to perform appropriate separation by use of the replicas of the orthogonal codes in the reception apparatus 50.

In this instance, the OFDM reception apparatus 50 corresponding to the OFDM transmission apparatus 10 of the present example can take the subjects between which the sum and the difference are obtained by the inter-sub-carrier arithmetic operator 51-$j$ as the above mentioned two OFDM symbols #0 and #1 detected in either of the sub-carriers, in the construction exemplified in, for example, FIG. 17.

(A9) PRACTICAL EXAMPLE 9

Next, as an example of the above described orthogonalization processing and orthogonal separation processing, a description will be made hereinbelow of yet another form in which the orthogonality of time and the orthogonality of codes are used in combination.

Figure 26:
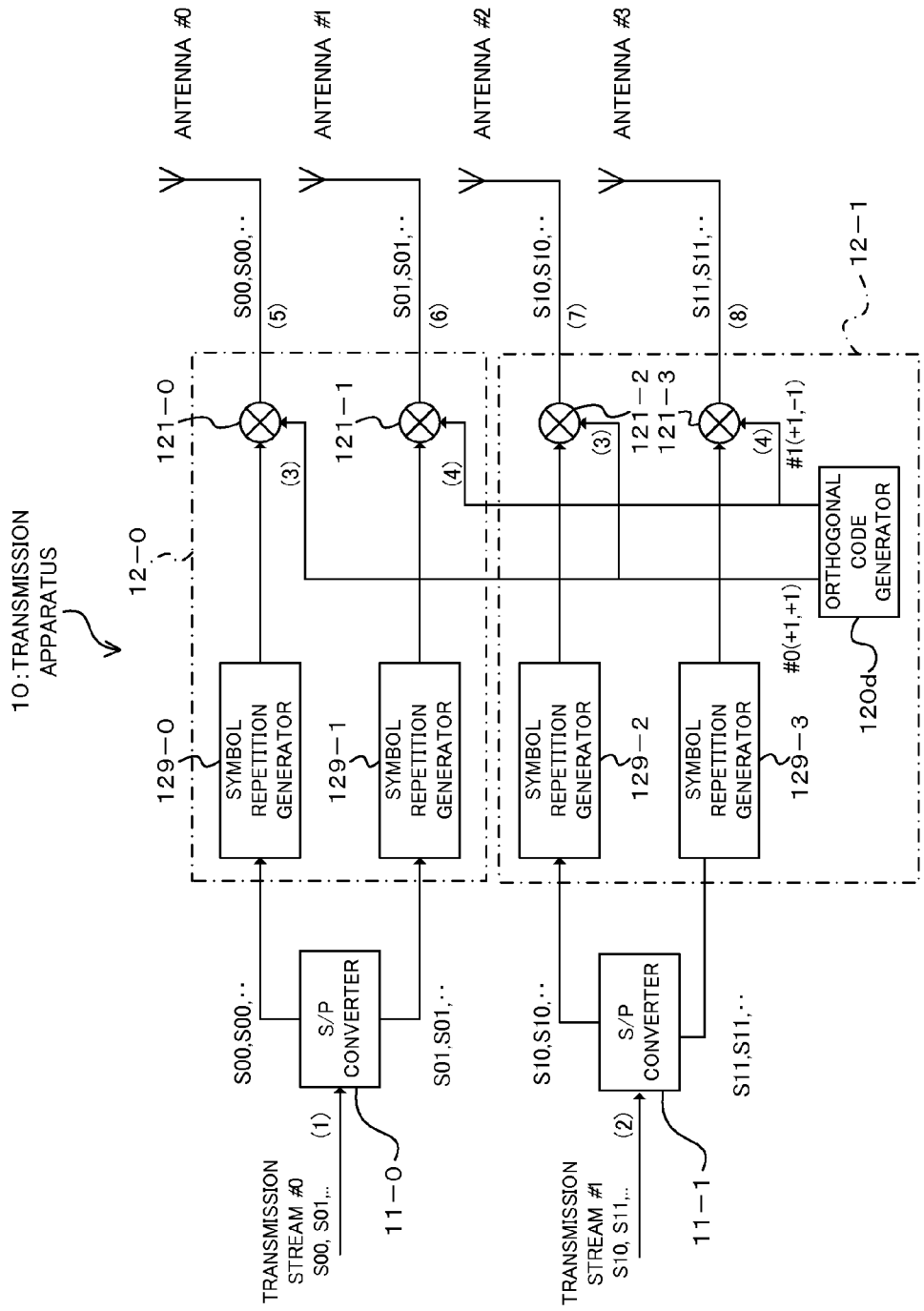
FIG. 26 is a block diagram illustrating an example of a construction of a transmission apparatus utilizing the orthogonality of time and codes relating to a ninth practical example.

FIG. 26 is a block diagram illustrating an example of a construction of a transmission apparatus 10 utilizing the orthogonality of time and codes as the orthogonalization processing. The transmission apparatus 10 illustrated in FIG. 26 is equivalent to a modified example of the practical example 6 (FIG. 18), and includes, for example: four transmitter antennas #0 through #3; and S/P converters 11-0 and 11-1 for two transmission streams #0 and #1, respectively. This transmission apparatus 10 further includes encoders used as examples of the orthogonal processors 12-0 and 12-1. The encoder 12-0 includes, for example: the symbol repetition generators 129-0 and 129-1; and the multipliers (orthogonal code multipliers) 120-0 and 121-1. Further, the orthogonalization processor 12-1 includes, for example: the symbol repetition generators 129-2 and 129-3; the orthogonal code generator 120$d$; and the multipliers (orthogonal code multipliers) 121-2 and 121-3.

In this instance, the orthogonal code generator 120$d$ can be provided for either of the encoders 12-0 and 12-1 as a shared one for the encoders 12-0 and 12-1. In the present example, the orthogonal code generator 120-$d$ is provided for, for example, the encoder 12-1. Here, the orthogonal code generator 120-$d$ can also be separately provided for the encoders 12-0 and 12-1.

Further, in the transmission apparatus 10 exemplified in FIG. 26, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

In the transmission apparatus 10 according to the present example, each of the transmission steams #0 and #1 is converted into two symbol series in the corresponding S/P converters 11-0 and 11-1.

Figure 27:
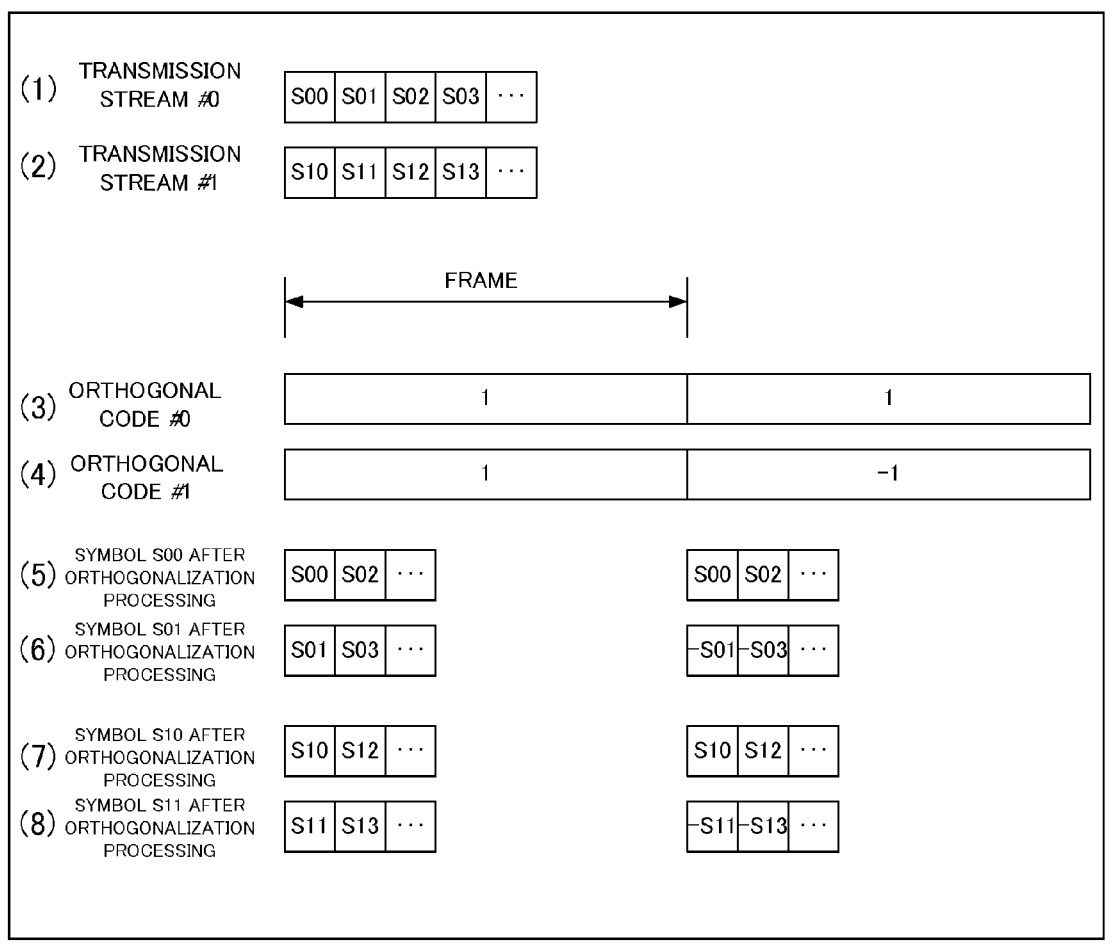
FIG. 27 is a diagram illustrating an example of a timing chart indicating transmission processing performed on the transmission apparatus depicted in FIG. 26.

For example, as exemplified in the item (1) of FIG. 27, it is assumed that the signal (symbol) series of the transmission stream #0 is S00, S01, S02, . . . ; it is assumed that the signal (symbol) series of the transmission stream #1 is S10, S11, S12, . . . .

In that case, after being subjected to S/P conversion in the S/P converter 11-0, the transmission stream #0 is converted into the first symbol series S00, S02, . . . and the second symbol series S01, S03, . . . . The first symbol series is input to the first symbol repetition generator 129-0 of the encoder 12-0; the second symbol series is input to the second symbol repetition generator 129-1 of the encoder 12-0.

Likewise, after being subjected to S/P conversion in the S/P converter 11-1, the other transmission stream #1 is converted into the first symbol series S10, S12, . . . an the second symbol series S11, S13, . . . . The first symbol series is input to the first symbol repetition generator 129-2 of the encoder 12-1; the second symbol series is input to the second symbol repetition generator 129-3 of the encoder 12-1.

Each symbol repetition generator 129-$i$ repetitively copies the input symbol series a predetermined number of times, thereby generating the symbol series of the predetermined number. The predetermined number of symbols can be, for example, the number of symbols per transmission frame, which is the predetermined transmission unit.

The symbol series (transmission frame) generated by the symbol repetition generators 129-0 and 129-2 are input to the corresponding multipliers 121-0 and 129-2, and the input symbol series are then multiplied by one (#0) of the orthogonal codes generated by the orthogonal code generator 120$d$. Likewise, the symbol series (transmission frames) generated by the symbol repetition generators 129-1 and 129-3 are input to the corresponding multipliers 121-1 and 129-3, and are then multiplied by the other orthogonal code #1 generated by the orthogonal code generator 120$d$.

Here, as indicated in the items (3) and (4) of FIG. 27, the orthogonal code generator 120$d$ generates, for example, the patterns of the orthogonal codes #0 (+1, +1) and#1 (+1, −1) at the transmission frame cycles (rate). Therefore, as indicated in the items (5) through (8) of FIG. 27, each symbol series having been subjected to the S/P conversion are multiplied by the orthogonal codes #0 and #1 at the transmission frame cycles, being thereby orthogonalized. In this instance, the signals indicated in the items (1) through (8) of FIG. 27 correspond to the signals indicated in the items (1) through (8) of FIG. 26, respectively.

Then, each of the symbol series, exemplified in the items (5) through (8) of FIG. 26 and FIG. 27, which have been subjected to the orthogonalization processing, is sent from the corresponding transmitter antenna #i by the above described transmission frame unit.

In this instance, the TDM reception apparatus 50 corresponding to the TDM transmission apparatus 10 according to the present example can have the unit (cycle) by which the sum and the difference are obtained by the orthogonal separator 51-$j$ as the unit (cycle) of the transmission frame, for example, in the construction exemplified in FIG. 20. In such meaning, the inter-time slot arithmetic operator exemplified in FIG. 20 should be an inter-frame arithmetic operator.

As described in the above first example (practical examples 1 through 9), the orthogonalization processing and the orthogonal separation processing are capable of being realized in wireless communication systems of a variety of wireless communication schemes, and it is possible to improve the reception characteristics of the reception apparatus 50, making the best use of the benefits of the variety of wireless communication schemes.

[B] Second Embodiment

Figure 28:
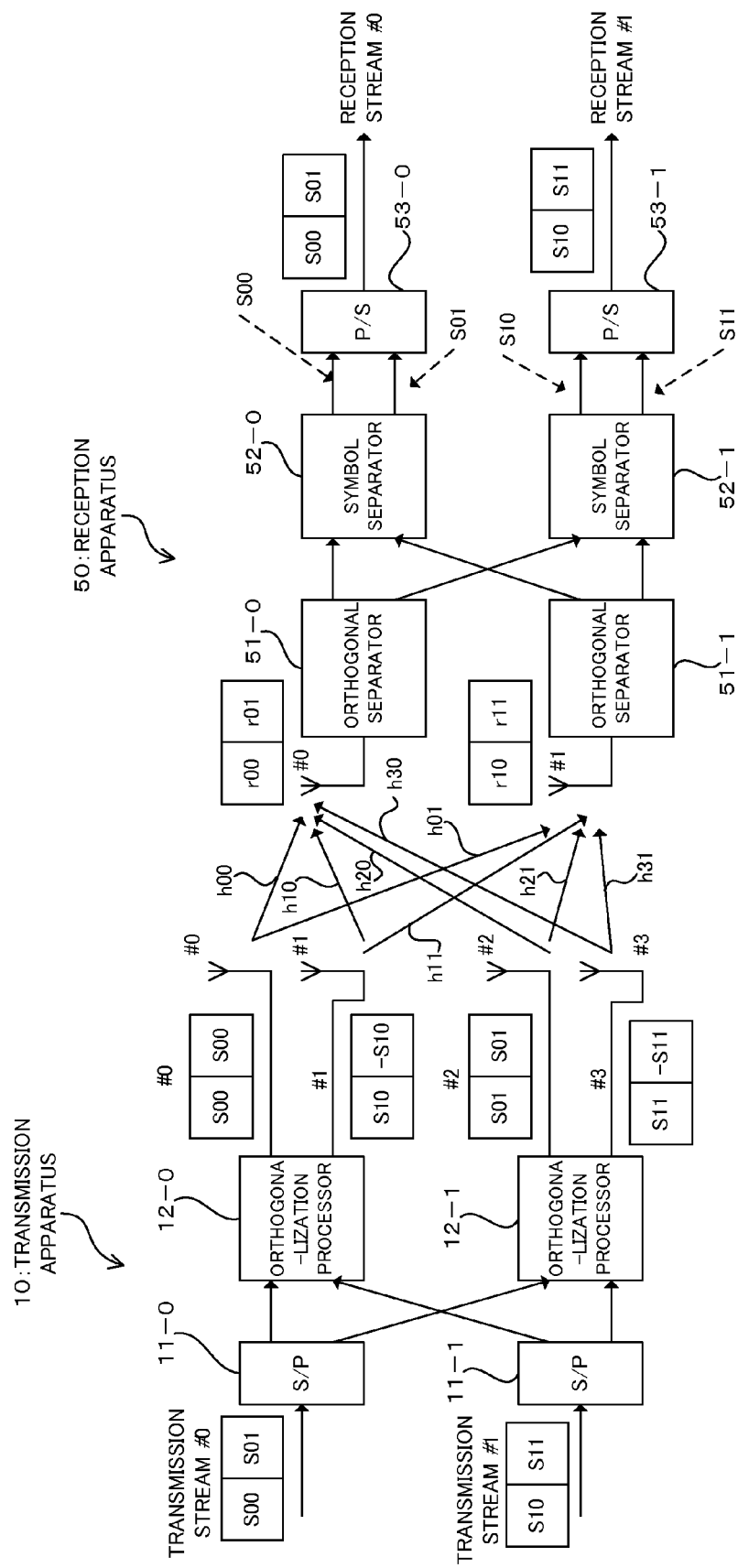
FIG. 28 is a block diagram illustrating a construction of a MIMO communications system as an example of a wireless communication system according to a second embodiment.

FIG. 28 is a block diagram illustrating a construction of a MIMO communications system as an example of a wireless communication system according to a second embodiment. The MIMO communications system illustrated in FIG. 28 differs from the system exemplified in the first embodiment (for example, FIG. 1) in the following point. In the transmission apparatus 10 according to the first embodiment (for example, FIG. 1), the orthogonalization processing is performed between the symbol series having been subjected to the S/P conversion of the same transmission stream, whereas the orthogonal processing is performed between the symbol series having been subjected to the S/P conversion of different transmission streams.

That is, the orthogonalization processor 12-0 input with the symbol series of the transmission stream #0 having been subjected to the S/P conversion performed by the S/P converter 11-0 and the symbol series of the transmission stream #1 having been subjected to the S/P conversion performed by the S/P converter 11-1, performs the orthogonalization processing described in the first embodiment (practical examples 1 through 9) to these symbol series.

Likewise, the orthogonalization processor 12-1 input with the symbol series of the transmission stream #1 having been subjected to the S/P conversion performed by the S/P converter 11-0 and the symbol series of the transmission stream #0 having been subjected to the S/P conversion performed by the S/P converter 11-1, performs the orthogonalization processing described in the first embodiment (practical examples 1 through 9) to these symbol series.

Further, in this manner, accompanying with performing the orthogonal processing between the symbol series having been subjected to the S/P conversion of different streams in the transmission apparatus 10, the following difference exists between the first embodiment and the second embodiment. In the reception apparatus 50 according to the first embodiment (for example, FIG. 1), the P/S converter 53-0 (53-1) is input with one of the outputs from each of the symbol separators 52-0 and 52-1 as a pair, whereas, in FIG. 28, the P/S converter 53-0 (53-1) is input with the outputs of the symbol separator 52-0 (52-1) as a pair.

In this instance, according to the present embodiment, also, these transmission apparatus 10 and reception apparatus 50 can be used as a transmission system and a reception system of a single wireless apparatus. For example, the transmission apparatus 10 can be employed in the transmission system of a wireless base station, and the reception apparatus 50 can be employed in a wireless terminal (mobile station) that communicates with the wireless base station through a wireless link. Here, the number of transmitter antennas and the number of reception antennas should by no means be limited to the numbers exemplified in FIG. 28.

In the transmission apparatus 10 according to the present example, more than one transmission stream, for example, two streams, the transmission stream #0 and the transmission stream #1, can be sent from the transmitter antennas #0 through #3 toward the reception apparatus 50.

For example, the symbol series (S0$y$) of the first transmission stream #0 is subjected to S/P conversion performed by the first S/P converter 11-0, which converts the transmission stream #0 into two symbol series. After that, one of the two is input to the first orthogonalization processor 12-0, and the other is input to the second orthogonalization processor 12-1.

Likewise, the symbol series (S1$y$) of the second transmission stream #1 is subjected to S/P conversion performed by the second S/P converter 11-1, which converts the transmission stream #1 into two symbol series. After that, one of the two is input to the first orthogonalization processor 12-0, and the other is input to the second orthogonalization processor 12-1.

The orthogonalization processor 12-0 performs orthogonalization processing to the symbol series belonging to the input different transmission streams #0 and #1, thereby converting the symbol series into two symbol series having a mutually orthogonal characteristic therebetween.

Likewise, the orthogonalization processor 12-1 performs orthogonalization processing to the symbol series belonging to the input different transmission streams #0 and #1, thereby converting the symbol series into two symbol series having a mutually orthogonal characteristic therebetween.

Here, similar to the first embodiment (practical example 1), the orthogonality of codes is used as an example of the orthogonalization processing as an example of the orthogonalization processing, the orthogonalization processor 12-0 (12-1) multiplies the input two symbol series by the orthogonal codes #0 and #1 such as the Walsh code, thereby performing encoding (orthogonalization) of each of the symbol series. For example, as an example of the orthogonal code #0, the orthogonalization processor 12-0 (12-1) multiplies the orthogonal codes having the code patterns of (+1, +1) and (+1, −1) at the symbol cycle (pattern) before being subjected to the S/P conversion.

In this case, the symbol series #0 through #3 having been subjected to the encoding (orthogonalization) with an attention paid to the case in which y=0, 1 become the following:

Symbol series #0→(S00, S00)
Symbol series #1→(S10, −S10)
Symbol series #2→(S01, S01)
Symbol series #3→(S11, −S11)

Here, there exists orthogonality between the symbol series #0 and the symbol series #1 such that the sum obtained therebetween results in a component of symbol S00 remained, and such that the sum obtained therebetween results in a component of symbol S10, and there exists orthogonality between the symbol series #2 and #3 such that the difference therebetween results in a component of symbol S11 remained.

The signals of the symbol series #0 through #3 are sent from the transmitter antennas #0 through #3, and then combined (multiplexed) in space. The signals propagated in space are received through the receiver antennas #0 and #1.

In this instance, in the transmission apparatus 10 exemplified in FIG. 28, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

Further, in the reception apparatus 50 exemplified in FIG. 28, also, some (reception unit) of the blocks relating to reception processing, including: low-noise amplifiers, which perform low-noise amplification of the wireless signals received through the receiver antennas #0 and #1; frequency converters, which perform frequency conversion (down-conversion) of the wireless signals so as to have baseband frequencies; and AD converters, which convert the baseband signals into digital signals, are omitted from the illustration thereof for the sake of convenience.

Here, according to the present embodiment, also, as illustrated in FIG. 28, in a case where the value (vector) of the propagation path (channel) from the transmitter antenna #i (i=any of 0 through 3) to the receiver antenna #j (j=0 or 1) is pressed as "hij" and a signal received at the time of t=k (k=0, 1, 2, . . . ) is expressed as "rjk", the signals (r00 and r01) received through the receiver antenna #0 at the time t=0, 1, respectively, can be expressed by the following formulae (9) and (10); the signals (r10 and r11) received through the receiver antenna #1 at the time of t=0, 1, respectively, can be expressed by the following formulae (11) and (12).

$$r00 = h00 \cdot S00 + h10 \cdot S10 + h20 \cdot S01 + h30 \cdot S11 \quad (9)$$

$$r01 = h00 \cdot S00 - h10 \cdot S10 + h20 \cdot S01 - h30 \cdot S11 \quad (10)$$

$$r10 = h01 \cdot S00 + h11 \cdot S10 + h21 \cdot S01 + h31 \cdot S11 \quad (11)$$

$$r11 = h01 \cdot S00 - h11 \cdot S10 + h21 \cdot S01 - h31 \cdot S11 \quad (12)$$

In the orthogonal separators (decoders) 51-0 and 51-1, the received signals are separated into a signal component sent from the transmitter antennas #0 and #2 and a signal component sent from the transmitter antennas #1 and #3 by use of the replicas of the above mentioned orthogonal codes #0 and #1.

For example, the signal sequence r00, r11 (r10, r11) of the signal received through the receiver antenna #0 (#1) is multiplied by the replicas (+1, +1) and (+1, −1) of the orthogonal codes #0 and #1 at the symbol cycles generated by the orthogonal code generator 510, and the signals r00 (r10) and the signal r11 (r11) received at different time are added (integrated) together.

At that time, since one of the received signal (symbol) series is multiplied by the pattern of (+1, −1), as the orthogonal code #1 for the 2-symbol time unit, the sum of the signal r00 (r10) received at time t=0 and the signal r01 (r11) received at time t=1 and the difference therebetween are obtained.

Accordingly, the result obtained by the separation by use of the orthogonal codes #0 and #1 (replicas) can be expressed by the following formulae (13) through (16):

$$r00 + r01 = 2 \cdot h00 \cdot S00 + 2 \cdot h20 \cdot S01 \quad (13)$$

$$r00 - r01 = 2 \cdot h10 \cdot S10 + 2 \cdot h30 \cdot S11 \quad (14)$$

$$r10 + r11 = 2 \cdot h01 \cdot S00 + 2 \cdot h21 \; S01 \quad (15)$$

$$r10 - r11 = 2 \cdot h11 \cdot S10 + 2 \cdot h31 \cdot S11 \quad (16)$$

The pair of the above formulae (13) and (15) are equivalent to the product of the channel matrix having the elements of the cannel values h00, h01, h20, and h21 as its elements and the transmission signal vector (S00, S10). Likewise, the pair of the above formulae (14) and (16) are equivalent to the product of the cannel matrix having the elements of the cannel values h10, h11, h30, and h31 as its elements and the transmission vector (S01, S11).

Accordingly, it is possible for the symbol separator 52-0 to separate symbol S00 sent from the transmitter antenna #0 and symbol S01 sent from the transmitter antenna #2 from the pair of the formulae (13) and (15) by use of an already known MIMO signal separation scheme.

Likewise, it is possible for the symbol separator 52-1 to separate symbol S10 sent from the transmitter antenna #1 and symbol S11 sent from the transmitter antenna #3 from the pair of the formulae (14) and (16).

Further, each of the terms of the right-hand side of the formulae (13) through (16) is multiplied by a constant number larger than "1" (=2), so that improvement of the reception characteristic feature (for example, SNR) due to transmission diversity about 3 dB can be logically expected at the stage after orthogonal separation (before symbol separation) in the reception apparatus 50.

In this instance, similar to the first embodiment, according to the second embodiment, also, it is a matter of course that it is possible to execute the orthogonalization processing and orthogonal separation processing by use of the orthogonality of frequencies and the orthogonality of time. That is, the practical examples 1 through 9, already described, are capable of being applied to between the symbol series belonging to different transmission streams.

[C] Third Embodiment

According to the system already described in the first and the second embodiment (practical examples 1 through 9), since there is no wireless wave directivity due to beam forming, the technique is applicable with ease to a channel, such as a shared channel and a broadcast channel (hereinafter will be generically called the "shared channel"), performing transmission toward more than one reception apparatus 50. In that case, channels, such as individual channels, through which transmission destined to a specific reception apparatus 50, are applied with another communications scheme such as beam forming due to the MIMO preceding technique. In this instance, the above mentioned channels include a control channel and/or a data channel.

Figure 29:
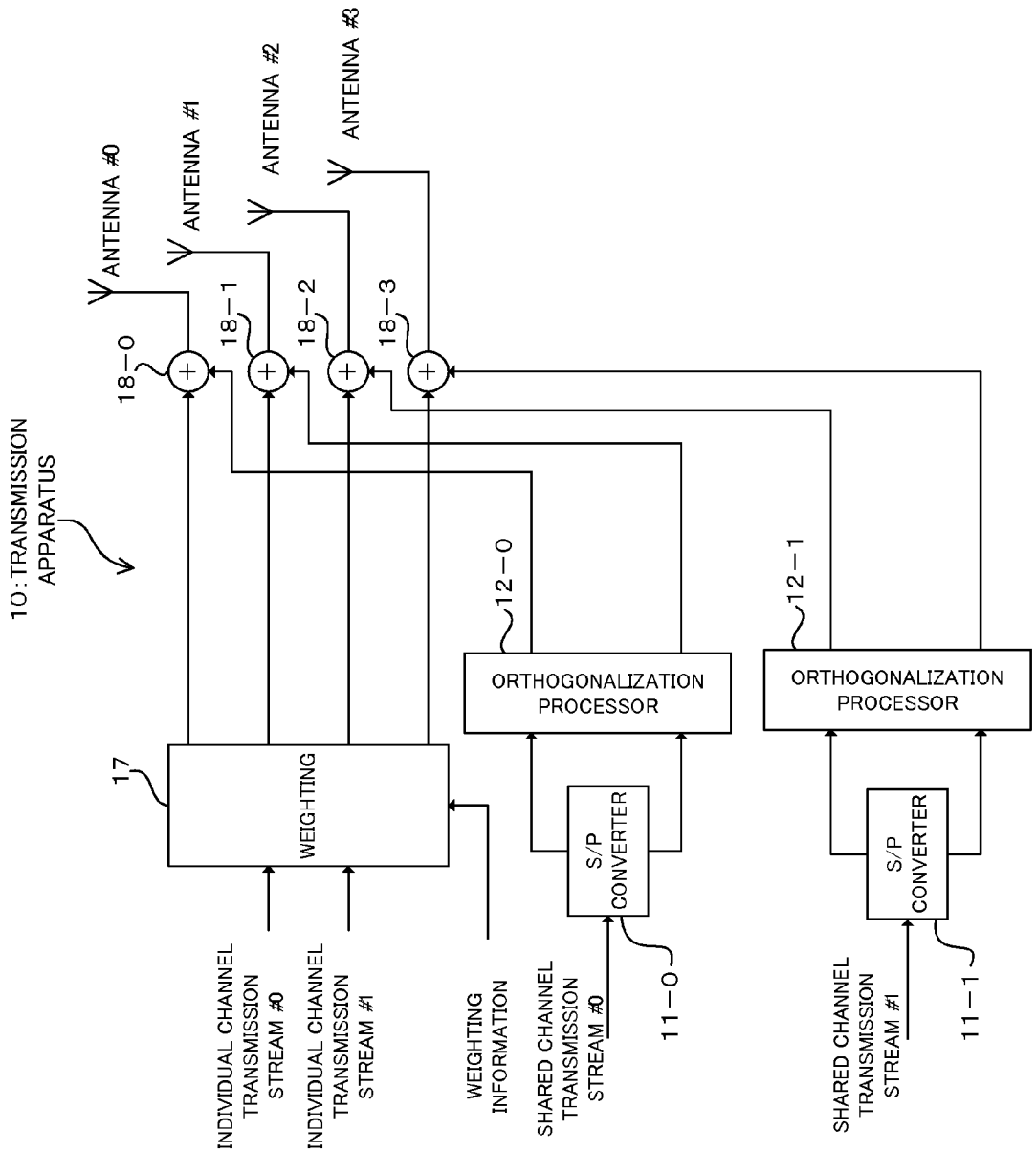
FIG. 29 is a block diagram illustrating an example of a construction of a transmission apparatus according to a third embodiment.
Figure 30:
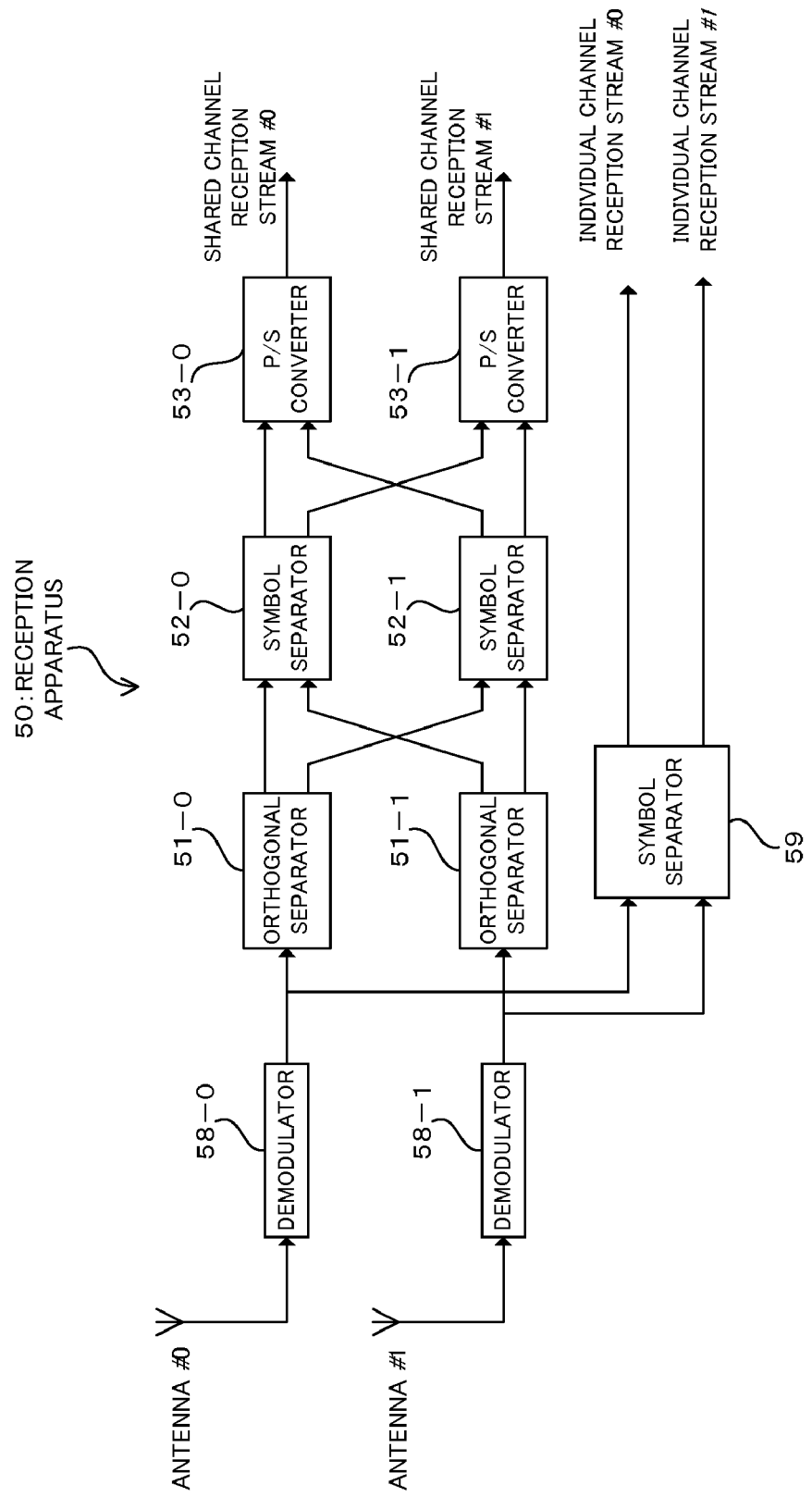
FIG. 30 is a block diagram illustrating an example of a construction of a reception apparatus according to the third embodiment.

FIG. 29 illustrates an example of a construction of the transmission apparatus 10; FIG. 30 illustrates an example of a construction of the corresponding reception apparatus 50. In this instance, according to the present embodiment, also, these transmission apparatus 10 and the reception apparatus 50 can be used as a transmission system and a reception system of a single wireless apparatus. For example, the transmission apparatus 10 is capable of being used in the transmission system of a wireless base station, and the reception apparatus 50 is capable of being used in a wireless terminal (mobile station) that communicates with the wireless base station through a wireless link. In this instance, the number of the transmitter antennas and the number of receiver antennas should by no means be limited to these.

The transmission apparatus 10 depicted in FIG. 29 includes, for example: four transmitter antennas #0 through #3; a beam former 17 that performs weighting control (beam forming) to the transmission streams #0 and #2 of the individual channels; and adders 18-0 through 18-3 of the transmitter antennas #0 and #3, respectively. Further, this transmission apparatus 10 includes the S/P converters 11-0 and 11-1 and the S/P converters 11-0 and 11-1 for the transmission streams #0 and #1 of the shared channel, which have already been described in the first and the second embodiment.

The symbol series having been subjected to the orthogonalization processing performed by the orthogonalization processors 12-0 and 12-1, as already described in the first (or the second) embodiment, are added (multiplexed) thereto with the transmission streams of the individual channels from the beam former 17 in the adder 18-*i*, and then sent from the transmitter antenna #i toward the reception apparatus 50.

In this instance, in the transmission apparatus 10 exemplified in FIG. 29, also, some (transmission unit) of the blocks relating to transmission processing, including: DA converters, which convert the transmission signals (symbol series) into analogue signals; frequency converters, which perform frequency conversion (up-conversion) of the analogue signals so as to have radio frequencies; and amplifiers, which amplify the wireless signals so as to have predetermined transmission power, are omitted from the illustration thereof for the sake of convenience.

On the other hand, the reception apparatus 50 depicted in FIG. 30 includes, for example: two receiver antennas #0 and #1; demodulators 58-0 and 58-1 for these receiver antennas #0 and #1, respectively; and a symbol separator 59 for the reception signals of the individual channels. This reception apparatus 50 further includes the orthogonal separators 51-0 and 51-1, the symbol separators 52-0 and 52-1, and the P/S converters 53-0 and 53-1, having been already described in the first (or the second) embodiment, for the reception signals of the shared channel.

The demodulators 58-0 and 58-1 each demodulate the signals (including the signals of the individual channels and the shared channel) received through the corresponding receiver antennas #0 and #1 by use of the demodulation scheme corresponding to the modulation scheme used in the transmission apparatus 10, and then output the reception symbol series. Each of the demodulators 58-0 and 58-1 can be the CDM demodulator or the OFDM demodulator (CP remover, FFT) or the TDM signal demodulator, according to the first (or the second) embodiment.

The symbol separator (individual channel separator) 59 separates the symbol series of the transmission streams #0 and #1 of the individual channels from the reception symbol series received from the demodulators 58-0 and 58-1. For example, the symbol separator 59 is capable of separating the reception symbol series of the transmission streams #0 and #1 of the individual channels by means of multiplying the reception symbol series by the weighting factor corresponding to the weighting factor (preceding matrix) used by the transmission apparatus 10 in beam forming. In this instance, the information used by the transmission apparatus 10 in beam forming is capable of being notified from the transmission apparatus 10 to the reception apparatus 50 by using, for example, a control channel.

On the other hand, as to the shared channel, as already described in the first (or the second) embodiment, the orthogonal separators 51-0 and 51-1, the symbol separators 52-0 and 52-1, and the P/S converters 53-0 and 53-1 execute orthogonal separation, symbol separation, and P/S conversion to the reception symbol series obtained by the demodulators 58-0 and 58-1. As a result, the reception streams #0 and #1 corresponding to the transmission streams #0 and #1 are obtained.

As described above, according to the present example, transmission due to beam forming (MIMO preceding) is performed for the individual channels, and transceiving by use of the orthogonalization processing and the orthogonal separation processing described above in the first (or the second) embodiment are performed. In this manner, it is possible to select an appropriate communications scheme in accordance with the quality of the channels.

Accordingly, it is possible to improve the reception characteristics (for example, SNR) of the shared channel and the individual channels, while suppressing increase in feedback information from the reception apparatus 50 to the transmission apparatus 10, so that the quality and the capacity of the channels are capable of being improved.

In this instance, in transmission of a signal that is not to be subjected to the orthogonalization processing and the orthogonal separation processing, it is possible to apply the communications scheme other than the above mentioned beam forming. Further, it is not that the signals to be subjected to the orthogonalization processing and the orthogonal separation processing cannot be the signals of the individual channels.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) has (have) been described in detail, it should be understood that the various changes, substitutions, and alterations could be made hereto without departing from the spirit and scope of the invention.

What is claimed is:

1. A wireless communication system, comprising:
   a transmission apparatus comprising:
      an orthogonal processor operable to perform orthogonalization processing based on the orthogonality of wireless resources to each of signal sequences so that symbol series of each time obtained from each of a plurality of transmission streams are orthogonalized, the signal sequences being obtained by dividing each of the plurality of transmission streams; and
      a transmitter to transmit each of the signal sequences being subjected to the orthogonalization processing through multiple antennas, wherein symbols of each of the signal sequences are respectively based on a same symbol of the plurality of transmission streams; and
   a reception apparatus comprising:
      an orthogonal separator operable to perform orthogonal separation processing based on the orthogonality to a signal received from the transmission apparatus to separate the received signal into a plurality of reception signal sequences having an orthogonal characteristic therebetween; and
      a signal separator operable to apply a predetermined signal separation method based on a propagation path estimation matrix between the reception apparatus and the transmission apparatus to any of the pairs of the plurality of reception signal sequences to regenerate the signal sequences before being subjected to the orthogonalization processing.

2. A wireless communication method for use in a wireless communication system provided with a transmission apparatus and a reception apparatus, the wireless communication method comprising:
   on the transmission apparatus,
      performing orthogonalization processing based on the orthogonality of wireless resources to each of signal sequences so that symbol series of each time obtained from each of a plurality of transmission streams are orthogonalized, the signal sequences being obtained by dividing each of the plurality of transmission streams; and
      transmitting each of the signal sequences being subjected to the orthogonalization processing through multiple antennas, wherein symbols of each of the signal sequences are respectively based on a same symbol of the plurality of transmission streams; and
   on the reception apparatus,
      performing orthogonal separation processing based on the orthogonality to a signal received from the transmission apparatus to separate the received signal into a plurality of reception signal sequences having an orthogonal characteristic therebetween; and
      applying a predetermined signal separation method based on a propagation path estimation matrix between the reception apparatus and the transmission apparatus to any of the pairs of the plurality of reception signal sequences to regenerate the signal sequences before being subjected to the orthogonalization processing.

3. A transmission apparatus, comprising:
   an orthogonal processor operable to perform orthogonalization processing based on the orthogonality of wireless resources to each of signal sequences so that symbol series of each time obtained from each of a plurality of transmission streams are orthogonalized, the signal sequences being obtained by dividing each of the plurality of transmission streams; and a transmitter operable to transmit each of the signal sequences being subjected to the orthogonalization processing through multiple antennas, wherein symbols of each of the signal sequences are respectively based on a same symbol of the plurality of transmission streams.

4. The transmission apparatus of claim 3, wherein the orthogonal processor comprises:
a serial-to-parallel converter operable to perform serial-to-parallel conversion of the transmission streams into the multiple signal sequences; and
a multiplier operable to multiply a pair of codes serving as the wireless resources having the orthogonality to any pair of the multiple signal sequences being subjected to the serial-to-parallel conversion.

5. The transmission apparatus of claim 3, wherein the orthogonal processor comprises:
a serial-to-parallel converter operable to perform serial-to-parallel conversion of the transmission streams into the multiple signal sequences;
a mapper to map the signal sequences being subjected to the serial-to-parallel conversion to a frequency serving as the wireless resources having the orthogonality in a frequency domain; and
a frequency/time domain converter operable to convert an output of the mapper into a signal of a time domain.

6. The transmission apparatus of claim 3, wherein the orthogonal processor comprises:
a serial-to-parallel converter operable to perform serial-to-parallel conversion of the transmission streams into the multiple signal sequences; and
a time division switch operable to output the signal sequences being subjected to the serial-to-parallel conversion to the transmitter antennas with different time slots serving as the wireless resources having the orthogonality.

7. The transmission apparatus of claim 3, wherein the orthogonal processor comprises:
a serial-to-parallel converter operable to perform serial-to-parallel conversion of the transmission streams into the multiple signal sequences;
a multiplier operable to multiply a pair of codes serving as the wireless resources having the orthogonality to any pair of the multiple signal sequences being subjected to the serial-to-parallel conversion;
a mapper operable to map the signal sequences being subjected to the multiplication to adjacent or neighborhood frequencies; and
a frequency/time domain converter to convert an output of the mapper into a signal of a time domain.

8. The transmission apparatus of claim 3, wherein the orthogonal processor comprises:
a serial-to-parallel converter to perform serial-to-parallel conversion of the transmission streams into the multiple signal sequences; and
a multiplier to multiply a pair of codes serving as the wireless resources having the orthogonality to any pair of the multiple signal sequences being subjected to the serial-to-parallel conversion,
the orthogonal processor outputting the signal sequences being subjected to the multiplication to the transmitter antennas with adjacent or neighborhood time slots.

9. The transmission apparatus of claim 3, the orthogonal processor performing the orthogonalization processing to signal sequences each belonging to different ones of the transmission streams.

10. The transmission apparatus of claim 3,
wherein the transmission streams are signal streams of a shared channel, and
wherein the transmission apparatus further comprises:
a beam former to perform beam forming to a signal stream of an individual channel; and
a multiplexing unit to multiplex a signal stream being subjected to the beam forming to a signal sequence sent from the transmitter antenna.

11. A reception apparatus, comprising:
an orthogonal separator operable to perform orthogonal separation processing based on the orthogonality to a signal received from the transmission apparatus to separate the received signal into a plurality of reception signal sequences having an orthogonal characteristic therebetween, the transmission apparatus performing orthogonalization processing based on the orthogonality characteristic of wireless resources to each of signal sequences so that symbol series of each time obtained from each of a plurality of transmission streams are orthogonalized, the signal sequences being obtained by dividing each of the plurality of transmission streams and transmitting each of the signal sequences being subjected to the orthogonalization processing through multiple antennas, wherein symbols of each of the signal sequences are respectively based on a same symbol of the plurality of transmission streams; and
a signal separator operable to apply a predetermined signal separation method based on a propagation path estimation matrix between the reception apparatus and the transmission apparatus to any of the pairs of the plurality of reception signal sequences to regenerate the signal sequences before being subjected to the orthogonalization processing.

12. The reception apparatus of claim 11,
wherein the transmission apparatus performs serial-to-parallel conversion of the transmission streams into the multiple signal sequences and multiplies a pair of codes serving as the wireless resources having the orthogonality to any pair of the multiple signal sequences being subjected to the serial-to-parallel conversion, and
wherein the signal separator comprises a decoder operable to multiply the signal received from the transmission apparatus and a replica of the orthogonal codes together and performs addition and subtraction of the multiplication result.

13. The reception apparatus of claim 11,
wherein the transmission apparatus performs serial-to-parallel conversion of the transmission streams into the multiple signal sequences and maps the signal sequence to a frequency serving as the wireless resources having the orthogonality and sends the resultant signals, and
wherein the orthogonal separator comprises a frequency separator operable to separate a frequency signal having the orthogonal characteristic from the signals received from the transmission apparatus.

14. The reception apparatus of claim 11,
wherein the transmission apparatus performs serial-to-parallel conversion of the transmission streams into the multiple signal sequences and transmits the signal sequences with different time slots serving as the wireless resources having an orthogonal characteristic, and wherein the orthogonal separator comprises a time slot separator operable to separate a reception signal in the different time slots from the signals received from the transmission apparatus.

15. The reception apparatus of claim 11,
wherein the transmission apparatus performs serial-to-parallel conversion of the transmission streams into the multiple signal sequences, and multiplies a pair of codes serving as the wireless resources having the orthogonality to any pair of the multiple signal sequences being subjected to the serial-to-parallel conversion, and maps the signal sequences being subjected to the multiplication to adjacent or neighborhood frequencies, and transmits the resultant signals, and wherein the orthogonal separator comprises an inter-frequency arithmetic separator operable to separate the frequency signal from the signals received from the transmission apparatus, and performs addition and subtraction processing between the separated frequency symbols.

16. The reception apparatus of claim 11,
wherein the transmission apparatus performs serial-to-parallel conversion of the transmission streams into the multiple signal sequences, and multiplies a pair of codes serving as the wireless resources having the orthogonality to any pair of the multiple signal sequences being subjected to the serial-to-parallel conversion, and sends the signal sequences multiplied by the codes with adjacent or neighborhood time slots, and wherein the orthogonal separator comprises an inter-time slot arithmetic separator to separate a reception signal in the time slots from the signals received from the transmission apparatus and performs addition and subtraction between the separated reception signal in the time slots.

17. The reception apparatus of claim 11,
wherein the transmission apparatus performs beam forming to a signal stream in an individual channel, and sends the signal stream being subjected to the beam forming together with signal sequence in a shared channel being subjected to the orthogonalization processing, and wherein the reception apparatus further comprises an individual channel separator to separate a signal stream in the individual channel from a signal received from the transmission apparatus by the beam forming.

* * * * *